United States Patent
Abedini et al.

(10) Patent No.: US 11,705,959 B2
(45) Date of Patent: Jul. 18, 2023

(54) IDENTIFICATION AND UTILIZATION OF ASSISTING NODES

(71) Applicant: QUALCOMM Incorporated, San Diego, CA (US)

(72) Inventors: Navid Abedini, Basking Ridge, NJ (US); Junyi Li, Fairless Hills, PA (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/445,991

(22) Filed: Aug. 26, 2021

(65) Prior Publication Data

US 2022/0109492 A1  Apr. 7, 2022

Related U.S. Application Data

(60) Provisional application No. 63/086,782, filed on Oct. 2, 2020, provisional application No. 63/198,206, filed on Oct. 2, 2020.

(51) Int. Cl.
*H04L 5/12* (2006.01)
*H04B 7/155* (2006.01)
*H04B 7/06* (2006.01)

(52) U.S. Cl.
CPC ........... *H04B 7/155* (2013.01); *H04B 7/0639* (2013.01); *H04B 7/0695* (2013.01)

(58) Field of Classification Search
CPC ..... H04B 7/155; H04B 7/0639; H04B 7/0695
USPC ........ 375/262, 260, 261, 259, 219, 295, 316
See application file for complete search history.

(56) References Cited

U.S. PATENT DOCUMENTS

2016/0345371 A1* 11/2016 Gattami ................ H04W 24/10
2019/0261309 A1*  8/2019 Martin ................. H04W 68/005

OTHER PUBLICATIONS

Huawei, et al., "Beamforming for V2X Sidelink for FR1 and FR2", 3GPP Draft, 3GPP TSG RAN WG1 Ad-Hoc Meeting 1901, R1-1900862, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593708, 5 pages, Retrieved from the Internet: URL: http://www.3gpp.org/ftp/Meetings%5F3GPP%5FSYNC/RAN1/Docs/R1%2D1900862%2Ezip, [retrieved on Jan. 20, 2019], Section 2.3, The Whole Document, p. 1-p. 2 paragraph 2.3.

(Continued)

*Primary Examiner* — Zewdu A Kassa
(74) *Attorney, Agent, or Firm* — Arun Swain; Harrity & Harrity, LLP

(57) ABSTRACT

Various aspects of the present disclosure generally relate to wireless communication. In some aspects, a first wireless node may receive, from a control node or a second wireless node, an indication of an assisting node to be used to establish a communication connection between the first wireless node and the second wireless node, the indication including identifying information associated with the assisting node. The first wireless node may establish the communication connection with the second wireless node using the assisting node. Numerous other aspects are described.

30 Claims, 19 Drawing Sheets

(56) References Cited

OTHER PUBLICATIONS

Intel: "New Solution for Key Issue #5 and Part of Key Issue #1", 3GPP Draft, 3GPP TSG SA WG2 Meeting #121, S2-173864 (WAS2974)_New_Solution_for_Key_Issue_#5, 3rd Generation Partnership Project (3GPP), Mobile Competence Centre, 650, Route Des Lucioles, F-06921 Sophia-Antipolis Cedex, France, vol. SA WG2, No. Hangzhou, China, May 15, 2017-May 19, 2017, May 18, 2017 (May 18, 2017), XP051282238, pp. 1-9, Retrieved from the Internet: URL:http://www.3gpp.org/ftp/Meetings_3GPP_SYNC/SA2/Docs/ [retrieved on May 18, 2017] p. 2.
International Search Report and Written Opinion—PCT/US2021/051871—ISA/EPO—dated Jan. 4, 2022.

\* cited by examiner

IDENTIFICATION AND UTILIZATION OF ASSISTING NODES

CROSS-REFERENCE TO RELATED APPLICATIONS

This patent application claims priority to U.S. Provisional Patent Application No. 63/198,206, filed on Oct. 2, 2020, entitled "IDENTIFICATION AND UTILIZATION OF ASSISTING NODES," and assigned to the assignee hereof; and to U.S. Provisional Patent Application No. 63/086,782, filed on Oct. 2, 2020, entitled "IDENTIFICATION AND UTILIZATION OF ASSISTING NODES," and assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for identification and utilization of assisting nodes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless node includes receiving, from a control node or a second wireless node, an indication of an assisting node to be used to establish a communication connection between the first wireless node and the second wireless node, the indication including identifying information associated with the assisting node; and establishing the communication connection with the second wireless node using the assisting node.

In some aspects, a method of wireless communication performed by a control node includes transmitting, to at least one of a first wireless node or a second wireless node, an indication of an assisting node to be used to establish a communication connection between the first wireless node and the second wireless node, the indication including identifying information associated with the assisting node; and transmitting, to at least one of the first wireless node or the second wireless node, an indication of resources to be used to establish the communication connection between the first wireless node and the second wireless node.

In some aspects, a method of wireless communication performed by a first wireless node includes transmitting, to a second wireless node, an indication of an assisting node to be used to establish a communication connection between the first wireless node and the second wireless node, the indication including identifying information associated with the assisting node; and establishing the communication connection with the second wireless node using the assisting node.

In some aspects, a first wireless node for wireless communication includes a memory and one or more processors coupled to the memory. The one or more processors may be configured to: receive, from a control node or a second wireless node, an indication of an assisting node to be used to establish a communication connection between the first wireless node and the second wireless node, the indication including identifying information associated with the assisting node; and establish the communication connection with the second wireless node using the assisting node.

In some aspects, a control node for wireless communication includes a memory and one or more processors coupled to the memory. The one or more processors may be configured to: transmit, to at least one of a first wireless node or a second wireless node, an indication of an assisting node to be used to establish a communication connection between the first wireless node and the second wireless node, the indication including identifying information associated with the assisting node; and transmit, to at least one of the first wireless node or the second wireless node, an indication of resources to be used to establish the communication connection between the first wireless node and the second wireless node.

In some aspects, a first wireless node for wireless communication includes a memory and one or more processors coupled to the memory. The one or more processors configured to: transmit, to a second wireless node, an indication of an assisting node to be used to establish a communication connection between the first wireless node and the second wireless node, the indication including identifying information associated with the assisting node; and establish the communication connection with the second wireless node using the assisting node.

In some aspects, a non-transitory computer-readable medium storing a set of instructions for wireless communication includes one or more instructions that, when executed by one or more processors of a first wireless node, cause the first wireless node to: receive, from a control node or a second wireless node, an indication of an assisting node to be used to establish a communication connection between the first wireless node and the second wireless node, the indication including identifying information associated with the assisting node; and establish the communication connection with the second wireless node using the assisting node.

In some aspects, a non-transitory computer-readable medium storing a set of instructions for wireless communication includes one or more instructions that, when executed by one or more processors of a control node, cause the control node to: transmit, to at least one of a first wireless node or a second wireless node, an indication of an assisting node to be used to establish a communication connection between the first wireless node and the second wireless node, the indication including identifying information associated with the assisting node; and transmit, to at least one of the first wireless node or the second wireless node, an indication of resources to be used to establish the communication connection between the first wireless node and the second wireless node.

In some aspects, a non-transitory computer-readable medium storing a set of instructions for wireless communication includes one or more instructions that, when executed by one or more processors of a first wireless node, cause the first wireless node to: transmit, to a second wireless node, an indication of an assisting node to be used to establish a communication connection between the first wireless node and the second wireless node, the indication including identifying information associated with the assisting node; and establish the communication connection with the second wireless node using the assisting node.

In some aspects, an apparatus for wireless communication includes means for receiving, from a control node or a wireless node, an indication of an assisting node to be used to establish a communication connection between the apparatus and the wireless node, the indication including identifying information associated with the assisting node; and means for establishing the communication connection with the wireless node using the assisting node.

In some aspects, an apparatus for wireless communication includes means for transmitting, to at least one of a first wireless node or a second wireless node, an indication of an assisting node to be used to establish a communication connection between the first wireless node and the second wireless node, the indication including identifying information associated with the assisting node; and means for transmitting, to at least one of the first wireless node or the second wireless node, an indication of resources to be used to establish the communication connection between the first wireless node and the second wireless node.

In some aspects, an apparatus for wireless communication includes means for transmitting, to a wireless node, an indication of an assisting node to be used to establish a communication connection between the apparatus and the wireless node, the indication including identifying information associated with the assisting node; and means for establishing the communication connection with the wireless node using the assisting node.

In some aspects, a method of wireless communication performed by a first wireless node includes receiving, from a second wireless node, an indication of one or more assisting nodes, the indication including identifying information for each assisting node, of the one or more assisting nodes, that enables the first wireless node to communicate using the one or more assisting nodes; and communicating, with the second wireless node or another wireless node, using at least one assisting node of the one or more assisting nodes.

In some aspects, a method of wireless communication performed by a first wireless node includes determining identifying information for one or more assisting nodes; and transmitting, to a second wireless node, an indication of the one or more assisting nodes, the indication including identifying information for each assisting node, of the one or more assisting nodes, that enables the second wireless node to communicate using the one or more assisting nodes.

In some aspects, a method of wireless communication performed by a first wireless node includes receiving, from a control node or a second wireless node, an indication of one or more assisting nodes associated with the second wireless node, the indication including identifying information for each assisting node, of the one or more assisting nodes, that enables the first wireless node to communicate with the second wireless node using the one or more assisting nodes; and communicating, with the second wireless node, using an assisting node of the one or more assisting nodes.

In some aspects, a first wireless node for wireless communication includes a memory and one or more processors coupled to the memory. The one or more processors may be configured to: receive, from a second wireless node, an indication of one or more assisting nodes, the indication including identifying information for each assisting node, of the one or more assisting nodes, that enables the first wireless node to communicate using the one or more assisting nodes; and communicate, with the second wireless node or another wireless node, using at least one assisting node of the one or more assisting nodes.

In some aspects, a first wireless node for wireless communication includes a memory and one or more processors coupled to the memory. The one or more processors may be configured to: determine identifying information for one or more assisting nodes; and transmit, to a second wireless node, an indication of the one or more assisting nodes, the indication including identifying information for each assisting node, of the one or more assisting nodes, that enables the second wireless node to communicate using the one or more assisting nodes.

In some aspects, a first wireless node for wireless communication includes a memory and one or more processors coupled to the memory. The one or more processors may be configured to: receive, from a control node or a second wireless node, an indication of one or more assisting nodes associated with the second wireless node, the indication including identifying information for each assisting node, of the one or more assisting nodes, that enables the first wireless node to communicate with the second wireless node using the one or more assisting nodes; and communicate, with the second wireless node, using an assisting node of the one or more assisting nodes.

In some aspects, a non-transitory computer-readable medium storing a set of instructions for wireless communication includes one or more instructions that, when executed by one or more processors of a first wireless node, cause the first wireless node to: receive, from a second wireless node, an indication of one or more assisting nodes, the indication including identifying information for each assisting node, of the one or more assisting nodes, that enables the first wireless node to communicate using the one or more assisting nodes; and communicate, with the second wireless node or another wireless node, using at least one assisting node of the one or more assisting nodes.

In some aspects, a non-transitory computer-readable medium storing a set of instructions for wireless communication includes one or more instructions that, when executed by one or more processors of a first wireless node, cause the first wireless node to: determine identifying information for one or more assisting nodes; and transmit, to a second wireless node, an indication of the one or more assisting nodes, the indication including identifying information for each assisting node, of the one or more assisting nodes, that enables the second wireless node to communicate using the one or more assisting nodes.

In some aspects, a non-transitory computer-readable medium storing a set of instructions for wireless communication includes one or more instructions that, when executed by one or more processors of a first wireless node, cause the first wireless node to: receive, from a control node or a second wireless node, an indication of one or more assisting nodes associated with the second wireless node, the indication including identifying information for each assisting node, of the one or more assisting nodes, that enables the first wireless node to communicate with the second wireless node using the one or more assisting nodes; and communicate, with the second wireless node, using an assisting node of the one or more assisting nodes.

In some aspects, an apparatus for wireless communication includes means for receiving, from a wireless node, an indication of one or more assisting nodes, the indication including identifying information for each assisting node, of the one or more assisting nodes, that enables the apparatus to communicate using the one or more assisting nodes; and means for communicating, with the wireless node or another wireless node, using at least one assisting node of the one or more assisting nodes.

In some aspects, an apparatus for wireless communication includes means for determining identifying information for one or more assisting nodes; and means for transmitting, to a wireless node, an indication of the one or more assisting nodes, the indication including identifying information for each assisting node, of the one or more assisting nodes, that enables the wireless node to communicate using the one or more assisting nodes.

In some aspects, an apparatus for wireless communication includes means for receiving, from a control node or a wireless node, an indication of one or more assisting nodes associated with the wireless node, the indication including identifying information for each assisting node, of the one or more assisting nodes, that enables the apparatus to communicate with the wireless node using the one or more assisting nodes; and means for communicating, with the wireless node, using an assisting node of the one or more assisting nodes.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
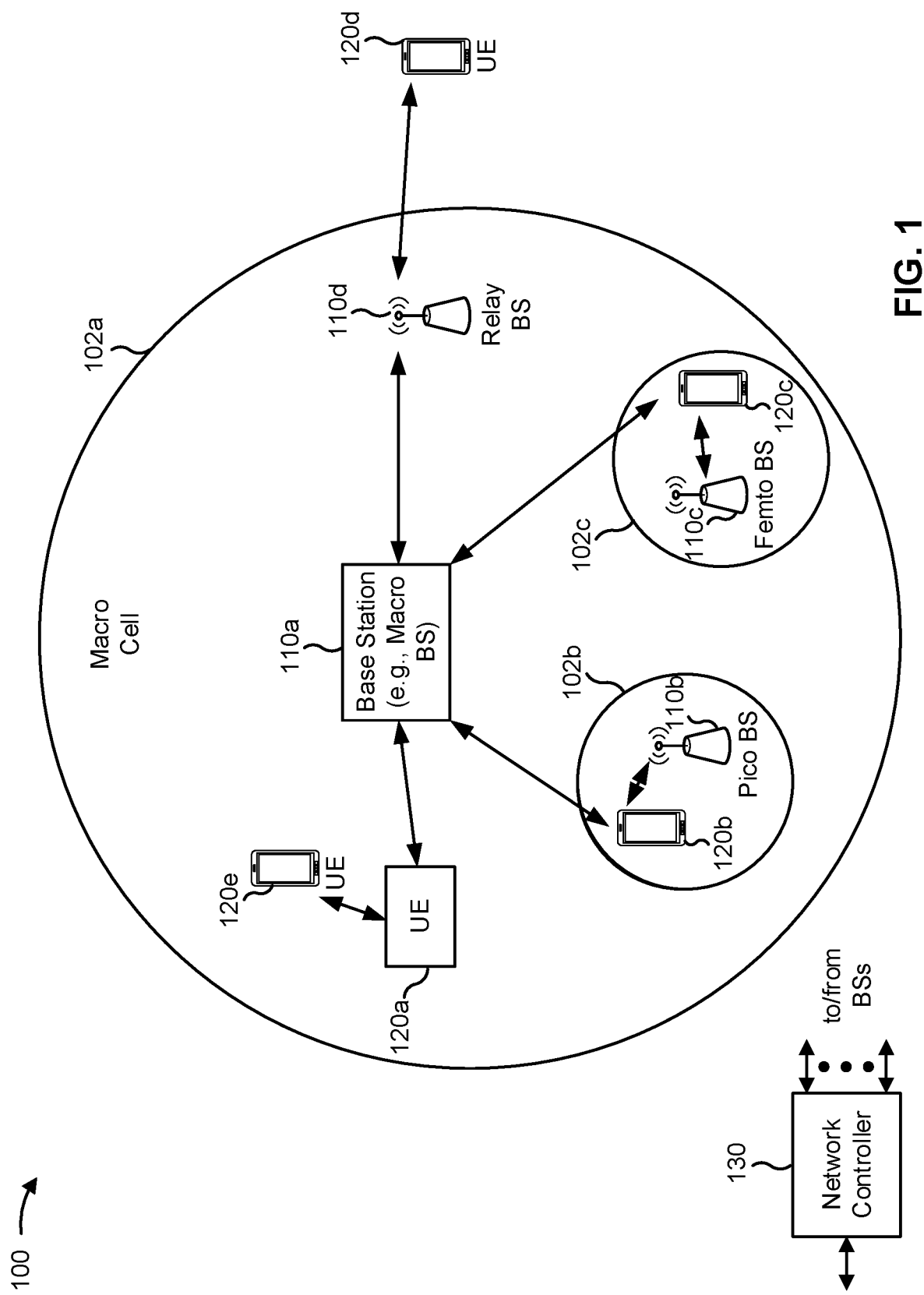
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
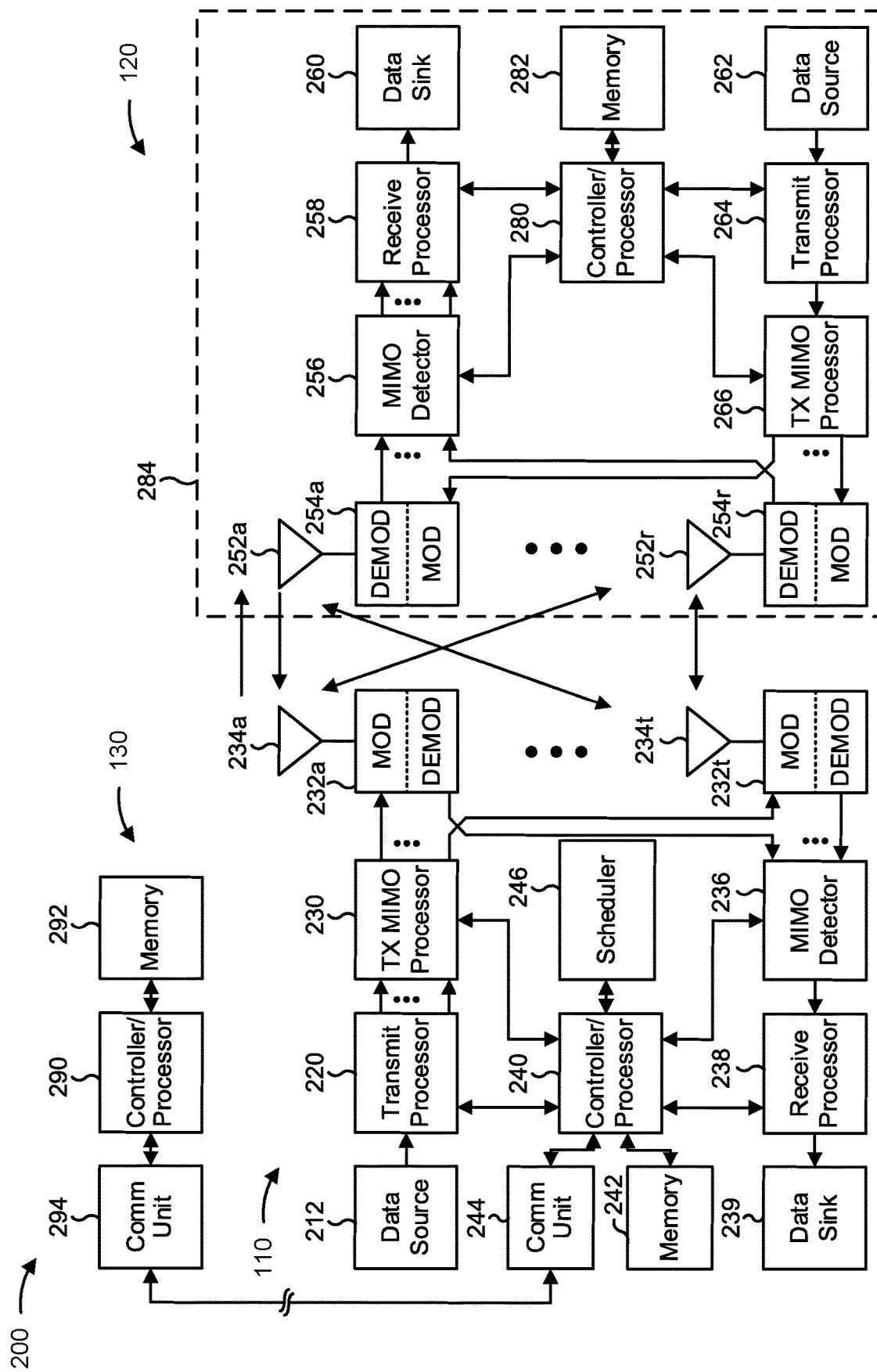
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-19).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-19).

Controller/processor 240 of base station 110, controller/processor 280 of UE 120, and/or any other component(s) of FIG. 2 may perform one or more techniques associated with identification and utilization of assisting nodes, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, a first wireless node (e.g., a UE 120, a base station 110, an integrated access and backhaul (IAB) node, and/or an IAB donor) includes means for receiving, from a control node or a second wireless node, an indication of an assisting node to be used to establish a communication connection between the first wireless node and the second wireless node, the indication including identifying information associated with the assisting node; and/or means for establishing the communication connection with the second wireless node using the assisting node. The means for the first wireless node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. In some aspects, the means for the first wireless node to perform operations described herein may include and/or antenna 252, demodulator 254, MIMO detector 256, receive processor 258, transmit processor 264, TX MIMO processor 266, modulator 254, controller/processor 280, and/or memory 282.

In some aspects, a control node (e.g., a base station 110, a UE 120, an IAB node, and/or an IAB donor) includes means for transmitting, to at least one of a first wireless node or a second wireless node, an indication of an assisting node to be used to establish a communication connection between the first wireless node and the second wireless node, the indication including identifying information associated with the assisting node; and/or means for transmitting, to at least one of the first wireless node or the second wireless node, an indication of resources to be used to establish the communication connection between the first wireless node and the second wireless node. The means for the control node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. In some aspects, the means for the control node to perform operations described herein may include antenna 252, demodulator 254, MIMO detector 256, receive processor 258, transmit processor 264, TX MIMO processor 266, modulator 254, controller/processor 280, and/or memory 282.

In some aspects, a first wireless node (e.g., a UE 120, a base station 110, an IAB node, and/or an IAB donor) includes means for transmitting, to a second wireless node, an indication of an assisting node to be used to establish a communication connection between the first wireless node and the second wireless node, the indication including identifying information associated with the assisting node; and/or means for establishing the communication connection with the second wireless node using the assisting node. The means for the first wireless node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. In some aspects, the means for the first wireless node to perform operations described herein may include antenna 252, demodulator 254, MIMO detector 256, receive processor 258, transmit processor 264, TX MIMO processor 266, modulator 254, controller/processor 280, and/or memory 282.

In some aspects, a wireless node (e.g., a UE 120, a base station 110, or an IAB node) includes means for receiving, from a second wireless node, an indication of one or more assisting nodes, the indication including identifying information for each assisting node, of the one or more assisting nodes, that enables the wireless node to communicate using the one or more assisting nodes; and/or means for communicating, with the second wireless node or another wireless node, using at least one assisting node of the one or more assisting nodes. The means for the wireless node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. In some aspects, the means for the wireless node to perform operations described herein may include antenna 252, demodulator 254, MIMO detector 256, receive processor 258, transmit processor 264, TX MIMO processor 266, modulator 254, controller/processor 280, and/or memory 282.

In some aspects, a wireless node (e.g., a UE 120, a base station 110, or an IAB node) includes means for determining identifying information for one or more assisting nodes; and/or means for transmitting, to a second wireless node, an indication of the one or more assisting nodes, the indication including identifying information for each assisting node, of the one or more assisting nodes, that enables the second wireless node to communicate using the one or more assisting nodes. The means for the wireless node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. In some aspects, the means for the wireless node to perform operations described herein may include antenna 252, demodulator 254, MIMO detector 256, receive processor 258, transmit processor 264, TX MIMO processor 266, modulator 254, controller/processor 280, and/or memory 282.

In some aspects, a wireless node (e.g., a UE 120, a base station 110, or an IAB node) includes means for receiving, from a control node or a second wireless node, an indication of one or more assisting nodes associated with the second wireless node, the indication including identifying information for each assisting node, of the one or more assisting nodes, that enables the wireless node to communicate with the second wireless node using the one or more assisting nodes; and/or means for communicating, with the second wireless node, using an assisting node of the one or more assisting nodes. The means for the wireless node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. In some aspects, the means for the wireless node to perform operations described herein may include antenna 252, demodulator 254, MIMO detector 256, receive processor 258, transmit processor 264, TX MIMO processor 266, modulator 254, controller/processor 280, and/or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
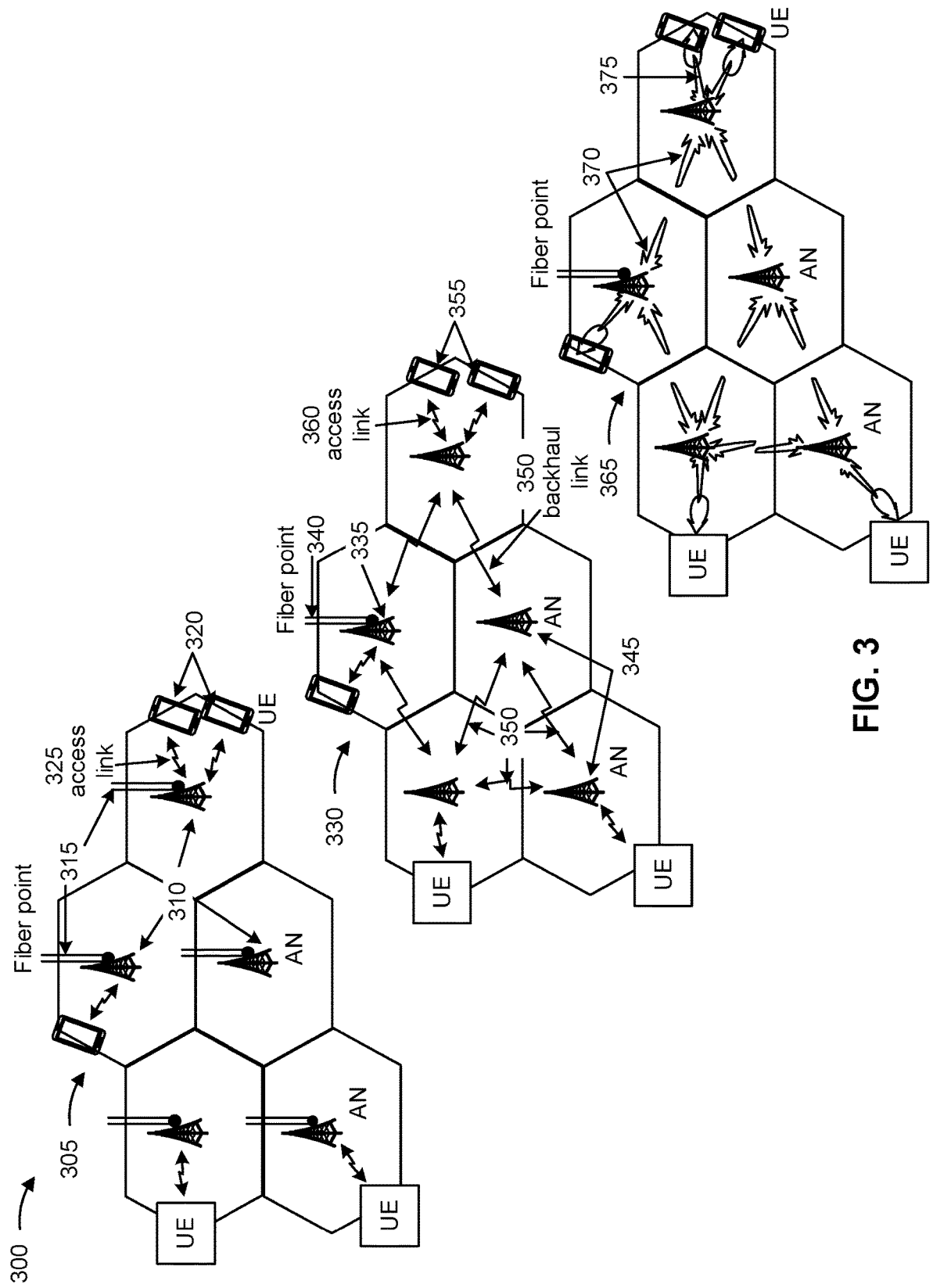
FIG. 3 is a diagram illustrating examples of radio access networks, in accordance with the disclosure.

FIG. 3 is a diagram illustrating examples 300 of radio access networks, in accordance with the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic.

Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
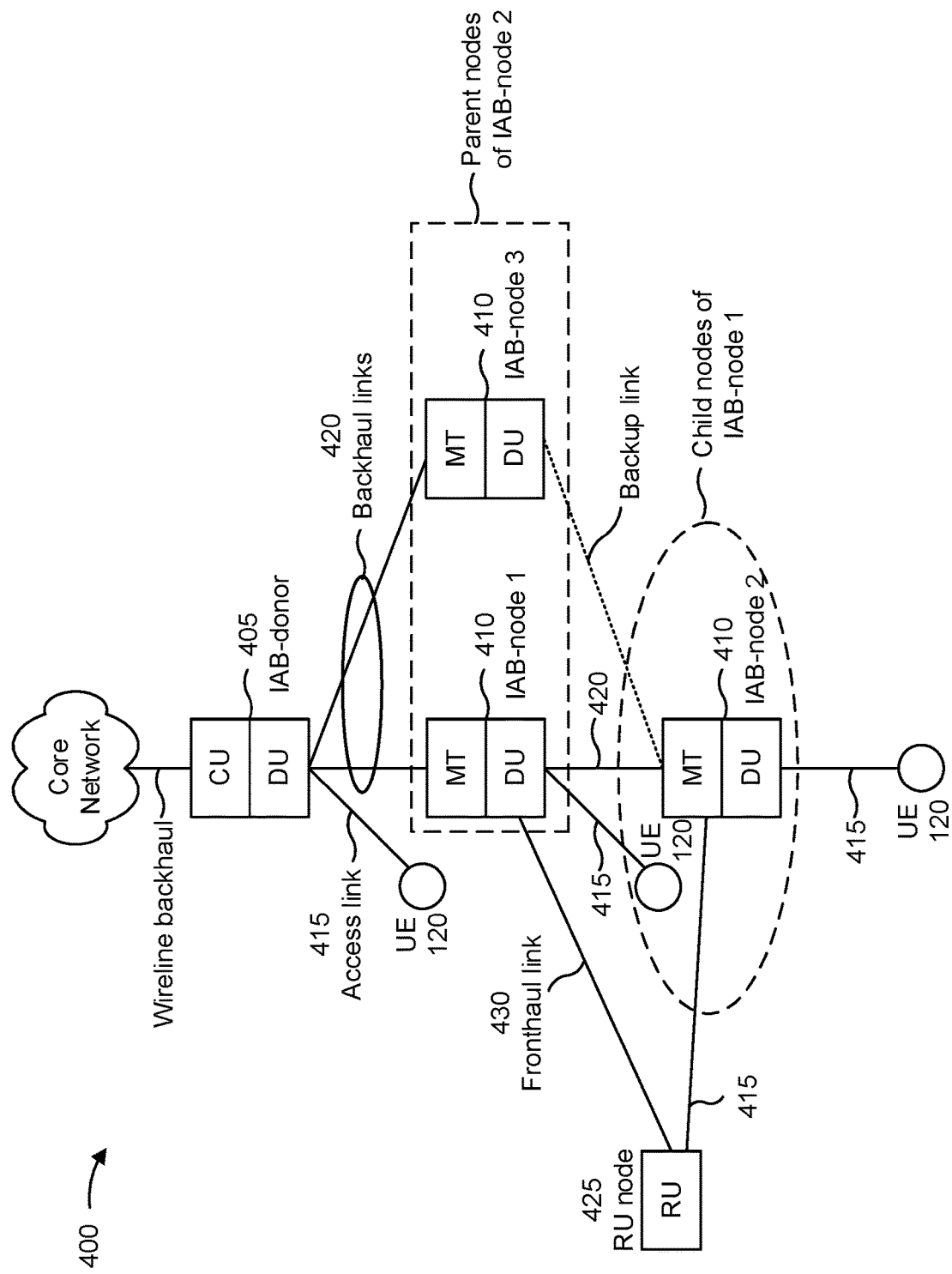
FIG. 4 is a diagram illustrating an example of an integrated access and backhaul (IAB) network architecture, in accordance with the disclosure.

FIG. 4 is a diagram illustrating an example 400 of an IAB network architecture, in accordance with the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., a mobile termination (MT) unit and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (F1-AP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

In some aspects, an IAB node 410 (e.g., a parent node) may be unable to communicate with another IAB node 410 (e.g., a child node) using a direct access link. For example, IAB-node 2 may be outside of a communication range of IAB-node 1 (e.g., an IAB-node 3), the direct access link between IAB-node 1 and IAB-node 2 may be blocked, and/or the like. IAB-node 1 may utilize a remote unit (RU) node 425 (e.g., an assisting node, a relay node, a repeater node, and/or a reflector node, among other examples) to communicate with IAB-node 2. The IAB-node 1 (e.g., the DU of IAB-node 1) may communicate with the RU node 425 using a fronthaul link 430. For example, the IAB-node 1 may transmit a communication to the RU node 425 using the fronthaul link 430. The RU node 425 may forward the communication to the IAB-node 2 using an access link 415 between the IAB-node 2 and the RU node 425. In this way, the IAB-node 1 may extend coverage of the IAB-node 1 and communicate with the IAB-node 2 when the IAB-node 1 is unable to use a direct access link between IAB-node 1 and IAB-node 2 for direct communications.

As indicated above, FIG. 4 is provided as an example. Other examples may differ from what is described with regard to FIG. 4.

Figure 5:
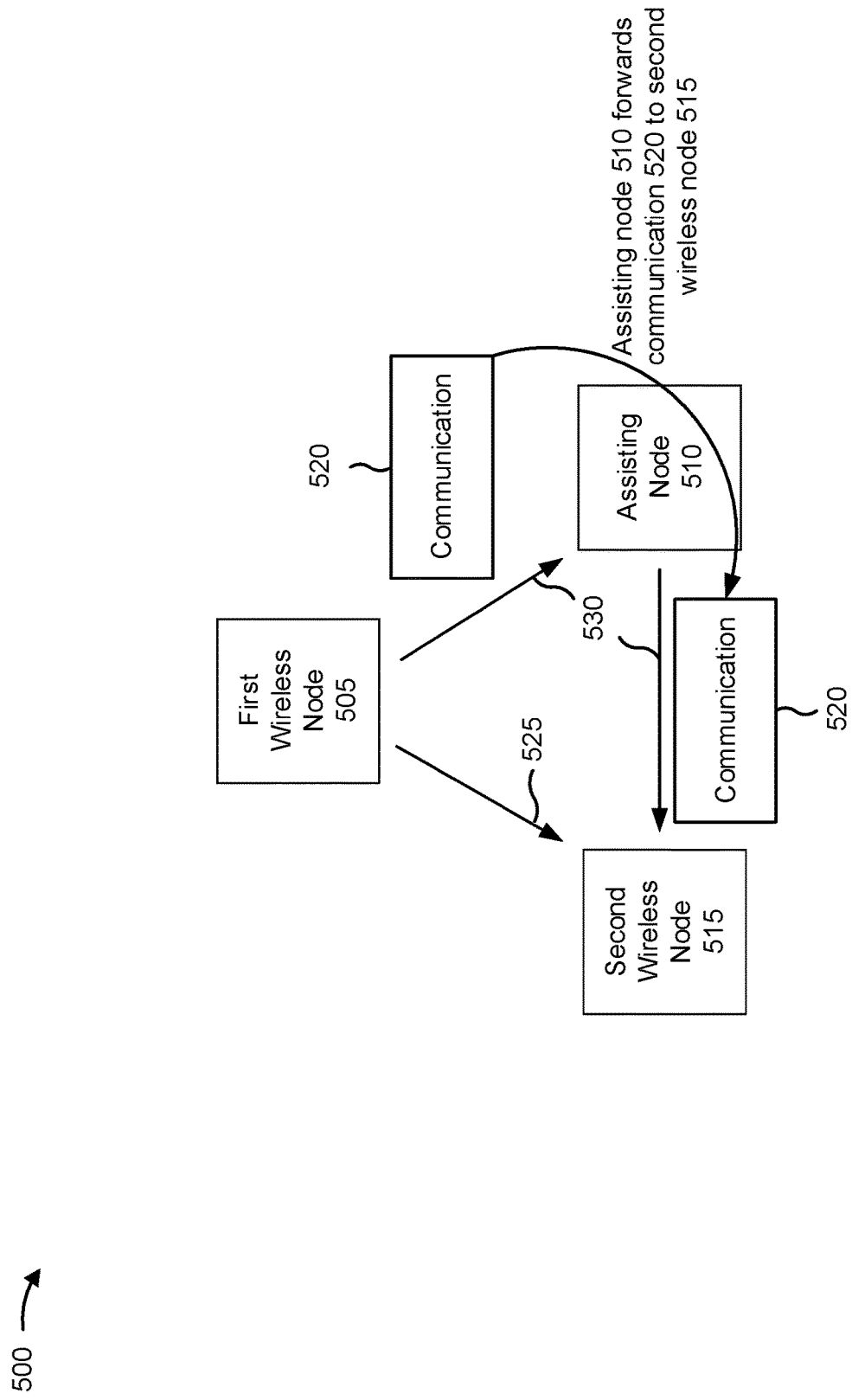
FIG. 5 is a diagram illustrating an example of an assisting node that forwards communications between a first wireless node and a second wireless node, in accordance with the present disclosure.

FIG. 5 is a diagram illustrating an example 500 of an assisting node that forwards communications between a first wireless node and a second wireless node, in accordance with the present disclosure. As shown, example 500 includes a first wireless node 505 (e.g., an IAB node, an IAB donor, a base station 110, or a UE 120, among other examples), an assisting node 510 (e.g., a repeater device, a relay device, a reflector device, a reflecting intelligent surface (RIS), an intelligent reflecting surface (IRS), or an RU, among other examples), and a second wireless node 515 (e.g., an IAB node, an IAB donor, a base station 110, or a UE 120, among other examples). In example 500, the first wireless node 505 and/or the second wireless node 515 may be aware of the assisting node 510. In some aspects, the first wireless node 505 and/or the second wireless node 515 may be unaware of the assisting node 510.

In some aspects, the assisting node 510 may be a non-configurable assisting node 510. For example, the assisting node 510 may be pre-configured with one or more parameters for forwarding communications. In some aspects, a non-configurable assisting node 510 may be capable of determining or re-configuring the one or more parameters based at least in part on forwarding one or more communications. For example, the non-configurable assisting node 510 may be capable of autonomously adjusting the one or more pre-configured parameters for forwarding communications based at least in part on forwarding one or more communications.

In some aspects, the assisting node 510 may be a configurable assisting node 510. For example, the assisting node 510 may be configured by a control node (e.g., a CU of an IAB donor, a DU of an IAB node, or a base station, among other examples). The assisting node 510 may communicate with the control node using a control interface. The control node may indicate one or more parameters for forwarding communications, one or more wireless nodes that the assisting node 510 is to communicate with (e.g., the first wireless node 505 and the second wireless node 515, as shown in FIG. 5), or one or more resource allocations for the assisting node 510, among other examples. The one or more parameters for forwarding communications may include a transmit power setting or configuration, a transmit beam configuration, a receive beam configuration, a forwarding communication direction (e.g., uplink or downlink), a reflecting coefficient, or a reflecting direction or angle, among other examples.

As shown in FIG. 5, the first wireless node 505 may attempt to transmit a communication 520 (e.g., a data communication, a control communication, and/or the like) to the second wireless node 515 using a direct link 525 (e.g., an access link or a side link) between the first wireless node 505 and the second wireless node 515. However, the first wireless node 505 may be unable to transmit the communication 520 to the second wireless node 515 using the direct link 525. For example, the second wireless node 515 may be outside of a transmit range of the first wireless node 505 or the direct link 525 may be blocked, among other examples. In some aspects, the first wireless node 505 may be unable to transmit the communication 520 to the second wireless node 515 using the direct link 525 due to a direction of the communication 520. For example, a regulatory body may restrict a direction (e.g., an angle) in which the first wireless node 505 is permitted to transmit (e.g., a regulatory body may indicate that the first wireless node 505 cannot transmit at an upward angle, among other examples).

In some aspects, the first wireless node 505 may utilize the assisting node 510 to transmit communication 520 to the second wireless node 515 to utilize an alternative communication path (e.g., different than the direct link 525) to the second wireless node 515. For example, the direct link 525 may be associated with poor reliability or may be restricted due to a maximum permissible exposure (MPE) limit. The alternative communication path to the second wireless node 515 (e.g., an indirect link 530 through the assisting node 510) may provide increased reliability, provide increased spatial diversity, allow for higher order MIMO operations, allow for full-duplex communications, and/or may enable the first wireless node 505 to transmit communication 520 to the second wireless node 515 when a use of the direct link 525 is restricted (such as due to an MPE limit), among other examples.

Therefore, the first wireless node 505 may communicate with the second wireless node 515 using an indirect link 530. For example, the first wireless node 505 may transmit the communication 520 to the assisting node 510. In some aspects, the first wireless node 505 may transmit the communication 520 directly to the assisting node 510 (e.g., when the first wireless node 505 is aware of the assisting node 510). In some aspects, the assisting node 510 may be configured (e.g., by a control node or by the second wireless node 515) to receive the communication 520 from the first wireless node 505 (e.g., when the first wireless node 505 is unaware of the assisting node 510).

As shown in FIG. 5, the communication 520 may pass through the assisting node 510 and be forwarded by the assisting node 510. For example, the assisting node 510 may receive the communication 520 and may repeat the communication 520 (e.g., may receive the communication 520, perform analog processing of the communication 520, apply a beamforming gain to the communication 520, and transmit the communication 520 to the second wireless node 515). In some aspects, the assisting node 510 may receive the communication 520 and may reflect the communication 520 to the second wireless node 515.

In some cases, an indirect link 530 may be an access link, a side link, or a fronthaul link. For example, if the first wireless node 505 is a base station 110 and the second wireless node 515 is a UE 120, the indirect link 530 between the first wireless node 505 and the assisting node 510 may be a fronthaul link. The indirect link 530 between the assisting node 510 and the second wireless node 515 may be an access link. Using the communication scheme shown in FIG. 5 may improve network performance and increase reliability by providing the first wireless node 505 and/or the second wireless node 515 with a link diversity for communications, or by extending a communication coverage area of the first wireless node 505 and/or the second wireless node 515, among other examples.

As described above, in some cases, a wireless node (e.g., the first wireless node 505 and/or the second wireless node 515) may be unaware of the assisting node 510 (e.g., the assisting node 510 may be deployed transparently in a wireless network, such that wireless nodes within the wireless network are not made aware of the existence of the assisting node 510). In some cases, a wireless node may not become aware of an assisting node 510 until the assisting node 510 initiates an establishment of a communication link (e.g., a communication interface such as a control interface) between the wireless node and the assisting node 510. For example, the assisting node 510 may initiate an initial establishment of a communication interface between the wireless node and the assisting node 510 (e.g., in a similar manner to an initial access procedure performed between a UE and a base station). However, prior to the assisting node 510 initiating the initial establishment of the communication interface between the wireless node and the assisting node 510, the wireless node may be unaware of the assisting node 510. Moreover, when the assisting node 510 is transparently deployed in the wireless network (e.g., when the assisting node 510 is a non-configurable assisting node), the wireless node may never become aware of the assisting node 510. As a result, the wireless node may be unable to identify the assisting node 510 and may be unable to determine when and/or how to utilize the assisting node 510 to assist with communications that are transmitted and/or received by the wireless node.

Some techniques and apparatuses described herein enable efficient identification and utilization of assisting nodes. For example, a wireless node may receive identifying information for one or more assisting nodes deployed within a wireless network. The identifying information for an assisting node may include an identifier associated with the assisting node, location information associated with the assisting node, capability information associated with the assisting node, receiving directions associated with the assisting node, or forwarding directions associated with the assisting node, among other examples. In some aspects, the wireless node may transmit, to another wireless node, an indication of identifying information for one or more assisting nodes that is acquired by the wireless node.

In some aspects, the wireless node may determine one or more relevant assisting nodes (e.g., assisting nodes located within a coverage area associated with the wireless node) and may transmit an indication of the one or more relevant nodes (e.g., and associated identifying information) to one or more other wireless nodes. In some aspects, the wireless node may transmit, to one or more other wireless nodes, an indication of one or more assisting nodes assigned to the wireless node (e.g., assisting nodes being used by the wireless node and/or assisting nodes dedicated to the wireless node).

The wireless node (and/or another wireless node that is trying to initiate a communication link with the wireless node) may receive an indication of an assisting node (and associated identifying information) and resources that the wireless node is to use for initial access with the assisting node (e.g., for establishing a communication link). The wireless node and the other wireless node that is trying to initiate the communication link with the wireless node may be enabled to utilize the assisting node and associated resources to perform an initial access procedure to establish a communication link using the assisting node.

As a result, the wireless node may be enabled to utilize an assisting node to transmit or receive communications from another wireless node. In some aspects, the wireless node may be enabled to utilize the identifying information associated with an assisting node for interference management, beam management, power control, resource allocation, scheduling, mobility and handover procedures, or positioning, among other examples. As a result, the wireless node may be enabled to make improved determinations regarding how or when to utilize an assisting node for communications. Moreover, an efficiency of communications within the wireless network may be improved based at least in part on the availability of the identifying information for assisting nodes within the wireless network.

As indicated above, FIG. 5 is provided as an example. Other examples may differ from what is described with respect to FIG. 5.

Figure 6:
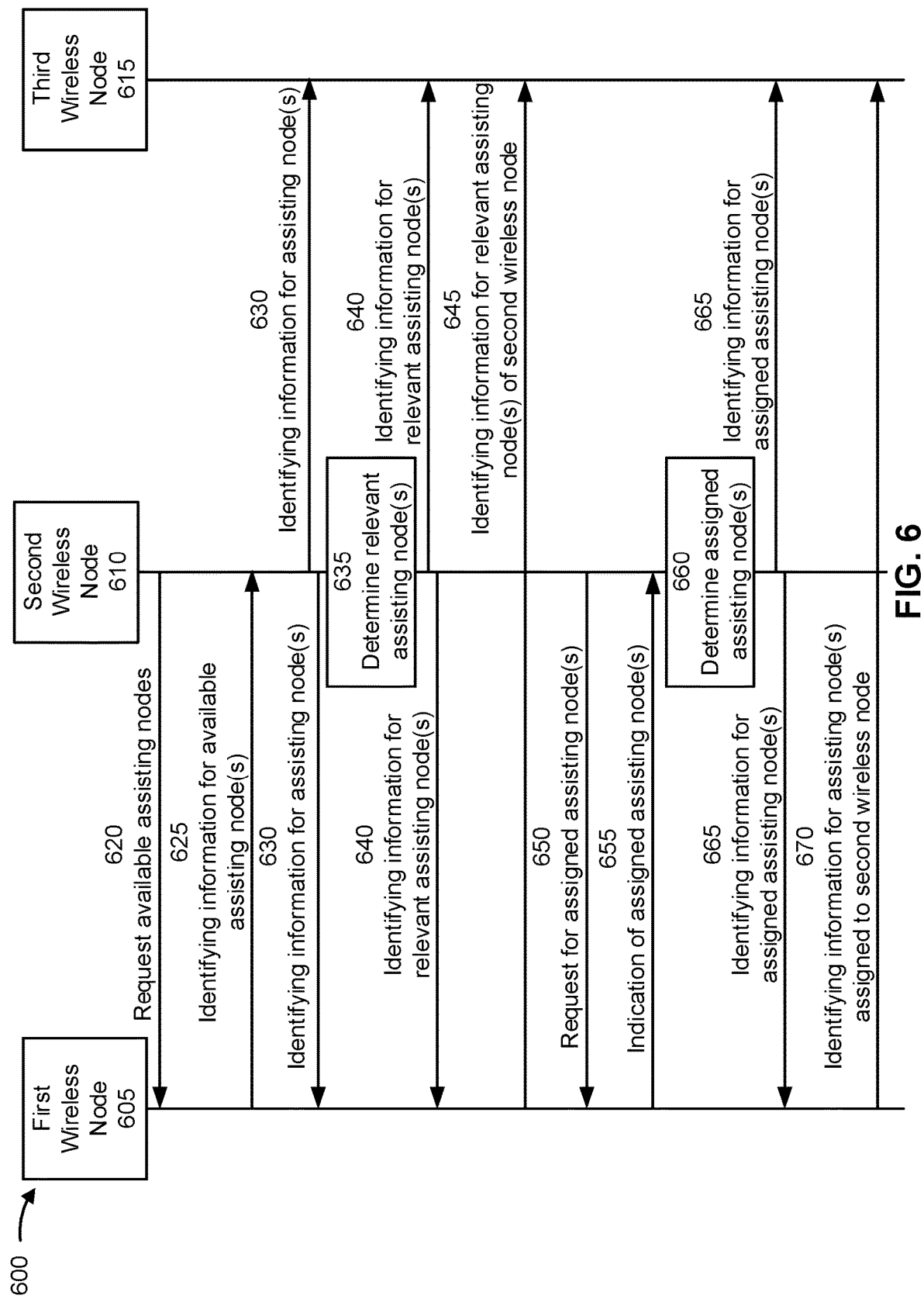
FIG. 6 is a diagram illustrating an example associated with identification of assisting nodes, in accordance with the present disclosure.

FIG. 6 is a diagram illustrating an example 600 associated with identification of assisting nodes, in accordance with the present disclosure. As shown in FIG. 6, a first wireless node 605, a second wireless node 610, and a third wireless node 615 may communicate with one another in a wireless network (e.g., wireless network 100). In some aspects, the first wireless node 605 may be a control node or an intermediate wireless node, such as a base station 110, a CU of an IAB donor, a DU of an IAB node, a parent IAB node, a UE 120, a roadside unit (RSU), a core network device, or an operations, administration, and maintenance (OAM) module, among other examples. In some aspects, the second wireless node 610 and/or the third wireless node 615 may be a CU of an IAB donor, a DU of an IAB node, an MT component of an IAB node, a UE 120, or a base station 110, among other examples.

As shown by reference number 620, the second wireless node 610 may transmit, and the first wireless node 605 may receive, a request for available assisting nodes (e.g., repeater nodes, reflector nodes, configurable assisting nodes, and/or non-configurable assisting nodes) that are deployed in the wireless network. The request for available assisting nodes may be a request for identifying information associated with the assisting nodes (e.g., information that enables the second wireless node 610 to identify, locate, and/or utilize the assisting nodes).

As shown by reference number 625, the first wireless node 605 may transmit, and the second wireless node 610 may receive, an indication of one or more available assisting nodes deployed in the wireless network. The indication may include identifying information for each assisting node, of the one or more assisting nodes. For example, the first wireless node 605 may transmit a list of one or more available assisting nodes deployed in the wireless network. For each assisting node included in the list, the list may indicate identifying information associated with the assisting node.

In some aspects, identifying information for an assisting node may include identification information and/or configuration information associated with the assisting node. For example, the identifying information for an assisting node may include an identifier associated with the assisting node (e.g., a unique identifier associated with the assisting node, and/or an index value associated with the assisting node), location information associated with the assisting node, a type associated with the assisting node (e.g., whether the assisting node is a repeater device, reflector device, a configurable assisting node, or a non-configurable assisting node, among other examples), capability information associated with the assisting node, receiving directions (or angles) associated with the assisting node, or forwarding (or reflecting) directions (or angles) associated with the assisting node, among other examples.

The location information associated with the assisting node may include absolute location information associated with the assisting node, relative location information associated with the assisting node, spatial direction information associated with the assisting node, a distance between the assisting node and the second wireless node 610 or between the assisting node and a different wireless node (e.g., the first wireless node 605, the third wireless node 615, and/or another wireless node), or geographical coordinates associated with the assisting node. The capability information associated with the assisting node may include one or more current configurations of the assisting node and/or one or more permitted configurations of the assisting node. For example, the capability information associated with the assisting node may indicate one or more parameters used by the assisting node to forward communications, such as a transmit power setting or configuration, a transmit beam configuration, a receive beam configuration, a forwarding communication direction (e.g., uplink or downlink), a reflecting coefficient, or a reflecting direction or angle, among other examples.

In some aspects, the first wireless node 605 may transmit the indication of the one or more available assisting nodes deployed in the wireless network via an interface between the first wireless node 605 and the second wireless node 610. For example, the interface may be an OAM interface, an F1 application protocol (F1-AP) interface, a direct link interface (e.g., a Uu interface), or a side link interface (e.g., a PC5 interface), among other examples.

For example, the first wireless node 605 may be an OAM module and the OAM module may transmit the indication of the one or more available assisting nodes deployed in the wireless network to the second wireless node 610, which may be a CU of an IAB donor, a DU of an IAB node, an IAB node, or a UE 120, among other examples. In some aspects, the first wireless node 605 may be a core network device and the core network device may transmit the indication of the one or more available assisting nodes deployed in the wireless network to the second wireless node 610, which may be a CU of an IAB donor, a DU of an IAB node, or a UE 120, among other examples. In some aspects, the first wireless node 605 may be a CU of an IAB donor and the CU may transmit the indication of the one or more available assisting nodes deployed in the wireless network to the second wireless node 610, which may be a DU of an IAB node (e.g., where the indication is transmitted via an F1-AP interface), an MT component of an IAB node, or a UE 120.

In some aspects, the first wireless node 605 may be a DU of a parent IAB node and the DU may transmit the indication of the one or more available assisting nodes deployed in the wireless network to the second wireless node 610, which may be an MT component of a child IAB node (e.g., where the indication is transmitted via a Uu interface), among other examples. In some aspects, the first wireless node 605 may be a DU of an IAB node and the DU may transmit the indication of the one or more available assisting nodes deployed in the wireless network to the second wireless node 610, which may be a UE 120, among other examples. In some aspects, the first wireless node 605 may be a UE 120 or an RSU, and the UE 120 or the RSU may transmit the indication of the one or more available assisting nodes deployed in the wireless network to the second wireless node 610, which may be a UE 120 (e.g., where the indication is transmitted via an PC5 interface), among other examples.

In some aspects, the first wireless node 605 may transmit the indication of the one or more available assisting nodes deployed in the wireless network via an RRC message (e.g., when the first wireless node 605 is a CU or a base station 110, among other examples). In some aspects, the first wireless node 605 may transmit the indication of the one or more available assisting nodes deployed in the wireless network via a medium access control (MAC) control element (MAC-CE) message (e.g., when the first wireless node 605 is a DU, among other examples). While the above examples have been described with respect to the indication of the one or more available assisting nodes, the above examples may apply to other communications between first wireless node 605 and the second wireless node 610 (or between the first wireless node 605 and the third wireless node 615) described herein.

As shown by reference number 630, the second wireless node 610 may transmit, to one or more other wireless nodes (e.g., the first wireless node 605, the second wireless node 610, and/or other wireless nodes), an indication of identifying information for one or more assisting nodes that has been acquired (e.g., received and/or determined) by the second wireless node 610. For example, the second wireless node 610 may receive an indication of one or more wireless nodes and associated identifying information, such as from the first wireless node 605 as described above. In some aspects, the second wireless node 610 may determine identifying information associated with an assisting node based at least in part on communicating with the assisting node. In some aspects, a child node of the second wireless node 610 or a node that is being served by the second wireless node 610 may detect an assisting node. The child node and/or served node may transmit an indication of the assisting node (e.g., and associated identifying information) to the second wireless node 610. The second wireless node 610 may compile and/or store a list of assisting nodes (e.g., and associated identifying information). In some aspects, the second wireless node 610 may transmit, to another wireless node, the indication of the identifying information for the one or more assisting nodes that has been acquired by the second wireless node 610 based at least in part on receiving a request, from the other wireless node, for identifying information associated with assisting nodes.

In some aspects, the second wireless node 610 may be a CU and the CU may transmit the indication of the identifying information for the one or more assisting nodes that has been acquired by the CU to another CU, a core network device, and/or an OAM module, among other examples. In some aspects, the second wireless node 610 may be a DU and the DU may transmit the indication of the identifying information for the one or more assisting nodes that has been acquired by the DU to a CU and/or an OAM module, among other examples. In some aspects, the second wireless node 610 may be an IAB node and the IAB node may transmit the indication of the identifying information for the one or more assisting nodes that has been acquired by the IAB node to a parent node of the IAB node, a CU, and/or a core network device, among other examples. In some aspects, the second wireless node 610 may be a UE 120 and the UE 120 may transmit the indication of the identifying information for the one or more assisting nodes that has been acquired by the UE 120 to a DU, a CU, a core network device, an OAM module, another UE 120, and/or an RSU, among other examples.

In some aspects, the second wireless node 610 may broadcast the indication of the identifying information for the one or more assisting nodes that has been acquired by the second wireless node 610. For example, the second wireless node 610 may broadcast the indication of the identifying information for the one or more assisting nodes that has been acquired by the second wireless node 610 in a system information block (SIB) (e.g., when the second wireless node 610 is a DU, among other examples). In some aspects, the second wireless node 610 may broadcast the indication of the identifying information for the one or more assisting nodes that has been acquired by the second wireless node 610 over a side link channel (e.g., when the second wireless node 610 is a UE 120, among other examples).

As shown by reference number 635, the second wireless node 610 may determine one or more relevant assisting nodes. For example, the second wireless node 610 may determine one or more assisting nodes that are within a coverage area associated with the second wireless node 610. Therefore, the one or more relevant assisting nodes may be available for, or may be capable of assisting with, communications with the second wireless node 610. In some aspects, the second wireless node 610 may determine the one or more relevant assisting nodes based at least in part on identifying information for one or more assisting nodes that has been acquired by the second wireless node 610.

As shown by reference number 640, the second wireless node 610 may transmit, to one or more other wireless nodes (e.g., the first wireless node 605, the second wireless node 610, and/or other wireless nodes), an indication of identifying information for the one or more relevant assisting nodes. In some aspects, the second wireless node 610 may transmit the indication of the identifying information for the one or more relevant assisting nodes based at least in part on receiving a request for an indication of relevant assisting nodes associated with the second wireless node 610. In some aspects, the second wireless node 610 may transmit the indication of the identifying information for the one or more relevant assisting nodes to a wireless node that transmitted the request. In some aspects, the second wireless node 610 may transmit the indication of the identifying information for the one or more relevant assisting nodes to a different wireless node than the wireless node that transmitted the request (e.g., the first wireless node 605 may request that the second wireless node 610 transmit the indication of the identifying information for the one or more relevant assisting nodes to the third wireless node 615).

The second wireless node 610 may transmit the indication of the identifying information for the one or more relevant assisting nodes in a similar manner as described above with respect to reference number 630. In some aspects, the second wireless node 610 may broadcast (e.g., in an SIB or over a sidelink channel) the indication of the identifying information for the one or more relevant assisting nodes.

As shown by reference number 645, the first wireless node 605 may receive the indication of the identifying information for the one or more relevant assisting nodes associated with the second wireless node 610 and may transmit an indication, to the third wireless node 615, an indication of the identifying information for the one or more relevant assisting nodes associated with the second wireless node 610. This may enable the second wireless node 610 to establish a communication connection, using an assisting node of the one or more relevant assisting nodes, with the second wireless node 610.

As shown by reference number 650, the second wireless node 610 may transmit, and the first wireless node 605 may receive, a request for one or more assisting nodes (e.g., and associated identifying information) to be assigned to the second wireless node 610 (e.g., to be available for use by the second wireless node 610 and/or to be dedicated to the second wireless node 610). As shown by reference number 655, the first wireless node 605 may transmit, and the second wireless node 610 may receive, an indication of one or more assisting nodes that are assigned to the second wireless node 610. For example, the first wireless node 605 may be a control node. The first wireless node 605 may determine one or more assisting nodes that are to be assigned to the second wireless node 610. The first wireless node 605 may transmit, to the second wireless node 610 and/or one or more other wireless nodes, the indication of the one or more assisting nodes (e.g., and associated identifying information) that are assigned to the second wireless node 610.

As shown by reference number 660, in some aspects, the second wireless node 610 may determine one or more assisting nodes that are assigned to the second wireless node 610. In some aspects, the second wireless node 610 may determine the one or more assisting nodes that are assigned to the second wireless node 610 based at least in part on an indication received from a control node, such as from the first wireless node 605 as described above. In some aspects, the second wireless node 610 may autonomously determine the one or more assisting nodes that are assigned to the second wireless node 610.

As shown by reference number 665, the second wireless node 610 may transmit, to one or more other wireless nodes (e.g., the first wireless node 605, the third wireless node 615, and/or other wireless nodes), an indication of the one or more assisting nodes (e.g., and associated identifying information) that are assigned to the second wireless node 610. The other wireless nodes may utilize the indication of the one or more assisting nodes that are assigned to the second wireless node 610 to communicate with the second wireless node 610, to determine which assisting nodes deployed in the wireless network are available (e.g., not assigned), for beam management purposes, or for signal interference management purposes, among other examples.

In some aspects, the second wireless node 610 may transmit the indication of the one or more assisting nodes (e.g., and associated identifying information) that are assigned to the second wireless node 610 based at least in part on receiving a request for an indication of assisting nodes assigned to the second wireless node 610. In some aspects, the second wireless node 610 may transmit the indication of the one or more assisting nodes that are assigned to the second wireless node 610 to a wireless node that transmitted the request. In some aspects, the second wireless node 610 may transmit the indication of the one or more assisting nodes that are assigned to the second wireless node 610 to a different wireless node than the wireless node that transmitted the request (e.g., the first wireless node 605 may request that the second wireless node 610 transmit the indication of the one or more assisting nodes that are assigned to the second wireless node 610 to the third wireless node 615).

As described above, the first wireless node 605 may receive the indication of the one or more assisting nodes that are assigned to the second wireless node 610 and/or may determine the one or more assisting nodes that are assigned to the second wireless node 610. As shown by reference number 670, the first wireless node 605 may transmit, and the third wireless node 615 may receive, an indication of the one or more assisting nodes (e.g., and associated identifying information) that are assigned to the second wireless node 610. The third wireless node 615 may utilize the one or more assisting nodes that are assigned to the second wireless node 610 to communicate with the second wireless node 610. For example, the third wireless node 615 may use an assisting node, of the one or more assisting nodes that are assigned to the second wireless node 610, to establish a communication connection with the second wireless node. The third wireless node 615 may transmit a link establishment request to the second wireless node 610 via an assisting node, of the one or more assisting nodes that are assigned to the second wireless node 610.

In some aspects, the third wireless node 615 may utilize the one or more assisting nodes that are assigned to the second wireless node 610 to determine one or more available assisting nodes for use by the third wireless node 615. In some aspects, the third wireless node 615 may utilize the one or more assisting nodes that are assigned to the second wireless node 610 to perform an interference and/or beam management procedure. For example, the third wireless node 615 may perform the interference and/or beam management procedure based at least in part on the identifying information associated with the assisting nodes that are assigned to the second wireless node 610.

In some aspects, the third wireless node 615 may utilize the one or more assisting nodes that are assigned to the second wireless node 610 for a handover procedure. For example, the third wireless node 615 may determine that one or more child nodes associated with the third wireless node 615 are to be handed over to the second wireless node 610. The third wireless node 615 may transmit, to the second wireless node 610, a message initiating the handover procedure with the second wireless node 610 via an assisting node of the one or more assisting nodes that are assigned to the second wireless node 610.

In some aspects, identifying information for an assisting node may be associated with conditional information that limits the identifying information. For example, the conditional information may include a time interval associated with communicating using the assisting node, a periodic time interval associated with communicating using the assisting node, a transmit direction of the assisting node, a receive direction of the assisting node, one or more permissible configurations for the assisting node (e.g., transmit power configurations, among other examples), a frequency band associated with the assisting node, one or more resource blocks (RBs) associated with the assisting node, a communication direction associated with the assisting node (e.g., uplink only, downlink only, or both uplink and downlink), a reference signal resource allocation associated with the assisting node, a reference signal configuration associated with the assisting node, a transmit timing reference associated with the assisting node, or a numerology associated with the assisting node (e.g., a subcarrier spacing used by the assisting node or a cyclic prefix used by the assisting node), among other examples.

For example, conditional information for an assigned assisting node may indicate an amount of time (or a periodic amount of time) that the assigned assisting node is assigned to a wireless node. In some aspects, conditional information for an assisting node may indicate available and/or unavailable frequency domain resources (e.g., frequency band and/or RBs) and/or time domain resources associated with the assisting node. A wireless node (e.g., the first wireless node 605, the second wireless node 610, and/or the third wireless node 615) may use the conditional information for an assisting node to make determinations for communicating using the assisting node. For example, the wireless node may determine a transmit configuration to use when communicating using the assisting node, a numerology to use when communicating using the assisting node, and/or a transmit timing reference to use when communicating using the assisting node, among other examples.

As a result, wireless nodes within a wireless network may be enabled to identify assisting nodes deployed within the wireless network. Therefore, the wireless nodes may make improved determinations associated with communicating using the assisting nodes deployed within the wireless network. This may improve communication efficiency within the wireless network by enabling the wireless nodes to better utilize the assisting nodes deployed within the wireless network.

As indicated above, FIG. 6 is provided as an example. Other examples may differ from what is described with respect to FIG. 6.

Figure 7:
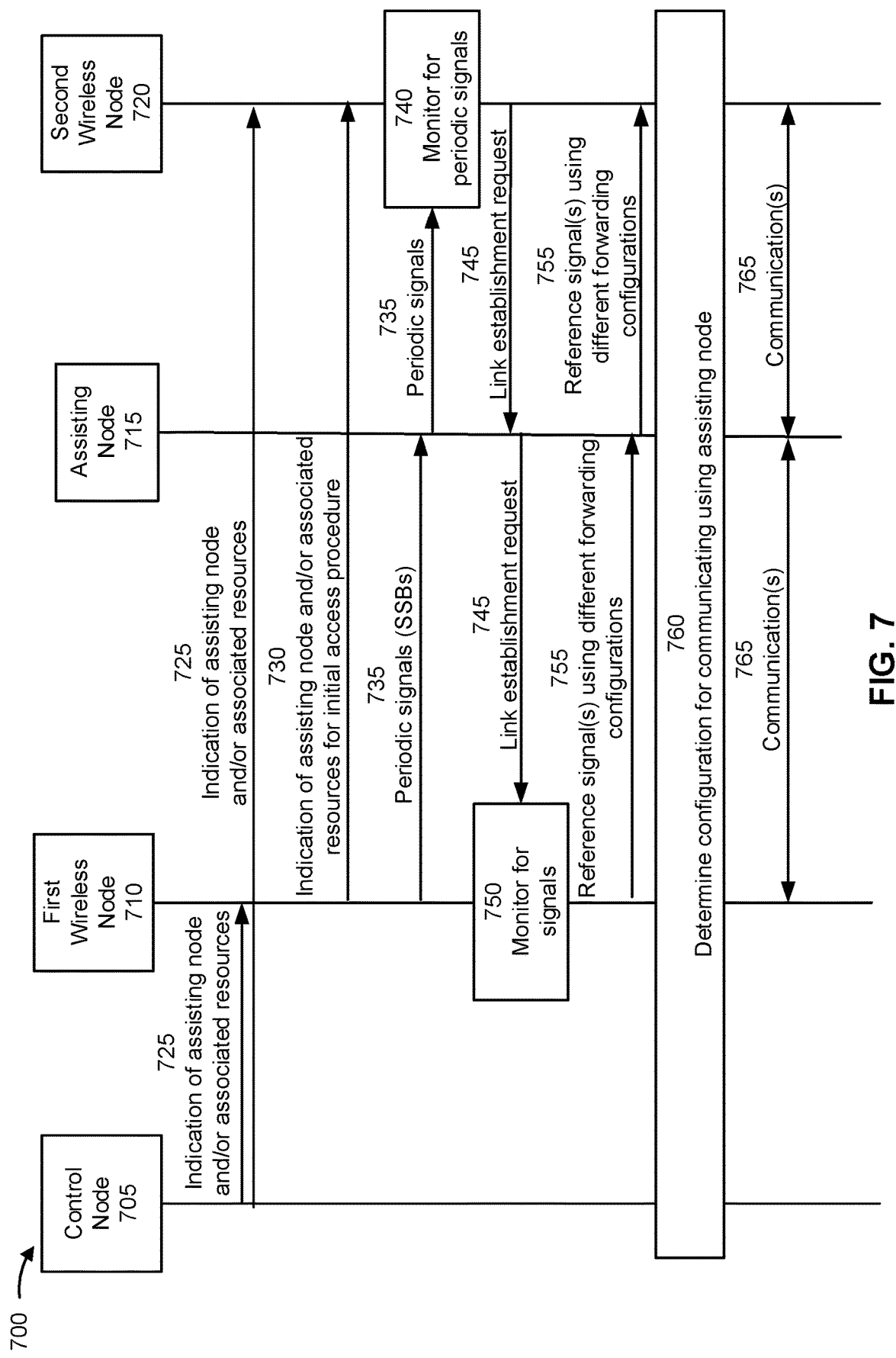
FIG. 7 is a diagram illustrating an example associated with utilization of assisting nodes, in accordance with the present disclosure.

FIG. 7 is a diagram illustrating an example 700 associated with utilization of assisting nodes, in accordance with the present disclosure. As shown in FIG. 7, a control node 705, a first wireless node 710, an assisting node 715, and a second wireless node 720 may communicate with one another in a wireless network (e.g., wireless network 100). In some aspects, the control node 705 may be a base station 110, a CU of an IAB donor, a DU of an IAB node, an IAB node, an OAM module, an RSU, or the first wireless node 605, among other examples. In some aspects, the first wireless node 710 may be a base station 110, a UE 120, an IAB donor, an IAB node, a CU, a DU, a UE 120, an RSU, the second wireless node 610, or the third wireless node 615, among other examples. In some aspects, the assisting node 715 may be a repeater device, a remote unit of an IAB node, a relay device, a reflector device, or the assisting node 510, among other examples. In some aspects, the second wireless node 720 may be a base station 110, a UE 120, an IAB donor, an IAB node, a CU, a DU, a UE 120, an RSU, the second wireless node 610, or the third wireless node 615, among other examples. In some aspects, the assisting node 715 may communicate with multiple first wireless nodes 710. In some aspects, the assisting node 715 may communicate with multiple second wireless nodes 720.

As described above, the first wireless node 710 and the second wireless node 720 may utilize the assisting node 715 to communicate with one another. In some aspects, the first wireless node 710 and/or the second wireless node 720 may utilize identifying information (such as the identifying information described above with respect to FIG. 6) associated with the assisting node 715 to perform interference management, beam management, power control, resource allocation, scheduling, mobility determinations, handover procedures, and/or positioning, among other examples.

As shown by reference number 725, the control node 705 may transmit an indication of an assisting node (e.g., assisting node 715) to be used by the first wireless node 710 and the second wireless node 720 for communications (e.g., to be used to establish a communication connection) between the first wireless node 710 and the second wireless node 720. In some aspects, the control node 705 may transmit an indication of resources (e.g., time domain resources, frequency domain resources, and/or spatial domain resources) to be used to establish a communication connection between the first wireless node 710 and the second wireless node 720 using the assisting node 715. For example, the resources may indicate one or more resources that the first wireless node 710 is to use to transmit communications to the assisting node 715 (e.g., that are to be forwarded by the assisting node 715 to the second wireless node 720) and/or one or more resources that the first wireless node 710 is to use to receive communications from the assisting node 715 (e.g., that have been forwarded by the assisting node 715 from the second wireless node 720). Similarly, the resources may indicate one or more resources that the second wireless node 720 is to use to transmit communications to the assisting node 715 and/or one or more resources that the second wireless node 720 is to use to receive communications from the assisting node 715.

In some aspects, the indication of the assisting node 715 and/or the associated resources may indicate identifying information associated with the assisting node 715. In some aspects, the first wireless node 710 and/or the second wireless node 720 may determine or receive an indication of the identifying information associated with the assisting node 715 as described above with respect to FIG. 6.

In some aspects, as shown in FIG. 7, the control node 705 may transmit the indication of the assisting node 715 and/or the associated resources to both the first wireless node 710 and the second wireless node 720. In some aspects, the control node 705 may transmit the indication of the assisting node 715 and/or the associated resources to only one of the first wireless node 710 or the second wireless node 720.

As shown by reference number 730, the first wireless node 710 may transmit an indication of one or more assisting nodes (e.g., including the assisting node 715) and associated resources that the first wireless node 710 is currently using for an initial access procedure with the first wireless node 710, such as a random access channel (RACH) procedure. In some aspects, the first wireless node 710 may broadcast the indication of the one or more assisting nodes (e.g., including the assisting node 715) and associated resources that the first wireless node 710 is currently using for the initial access procedure.

For example, in some aspects, the first wireless node 710 and/or the second wireless node 720 may be enabled to establish a communication connection using the assisting node 715 without a control node 705. That is, the first wireless node 710 may determine the one or more resources and/or the assisting node (e.g., assisting node 715) that are to be used to perform an initial access procedure with the first wireless node 710. As described above, the first wireless node 710 may transmit (e.g., broadcast) an indication of the one or more resources and/or the assisting node (e.g., assisting node 715) that are to be used to perform an initial access procedure with the first wireless node 710. In this way, the second wireless node 720 may be enabled to identify the assisting node 715 and/or the one or more resources and may establish a communication connection with the first wireless node 710 using the one or more resources and the assisting node 715 (e.g., without receiving an indication of the assisting node 715 and/or the one or more resources from the control node 705).

In some aspects, the indication of the assisting node 715 and/or the associated resources (e.g., transmitted by the control node 705 or the first wireless node 710, as described above) may be transmitted using upper layer signaling or lower layer signaling. In some aspects, the indication of the assisting node 715 and/or the associated resources may be transmitted using different interfaces, such as an F1-AP interface, a Uu interface, or a PC5 interface, among other examples. In some aspects, the indication of the assisting node 715 and/or the associated resources may be transmitted in an RRC message or a MAC-CE message, among other examples.

In some aspects, the indication of the assisting node 715 and/or the associated resources (e.g., transmitted by the control node 705 or the first wireless node 710, as described above) may indicate one or more periodic signals that the first wireless node 710 is transmitting (e.g., and the resources the first wireless node 710 is using to transmit the one or more periodic signals) associated with an initial access procedure and/or one or more resources that the first wireless node 710 is monitoring for signals associated with an initial access procedure.

In some aspects, the indication of the assisting node 715 and/or the associated resources (e.g., transmitted by the control node 705 or the first wireless node 710, as described above) may indicate one or more beams that are to be used to communicate using the assisting node 715. In some aspects, the one or more beams may be indicated using different spatial references. The different spatial references may be for a non-reciprocal beam pair, such as a quasi co-location (QCL) reference or a transmission configuration indicator (TCI) state for a beam to be used by the first wireless node 710 or the second wireless node 720 to communicate using the assisting node 715. For example, a QCL reference may be used to indicate one or more beams that can be used by the first wireless node 710 to transmit signals to, or receive signals from, the assisting node 715. Similarly, a QCL reference may be used to indicate one or more beams that can be used by the second wireless node 720 to transmit signals to, or receive signals from, the assisting node 715. The control node 705 may transmit, to the first wireless node 710 and/or the second wireless node 720, one or more QCL references to indicate beams that can be used to communicate using the assisting node 715.

For example, as shown by reference number 735, the first wireless node may transmit one or more periodic signals to the assisting node 715. The assisting node 715 may forward (e.g., repeat, reflect, and/or relay, among other examples) the periodic signals. The periodic signals may include synchronization signal blocks (SSBs), channel state information reference signals (CSI-RSs), and/or discovery signals, among other examples. In some aspects, the first wireless node may transmit a first set of SSBs (or other reference signals as described above) to the assisting node 715 and may transmit a second set of SSBs (or other reference signals as described above) for an initial access procedure with the first wireless node 710 that does not utilize the assisting node 715. In this way, the reference signals (e.g., the SSBs) used by the first wireless node 710 to establish a communication connection using the assisting node 715 may be differentiated from the reference signals (e.g., the SSBs) used by the first wireless node 710 to establish a communication connection without using the assisting node 715.

For example, the first set of SSBs may be associated with a first periodicity and the second set of SSBs may be associated with a second periodicity. In some aspects, the first periodicity may be a lower periodicity than the second periodicity, to conserve resources associated with transmitting the SSBs to the assisting node 715. In some aspects, the first set of SSBs may be transmitted using a first frequency and the second set of SSBs may be transmitted using a second frequency. For example, the second set of SSBs (for initial access procedures that do not utilize the assisting node 715) may be associated with a synchronization channel raster (e.g., that indicates a frequency and/or other numerology associated with SSBs). The first set of SSBs (for initial access procedures that do utilize the assisting node 715) may be associated with a different frequency and/or numerology than is indicated by the synchronization channel raster.

As shown by reference number 740, the second wireless node 720 may monitor for the periodic signals (e.g., SSBs, CSI-RSs, and/or discovery signals) transmitted by the first wireless node 710 via the assisting node 715. For example, the second wireless node 720 may monitor one or more resources (e.g., time domain resources, frequency domain resources, and/or spatial domain resources), indicated by the control node 705 and/or the first wireless node 710, for the periodic signals.

As shown by reference number 745, the second wireless node 720 may transmit, to the first wireless node 710 via the assisting node 715, a link establishment request based at least in part on receiving one or more of the periodic signals transmitted by the first wireless node 710. The link establishment request may be a request to initiate an initial access procedure, such as a RACH procedure. For example, the link establishment request may be a random access preamble, such as a message A of a two-step RACH procedure, or a message 1 of a four-step RACH procedure, among other examples.

As shown by reference number 750, the first wireless node 710 may monitor one or more resources for signals from the assisting node 715. For example, the first wireless node 710 may periodically scan for incoming signals from the assisting node 715 during one or more RACH occasions. The first wireless node 710 may receive the link establishment request, that was transmitted by the second wireless node 720, based at least in part on monitoring the one or more resources for signals from the assisting node 715.

In some aspects, the first wireless node 710 may not transmit the periodic signals as described above with respect to reference number 735. The first wireless node 710 may monitor the one or more resources for signals from the assisting node 715 (e.g., without transmitting the periodic signals). The second wireless node 720 may determine the one or more resources being monitored by the first wireless node 710 (e.g., based at least in part on the indication of the assisting node 715 and/or the associated resources received from the control node 705 and/or the first wireless node 710, as described above). The second wireless node 720 may transmit the link establishment request (e.g., without receiving a periodic signal as described above) such that the assisting node 715 forwards the link establishment request during the one or more resources being monitored by the first wireless node 710.

The first wireless node 710 and the second wireless node 720 may perform an initial access procedure via the assisting node 715 based at least in part on the first wireless node 710 receiving the link establishment request as described above. The first wireless node 710 and the second wireless node 720 may establish a communication connection (e.g., a communication link) via the assisting node 715 based at least in part on performing the initial access procedure. For example, the first wireless node 710 and/or the second wireless node 720 may determine one or more beams to use to communicate with one another via the assisting node 715.

In some aspects, the first wireless node 710 and/or the second wireless node 720 may reconfigure the assisting node 715 to improve an end-to-end communication performance between the first wireless node 710 and the second wireless node 720. For example, as shown by reference number 755, the first wireless node 710 may transmit one or more reference signals to the assisting node 715 to be forwarded by the assisting node 715 using one or more different forwarding configurations (e.g., using different transmit powers, in different spatial directions (e.g., using different transmit beam directions and/or different receive beam directions), using different reflecting directions, using different reflecting configurations, among other examples). In some aspects, the assisting node 715 may be configured (e.g., by the control node 705, the first wireless node 710, and/or the second wireless node 720) to forward the one or more reference signals using the one or more different forwarding configurations. The second wireless node 720 may receive the one or more reference signals using the different forwarding configurations.

As shown by reference number 760, the first wireless node 710 and/or the second wireless node 720 (and/or the control node 705) may determine a configuration for the assisting node 715, for communicating between the first wireless node 710 and the second wireless node 720 using the assisting node 715, based at least in part on the one or more reference signals transmitted using different forwarding configurations. For example, the second wireless node 720 may receive the one or more reference signals using the different forwarding configurations and may measure the one or more reference signals to determine one or more end-to-end measurements (e.g., reference signal received power (RSRP) measurements, reference signal received quality (RSRQ) measurements, and/or signal to noise (SNR) ratio measurements, among other examples) associated with the one or more reference signals. In some aspects, the second wireless node 720 may transmit an indication of the one or more end-to-end measurements to the first wireless node 710 and/or the control node 705.

The first wireless node 710 and/or the second wireless node 720 (and/or the control node 705) may determine a forwarding configuration for the assisting node 715, for communicating between the first wireless node 710 and the second wireless node 720 using the assisting node 715, based at least in part on the one or more end-to-end measurements. For example, the first wireless node 710 and/or the second wireless node 720 (and/or the control node 705) may determine a reference signal associated with a best end-to-end measurement. The first wireless node 710 and/or the second wireless node 720 (and/or the control node 705) may determine a forwarding configuration that was used by the assisting node 715 to forward the reference signal associated with a best end-to-end measurement. The first wireless node 710 and/or the second wireless node 720 (and/or the control node 705) may configure the assisting node 715 to use the forwarding configuration that was used by the assisting node 715 to forward the reference signal associated with a best end-to-end measurement for one or more future communications between the first wireless node 710 and the second wireless node 720 using the assisting node 715.

In some aspects, where the first wireless node 710 determines the forwarding configuration for the assisting node 715, the first wireless node 710 may transmit an indication of the forwarding configuration for the assisting node 715 to the assisting node 715, the second wireless node 720, and/or the control node 705. In some aspects, where the control node 705 determines the forwarding configuration for the assisting node 715, the control node 705 may transmit an indication of the forwarding configuration for the assisting node 715 to the assisting node 715, the first wireless node 710, and/or the first wireless node 710. In some aspects, where the second wireless node 720 determines the forwarding configuration for the assisting node 715, the second wireless node 720 may transmit an indication of the forwarding configuration for the assisting node 715 to the assisting node 715, the first wireless node 710, and/or the control node 705.

As shown by reference number 765, the first wireless node 710 and the second wireless node 720 may communicate using the assisting node 715 via the communication connection established as described above. For example, the first wireless node 710 may transmit a communication to the assisting node 715. The assisting node 715 may forward (e.g., transmit, repeat, reflect, and/or relay, among other examples) the communication to the second wireless node 720. In some aspects, the second wireless node 720 may transmit a communication to the assisting node 715. The assisting node 715 may forward (e.g., transmit, repeat, reflect, and/or relay, among other examples) the communication to the first wireless node 710.

As a result, the wireless nodes (e.g., the first wireless node 710 and/or the second wireless node 720) may be enabled to utilize the assisting node 715 to transmit or receive communications from another wireless node. In some aspects, the wireless nodes may be enabled to utilize the identifying information associated with the assisting node 715 for interference management, beam management, power control, resource allocation, scheduling, mobility and handover procedures, or positioning, among other examples. As a result, the wireless nodes may be enabled to make improved determinations regarding how or when to utilize the assisting node 715 for communications. Moreover, an efficiency of communications within the wireless network may be improved based at least in part on the availability of the identifying information for assisting nodes within the wireless network.

As indicated above, FIG. 7 is provided as an example. Other examples may differ from what is described with respect to FIG. 7.

Figure 8:
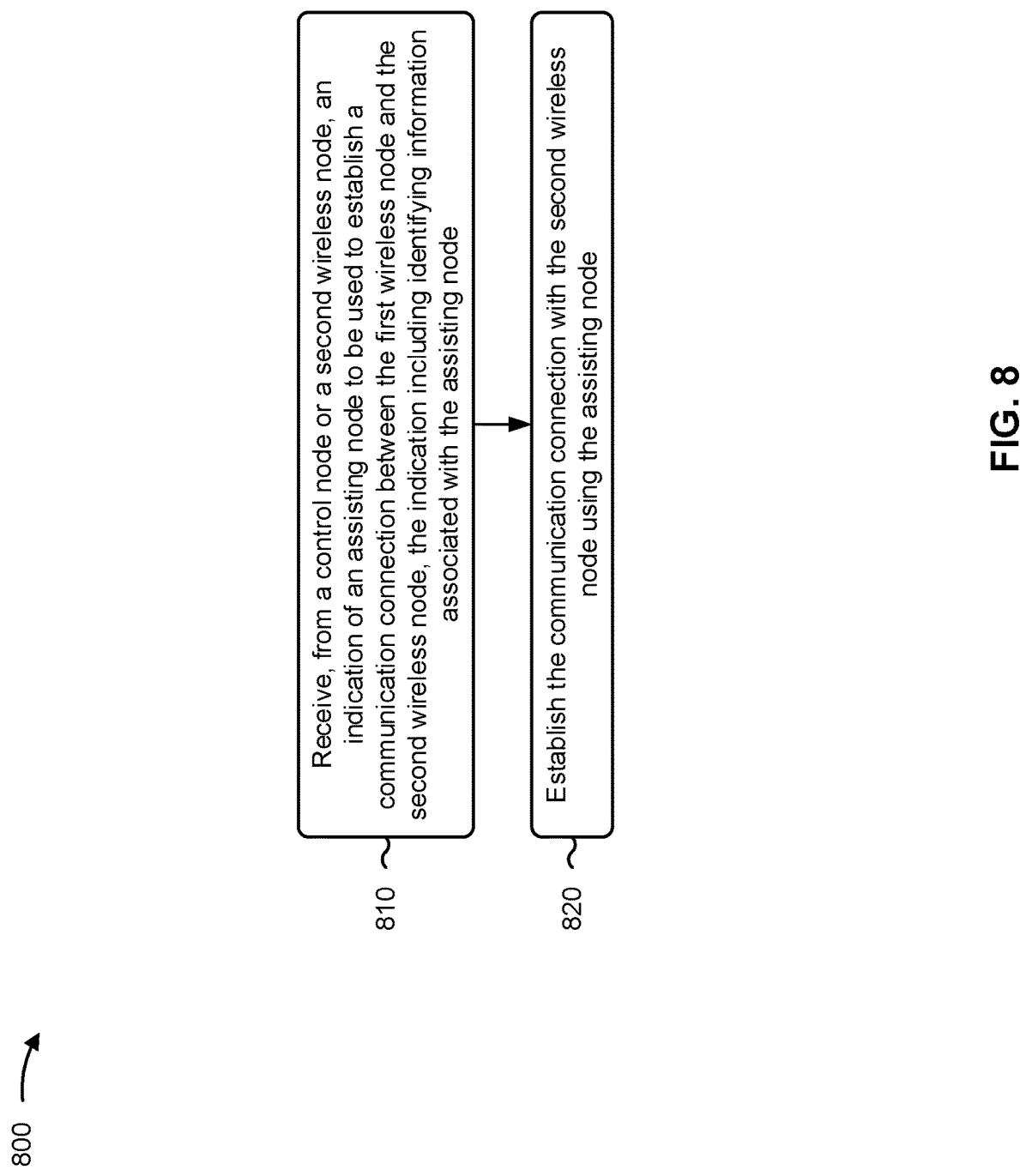
FIGS. 8-13 are diagrams illustrating example processes associated with identification and utilization of assisting nodes, in accordance with the present disclosure.

FIG. 8 is a diagram illustrating an example process 800 performed, for example, by a first wireless node, in accordance with the present disclosure. Example process 800 is an example where the first wireless node (e.g., the first wireless node 605, the second wireless node 610, the third wireless node 615, the first wireless node 710, the second wireless node 720, a UE 120, a base station 110, an IAB node, and/or an IAB donor) performs operations associated with identification and utilization of assisting nodes.

As shown in FIG. 8, in some aspects, process 800 may include receiving, from a control node or a second wireless node, an indication of an assisting node to be used to establish a communication connection between the first wireless node and the second wireless node, the indication including identifying information associated with the assisting node (block 810). For example, the first wireless node (e.g., using reception component 1402, depicted in FIG. 14) may receive, from a control node or a second wireless node, an indication of an assisting node to be used to establish a communication connection between the first wireless node and the second wireless node, the indication including identifying information associated with the assisting node, as described above.

As further shown in FIG. 8, in some aspects, process 800 may include establishing the communication connection with the second wireless node using the assisting node (block 820). For example, the first wireless node (e.g., using communication link establishment component 1408, depicted in FIG. 14) may establish the communication connection with the second wireless node using the assisting node, as described above.

Process 800 may include additional aspects, such as any single aspect or any combination of aspects described below and/or in connection with one or more other processes described elsewhere herein.

In a first aspect, process 800 includes receiving, from the control node, an indication of resources to be used to establish the communication connection between the first wireless node and the second wireless node.

In a second aspect, alone or in combination with the first aspect, the assisting node is at least one of a repeater node, a reflector node, a configurable assisting node, or a non-configurable assisting node.

In a third aspect, alone or in combination with one or more of the first and second aspects, establishing the communication connection with the second wireless node using the assisting node includes transmitting, to the assisting node, a first signal using the resources indicated by the control node, wherein the first signal is to be forwarded to the second wireless node by the assisting node.

In a fourth aspect, alone or in combination with one or more of the first through third aspects, establishing the communication connection with the second wireless node using the assisting node includes receiving, from the assisting node, a second signal using the resources indicated by the control node, wherein the second signal is associated with a third signal that has been transmitted by the second wireless node to the assisting node.

In a fifth aspect, alone or in combination with one or more of the first through fourth aspects, establishing the communication connection with the second wireless node using the assisting node includes transmitting, to the assisting node, periodic signals to be forwarded by the assisting node, and receiving, from the assisting node, a signal associated with a link establishment request sent by the second wireless node associated with establishing the communication connection with the second wireless node based at least in part on transmitting the periodic signals.

In a sixth aspect, alone or in combination with one or more of the first through fifth aspects, the periodic signals include at least one of: one or more SSBs, one or more CSI-RSs, or one or more discovery signals.

In a seventh aspect, alone or in combination with one or more of the first through sixth aspects, establishing the communication connection with the second wireless node using the assisting node includes receiving, from the assisting node, one or more periodic signals that are associated with periodic signals that have been transmitted by the second wireless node to the assisting node, and transmitting, to the assisting node, a link establishment request associated with establishing the communication connection with the second wireless node based at least in part on transmitting the periodic signals, wherein the link establishment request is to be forwarded to the second wireless node by the assisting node.

In an eighth aspect, alone or in combination with one or more of the first through seventh aspects, establishing the communication connection with the second wireless node using the assisting node includes monitoring the resources indicated by the control node for a signal from the assisting node, and receiving, from the assisting node, a link establishment request sent by the second wireless node associated with establishing the communication connection with the second wireless node based at least in part on monitoring the resources indicated by the control node.

In a ninth aspect, alone or in combination with one or more of the first through eighth aspects, establishing the communication connection with the second wireless node using the assisting node includes transmitting, to the assisting node, a link establishment request associated with establishing the communication connection with the second wireless node using the resources indicated by the control node, wherein the link establishment request is to be forwarded to the second wireless node by the assisting node.

In a tenth aspect, alone or in combination with one or more of the first through ninth aspects, the link establishment request is a random access message associated with a RACH procedure.

In an eleventh aspect, alone or in combination with one or more of the first through tenth aspects, process 800 includes receiving, from the control node, an indication of QCL information associated with one or more beams to be used to communicate with the assisting node.

In a twelfth aspect, alone or in combination with one or more of the first through eleventh aspects, process 800 includes transmitting an indication of one or more assisting nodes, including the assisting node, and one or more resources, including the resources indicated by the control node, to be used for initial access procedures with the first wireless node.

In a thirteenth aspect, alone or in combination with one or more of the first through twelfth aspects, establishing the communication connection with the second wireless node using the assisting node includes performing an initial access procedure with the second wireless node using the assisting node based at least in part on transmitting the indication of the one or more assisting nodes and the one or more resources to be used for initial access procedures with the first wireless node.

In a fourteenth aspect, alone or in combination with one or more of the first through thirteenth aspects, performing the initial access procedure with the second wireless node using the assisting node includes transmitting, to the assisting node, a first set of SSBs associated with the initial access procedure, and receiving, from the assisting node, a link establishment request associated with establishing the communication connection with the second wireless node based at least in part on transmitting the first set of SSBs associated with the initial access procedure.

In a fifteenth aspect, alone or in combination with one or more of the first through fourteenth aspects, process 800 includes transmitting a second set of SSBs associated with an initial access procedure that does not use the assisting node, wherein the first set of SSBs is associated with at least one of a different periodicity than the second set of SSBs, or a different frequency than the second set of SSBs.

In a sixteenth aspect, alone or in combination with one or more of the first through fifteenth aspects, performing the initial access procedure with the second wireless node using the assisting node includes monitoring one or more RACH occasions, and receiving, from the assisting node, a link establishment request associated with establishing the communication connection with the second wireless node based at least in part on monitoring the one or more RACH occasions.

In a seventeenth aspect, alone or in combination with one or more of the first through sixteenth aspects, process 800 includes receiving, from at least one of the control node or the second wireless node, an indication of one or more assisting nodes, including the assisting node, and one or more resources, including the resources indicated by the control node, to be used for initial access procedures with the second wireless node.

In an eighteenth aspect, alone or in combination with one or more of the first through seventeenth aspects, establishing the communication connection with the second wireless node using the assisting node includes performing an initial access procedure with the second wireless node using the assisting node based at least in part on receiving the indication of the one or more assisting nodes and the one or more resources to be used for initial access procedures with the second wireless node.

In a nineteenth aspect, alone or in combination with one or more of the first through eighteenth aspects, performing the initial access procedure with the second wireless node using the assisting node includes receiving, from the assisting node, a set of SSBs associated with the initial access procedure, wherein the set of SSBs are associated with a set of SSBs transmitted by the second wireless node, and transmitting, to the assisting node, a link establishment request associated with establishing the communication connection with the second wireless node based at least in part on receiving the set of SSBs associated with the initial access procedure.

In a twentieth aspect, alone or in combination with one or more of the first through nineteenth aspects, performing the initial access procedure with the second wireless node using the assisting node includes transmitting, to the assisting node, a link establishment request associated with establishing the communication connection with the second wireless node during one or more RACH occasions.

In a twenty-first aspect, alone or in combination with one or more of the first through twentieth aspects, establishing the communication connection with the second wireless node using the assisting node includes transmitting, to the assisting node, one or more reference signals to be forwarded by the assisting node using one or more forwarding configurations.

In a twenty-second aspect, alone or in combination with one or more of the first through twenty-first aspects, establishing the communication connection with the second wireless node using the assisting node includes receiving, from the assisting node, one or more reference signals forwarded using one or more forwarding configurations, and performing one or more end-to-end measurements associated with the one or more reference signals forwarded using the one or more forwarding configurations.

In a twenty-third aspect, alone or in combination with one or more of the first through twenty-second aspects, process 800 includes determining a forwarding configuration for the assisting node, from one or more forwarding configurations, for communications between the first wireless node and the second wireless node using the assisting node based at least in part on one or more end-to-end measurements associated with one or more reference signals forwarded by the assisting node using the one or more forwarding configurations.

In a twenty-fourth aspect, alone or in combination with one or more of the first through twenty-third aspects, process 800 includes transmitting, to at least one of the assisting node or the control node, an indication of the forwarding configuration.

In a twenty-fifth aspect, alone or in combination with one or more of the first through twenty-fourth aspects, process 800 includes receiving, from the control node, an indication of a forwarding configuration for the assisting node, from the one or more forwarding configurations, for communications between the first wireless node and the second wireless node using the assisting node that is based at least in part on one or more end-to-end measurements associated with one or more reference signals forwarded by the assisting node using the one or more forwarding configurations.

In a twenty-sixth aspect, alone or in combination with one or more of the first through twenty-fifth aspects, the one or more forwarding configurations include at least one of: a receive beam direction, a transmit beam direction, a transmit power configuration, a reflecting direction, or a reflecting configuration.

In a twenty-seventh aspect, alone or in combination with one or more of the first through twenty-sixth aspects, process 800 includes communicating, with the second wireless node or another wireless node, using the assisting node.

In a twenty-eighth aspect, alone or in combination with one or more of the first through twenty-seventh aspects, process 800 includes transmitting, to the second wireless node, a request for identifying information associated with the assisting node.

In a twenty-ninth aspect, alone or in combination with one or more of the first through twenty-eighth aspects, process 800 includes transmitting an indication of identifying information for one or more relevant assisting nodes that can be used by other wireless nodes to communicate with the first wireless node.

In a thirtieth aspect, alone or in combination with one or more of the first through twenty-ninth aspects, process 800 includes transmitting an indication of identifying information for one or more assisting nodes that are assigned to the first wireless node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
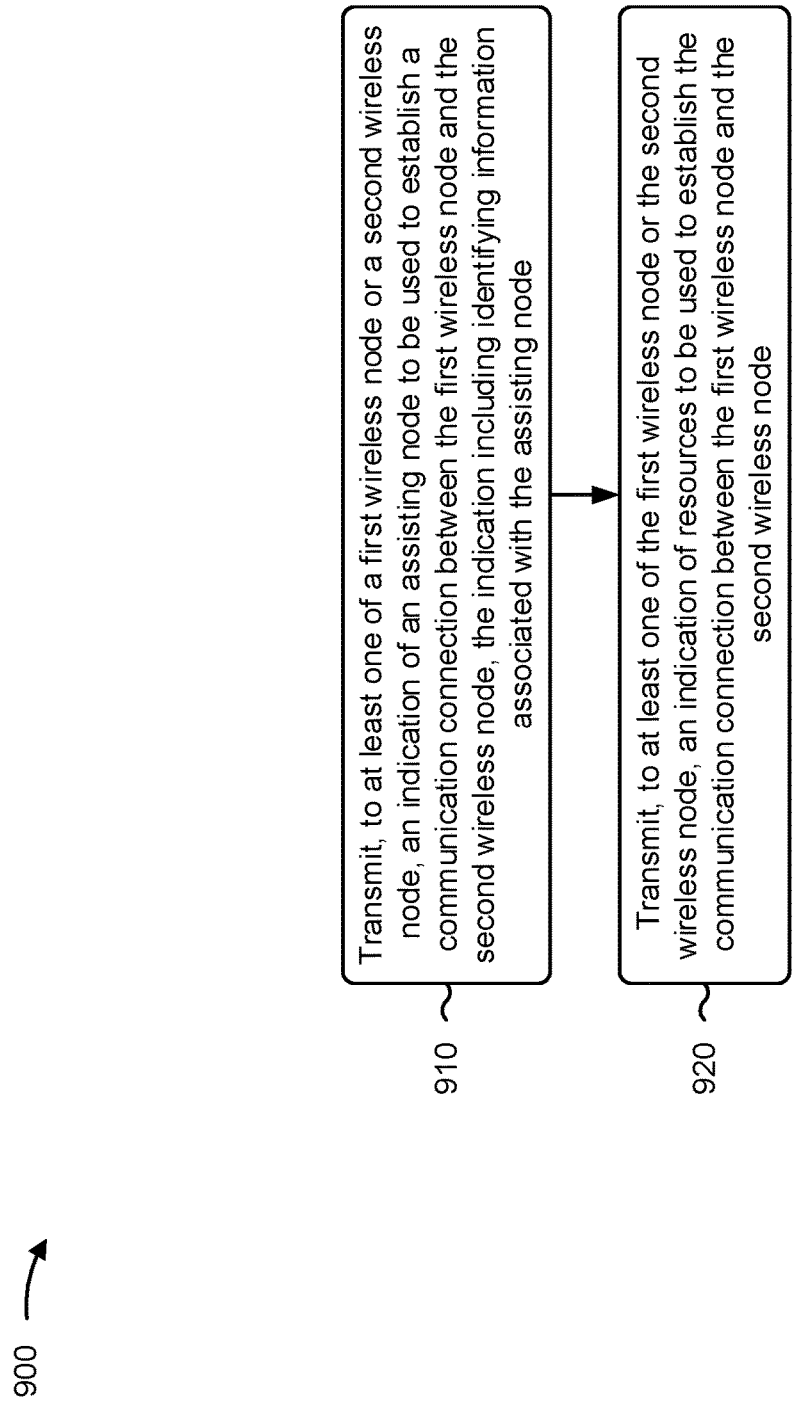

FIG. 9 is a diagram illustrating an example process 900 performed, for example, by a control node, in accordance with the present disclosure. Example process 900 is an example where the control node (e.g., the first wireless node 605, the second wireless node 610, the control node 705, the first wireless node 710, a UE 120, a base station 110, an IAB node, and/or an IAB donor) performs operations associated with identification and utilization of assisting nodes.

As shown in FIG. 9, in some aspects, process 900 may include transmitting, to at least one of a first wireless node or a second wireless node, an indication of an assisting node to be used to establish a communication connection between the first wireless node and the second wireless node, the indication including identifying information associated with the assisting node (block 910). For example, the control node (e.g., using transmission component 1504, depicted in FIG. 15) may transmit, to at least one of a first wireless node or a second wireless node, an indication of an assisting node to be used to establish a communication connection between the first wireless node and the second wireless node, the indication including identifying information associated with the assisting node, as described above.

As further shown in FIG. 9, in some aspects, process 900 may include transmitting, to at least one of the first wireless node or the second wireless node, an indication of resources to be used to establish the communication connection between the first wireless node and the second wireless node (block 920). For example, the control node (e.g., using transmission component 1504, depicted in FIG. 15) may transmit, to at least one of the first wireless node or the second wireless node, an indication of resources to be used to establish the communication connection between the first wireless node and the second wireless node, as described above.

Process 900 may include additional aspects, such as any single aspect or any combination of aspects described below and/or in connection with one or more other processes described elsewhere herein.

In a first aspect, the assisting node is at least one of: a repeater node, a reflector node, a configurable assisting node, or a non-configurable assisting node.

In a second aspect, alone or in combination with the first aspect, transmitting the indication of the assisting node and transmitting the indication of the resources to be used to establish the communication connection between the first wireless node and the second wireless node enables the first wireless node and the second wireless node to establish the communication connection using the assisting node.

In a third aspect, alone or in combination with one or more of the first and second aspects, transmitting the indication of resources to be used to establish the communication connection between the first wireless node and the second wireless node includes transmitting, to the second wireless node, an indication of resources associated with one or more periodic signals to be transmitted by the first wireless node to the assisting node.

In a fourth aspect, alone or in combination with one or more of the first through third aspects, transmitting the indication of resources to be used to establish the communication connection between the first wireless node and the second wireless node includes transmitting, to the second wireless node, an indication of resources or RACH occasions that are to be monitored by the first wireless node.

In a fifth aspect, alone or in combination with one or more of the first through fourth aspects, process 900 includes transmitting, to the assisting node, an indication of one or more forwarding configurations to be used by the assisting node when forwarding communications between the first wireless node and the second wireless node.

In a sixth aspect, alone or in combination with one or more of the first through fifth aspects, process 900 includes receiving, from the first wireless node or the second wireless node, one or more end-to-end measurements associated with reference signals forwarded by the assisting node using one or more forwarding configurations.

In a seventh aspect, alone or in combination with one or more of the first through sixth aspects, process 900 includes determining a forwarding configuration for the assisting node, from the one or more forwarding configurations, for communications between the first wireless node and the second wireless node using the assisting node based at least in part on the one or more end-to-end measurements.

In an eighth aspect, alone or in combination with one or more of the first through seventh aspects, process 900 includes transmitting, to at least one of the first wireless node, the second wireless node, or the assisting node, an indication of the forwarding configuration for the assisting node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
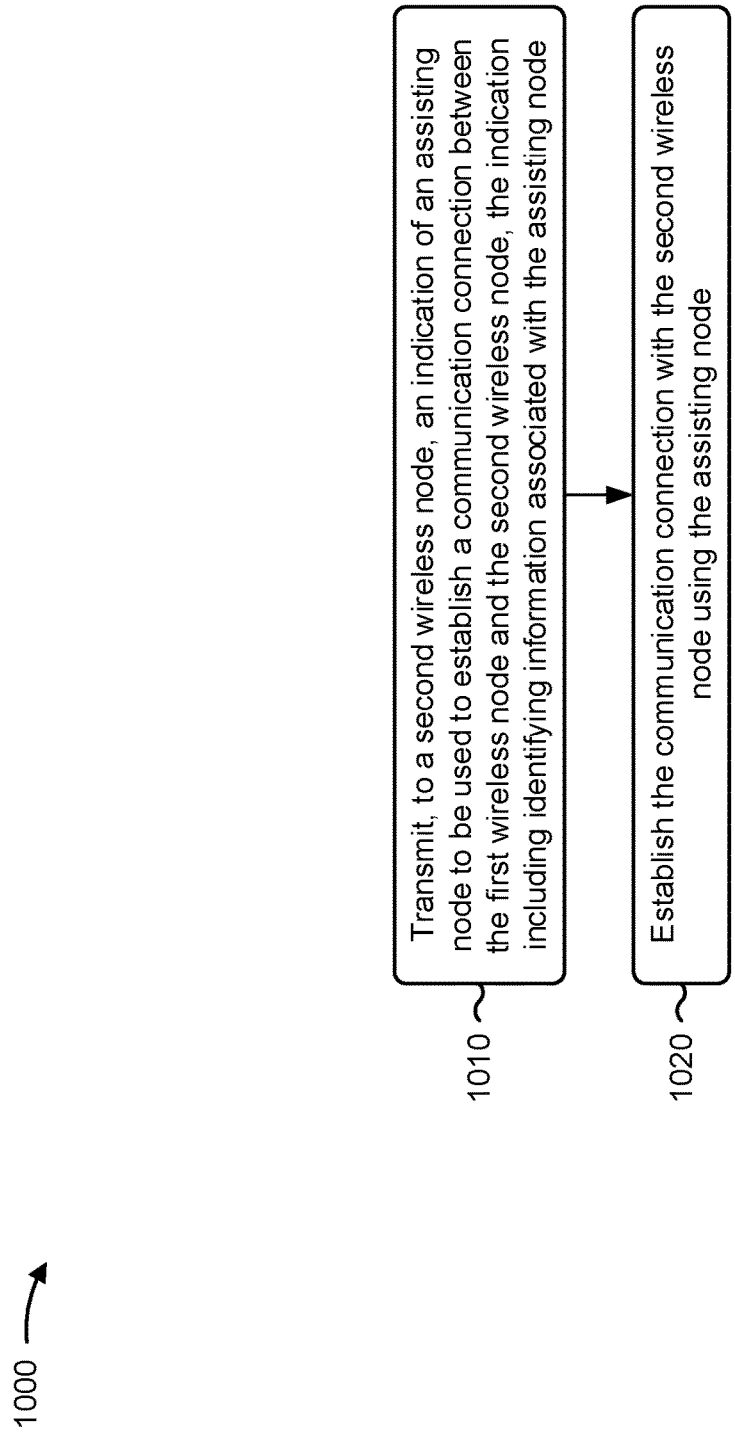

FIG. 10 is a diagram illustrating an example process 1000 performed, for example, by a first wireless node, in accordance with the present disclosure. Example process 1000 is an example where the first wireless node (e.g., the first wireless node 605, the second wireless node 610, the third wireless node 615, the first wireless node 710, the second wireless node 720, a UE 120, a base station 110, an IAB node, and/or an IAB donor) performs operations associated with identification and utilization of assisting nodes.

As shown in FIG. 10, in some aspects, process 1000 may include transmitting, to a second wireless node, an indication of an assisting node to be used to establish a communication connection between the first wireless node and the second wireless node, the indication including identifying information associated with the assisting node (block 1010). For example, the first wireless node (e.g., using transmission component 1604, depicted in FIG. 16) may transmit, to a second wireless node, an indication of an assisting node to be used to establish a communication connection between the first wireless node and the second wireless node, the indication including identifying information associated with the assisting node, as described above.

As further shown in FIG. 10, in some aspects, process 1000 may include establishing the communication connection with the second wireless node using the assisting node (block 1020). For example, the first wireless node (e.g., using communication link establishment component 1608, depicted in FIG. 16) may establish the communication connection with the second wireless node using the assisting node, as described above.

Process 1000 may include additional aspects, such as any single aspect or any combination of aspects described below and/or in connection with one or more other processes described elsewhere herein.

In a first aspect, process 1000 includes transmitting, to the second wireless node, an indication of resources to be used to establish the communication connection between the first wireless node and the second wireless node.

In a second aspect, alone or in combination with the first aspect, establishing the communication connection with the second wireless node using the assisting node includes performing an initial access procedure with the second wireless node using the assisting node based at least in part on transmitting the indication of the assisting node to be used to establish the communication connection between the first wireless node and the second wireless node.

In a third aspect, alone or in combination with one or more of the first and second aspects, performing the initial access procedure with the second wireless node using the assisting node includes transmitting, to the assisting node, a first set of SSBs associated with the initial access procedure, and receiving, from the assisting node, a link establishment request associated with establishing the communication connection with the second wireless node based at least in part on transmitting the first set of SSBs associated with the initial access procedure.

In a fourth aspect, alone or in combination with one or more of the first through third aspects, process 1000 includes transmitting a second set of SSBs associated with an initial access procedure that does not use the assisting node, wherein the first set of SSBs is associated with at least one of a different periodicity than the second set of SSBs, or a different frequency than the second set of SSBs.

In a fifth aspect, alone or in combination with one or more of the first through fourth aspects, performing the initial access procedure with the second wireless node using the assisting node includes monitoring one or more RACH occasions, and receiving, from the assisting node, a link establishment request associated with establishing the communication connection with the second wireless node based at least in part on monitoring the one or more RACH occasions.

In a sixth aspect, alone or in combination with one or more of the first through fifth aspects, establishing the communication connection with the second wireless node using the assisting node includes transmitting, to the assisting node, one or more reference signals to be forwarded by the assisting node using one or more forwarding configurations.

In a seventh aspect, alone or in combination with one or more of the first through sixth aspects, process 1000 includes receiving, from the second wireless node, an indication of one or more end-to-end measurements associated with the one or more reference signals, and determining a forwarding configuration for the assisting node, from the one or more forwarding configurations, for communications between the first wireless node and the second wireless node using the assisting node based at least in part on the one or more end-to-end measurements.

In an eighth aspect, alone or in combination with one or more of the first through seventh aspects, process 1000 includes transmitting, to at least one of the assisting node or the second wireless node, an indication of the forwarding configuration.

In a ninth aspect, alone or in combination with one or more of the first through eighth aspects, process 1000 includes receiving, from a control node, an indication of a forwarding configuration for the assisting node, from the one or more forwarding configurations, for communications between the first wireless node and the second wireless node using the assisting node that is based at least in part on one or more end-to-end measurements associated with the one or more reference signals.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
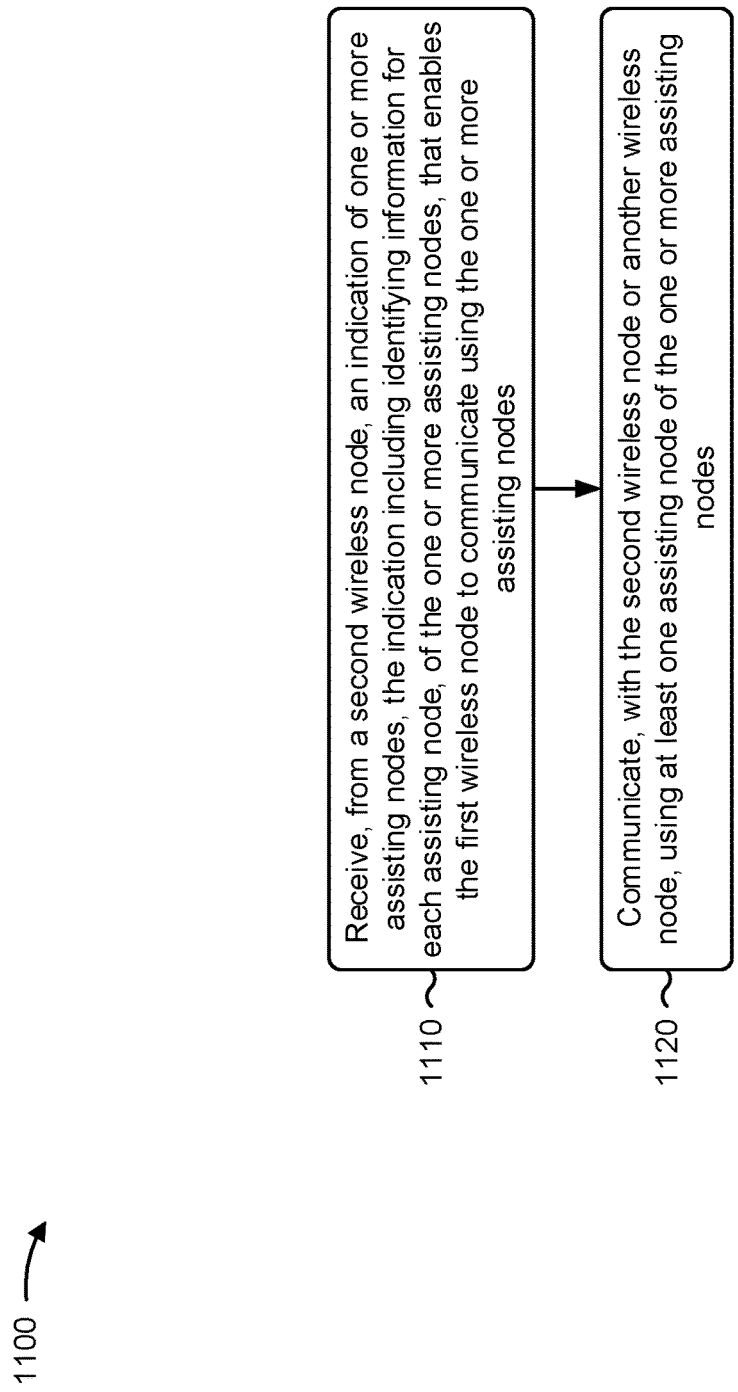

FIG. 11 is a diagram illustrating an example process 1100 performed, for example, by a wireless node, in accordance with the present disclosure. Example process 1100 is an example where the wireless node (e.g., the second wireless node 610, the third wireless node 615, the first wireless node 710, the second wireless node 720, an IAB donor, an IAB node, a UE 120, and/or a base station 110) performs operations associated with identification and utilization of assisting nodes.

As shown in FIG. 11, in some aspects, process 1100 may include receiving, from a second wireless node, an indication of one or more assisting nodes, the indication including identifying information for each assisting node, of the one or more assisting nodes, that enables the wireless node to communicate using the one or more assisting nodes (block 1110). For example, the wireless node (e.g., using reception component 1702, depicted in FIG. 17) may receive, from a second wireless node, an indication of one or more assisting nodes, the indication including identifying information for each assisting node, of the one or more assisting nodes, that enables the wireless node to communicate using the one or more assisting nodes, as described above.

As further shown in FIG. 11, in some aspects, process 1100 may include communicating, with the second wireless node or another wireless node, using at least one assisting node of the one or more assisting nodes (block 1120). For example, the wireless node (e.g., using assisting node communication component 1708, reception component 1702 and/or transmission component 1704, depicted in FIG. 17) may communicate, with the second wireless node or another wireless node, using at least one assisting node of the one or more assisting nodes, as described above.

Process 1100 may include additional aspects, such as any single aspect or any combination of aspects described below and/or in connection with one or more other processes described elsewhere herein.

In a first aspect, the one or more assisting nodes include at least one of a repeater node, a reflector node, a configurable assisting node, or a non-configurable assisting node.

In a second aspect, alone or in combination with the first aspect, the identifying information for an assisting node includes an indication of at least one of an identifier associated with the assisting node, location information associated with the assisting node, information associated with the assisting node, receiving directions associated with the assisting node, or forwarding directions associated with the assisting node.

In a third aspect, alone or in combination with one or more of the first and second aspects, the indication of the identifier associated with the assisting node includes an indication of at least one of a unique identifier associated with the assisting node, or an index value associated with the assisting node.

In a fourth aspect, alone or in combination with one or more of the first through third aspects, the indication of the location information associated with the assisting node includes an indication of at least one of: location information associated with the assisting node, relative location information associated with the assisting node, spatial direction information associated with the assisting node, a distance between the assisting node and the wireless node or between the assisting node and a different wireless node, or geographical coordinates associated with the assisting node.

In a fifth aspect, alone or in combination with one or more of the first through fourth aspects, the indication of the capability information associated with the assisting node includes an indication of at least one of: a type associated with the assisting node, whether the assisting node is configurable or non-configurable, or one or more configurations associated with the assisting node.

In a sixth aspect, alone or in combination with one or more of the first through fifth aspects, the wireless node is at least one of: a central unit of an IAB donor, a distributed unit of an IAB node, a mobile termination component of an IAB node, a UE, or a base station.

In a seventh aspect, alone or in combination with one or more of the first through sixth aspects, the second wireless node is at least one of: an OAM module, a core network device, a CU of an IAB donor, a parent node associated with the wireless node, an IAB node, a DU of an IAB node, a base station, a UE, or an RSU.

In an eighth aspect, alone or in combination with one or more of the first through seventh aspects, receiving the indication of the one or more assisting nodes includes receiving the indication via at least one of: an OAM interface, an F1 application protocol interface, a Uu interface, or a PC5 interface.

In a ninth aspect, alone or in combination with one or more of the first through eighth aspects, receiving the indication of the one or more assisting nodes includes receiving the indication via an RRC message, or a MAC-CE message.

In a tenth aspect, alone or in combination with one or more of the first through ninth aspects, process 1100 includes transmitting, to the second wireless node, a request for identifying information associated with assisting nodes.

In an eleventh aspect, alone or in combination with one or more of the first through tenth aspects, receiving the indication of the one or more assisting nodes includes receiving, from the second wireless node, the indication of the one or more assisting nodes based at least in part on transmitting the request for identifying information associated with assisting nodes.

In a twelfth aspect, alone or in combination with one or more of the first through eleventh aspects, process 1100 includes transmitting an indication of at least one of: the identifying information for the one or more assisting nodes, or identifying information for one or more other assisting nodes.

In a thirteenth aspect, alone or in combination with one or more of the first through twelfth aspects, transmitting the indication of at least one of the identifying information for the one or more assisting nodes or the identifying information for one or more other assisting nodes includes transmitting the indication to at least one of: an OAM module, a core network device, a central unit of an IAB donor, a parent node associated with the wireless node, an IAB node, a DU of an IAB node, a base station, a UE, or an RSU.

In a fourteenth aspect, alone or in combination with one or more of the first through thirteenth aspects, transmitting the indication of at least one of the identifying information for the one or more assisting nodes or the identifying information for one or more other assisting nodes includes broadcasting the indication of at least one of the identifying information for the one or more assisting nodes or the identifying information for one or more other assisting nodes.

In a fifteenth aspect, alone or in combination with one or more of the first through fourteenth aspects, broadcasting the indication includes at least one of: broadcasting the indication in a system information block, or broadcasting the indication using a sidelink channel.

In a sixteenth aspect, alone or in combination with one or more of the first through fifteenth aspects, process 1100 includes receiving, from the second wireless node or a third wireless node, a request for identifying information associated with assisting nodes.

In a seventeenth aspect, alone or in combination with one or more of the first through sixteenth aspects, transmitting the indication of at least one of the identifying information for the one or more assisting nodes or the identifying information for one or more other assisting nodes includes transmitting, to the second wireless node or the third wireless node, the indication of at least one of the identifying information for the one or more assisting nodes or the identifying information for one or more other assisting nodes based at least in part on receiving the request for identifying information associated with assisting nodes.

In an eighteenth aspect, alone or in combination with one or more of the first through seventeenth aspects, process 1100 includes determining one or more relevant assisting nodes that can be used by other wireless nodes to communicate with the wireless node, and transmitting an indication of identifying information for the one or more relevant assisting nodes.

In a nineteenth aspect, alone or in combination with one or more of the first through eighteenth aspects, determining the one or more relevant assisting nodes that can be used by other wireless nodes to communicate with the wireless node includes determining one or more assisting nodes that are within a coverage area associated with the wireless node.

In a twentieth aspect, alone or in combination with one or more of the first through nineteenth aspects, transmitting the indication of the identifying information for the one or more relevant assisting nodes includes broadcasting the indication of the identifying information for the one or more relevant assisting nodes.

In a twenty-first aspect, alone or in combination with one or more of the first through twentieth aspects, process 1100 includes receiving, from the second wireless node or a third wireless node, a request for identifying information for relevant assisting nodes associated with the wireless node.

In a twenty-second aspect, alone or in combination with one or more of the first through twenty-first aspects, transmitting the indication of the identifying information for the one or more relevant assisting nodes includes transmitting, to the second wireless node or the third wireless node, the indication of the identifying information for the one or more relevant assisting nodes based at least in part on receiving the request for identifying information for assisting nodes associated with the wireless node.

In a twenty-third aspect, alone or in combination with one or more of the first through twenty-second aspects, process 1100 includes transmitting an indication of identifying information for one or more assisting nodes that are assigned to the wireless node.

In a twenty-fourth aspect, alone or in combination with one or more of the first through twenty-third aspects, process 1100 includes at least one of: determining the one or more assisting nodes that are assigned to the wireless node, or receiving an indication of one or more assisting nodes that are assigned to the wireless node.

In a twenty-fifth aspect, alone or in combination with one or more of the first through twenty-fourth aspects, process 1100 includes receiving, from the second wireless node or a third wireless node, a request for identifying information for assisting nodes that are assigned to the wireless node.

In a twenty-sixth aspect, alone or in combination with one or more of the first through twenty-fifth aspects, transmitting the indication of the identifying information for one or more assisting nodes that are assigned to the wireless node includes transmitting, to the second wireless node or the third wireless node, the indication of the identifying information for one or more assisting nodes that are assigned to the wireless node based at least in part on receiving the request for identifying information for assisting nodes that are assigned to the wireless node.

In a twenty-seventh aspect, alone or in combination with one or more of the first through twenty-sixth aspects, process 1100 includes transmitting, to the second wireless node or a third wireless node, a request for identifying information for assisting nodes that are assigned to the wireless node.

In a twenty-eighth aspect, alone or in combination with one or more of the first through twenty-seventh aspects, process 1100 includes receiving, from the second wireless node or the third wireless node, an indication of one or more assisting nodes that are assigned to the wireless node based at least in part on transmitting the request for identifying information for assisting nodes that are assigned to the wireless node.

In a twenty-ninth aspect, alone or in combination with one or more of the first through twenty-eighth aspects, identifying information for an assisting node includes conditional information associated with the assisting node.

In a thirtieth aspect, alone or in combination with one or more of the first through twenty-ninth aspects, the conditional information includes at least one of: a time interval associated with communicating using the assisting node, a periodic time interval associated with communicating using the assisting node, a transmit direction of the assisting node, a receive direction of the assisting node, one or more permissible configurations for the assisting node, a frequency band associated with the assisting node, one or more resource blocks associated with the assisting node, a communication direction associated with the assisting node, a reference signal resource allocation associated with the assisting node, a reference signal configuration associated with the assisting node, a transmit timing reference associated with the assisting node, or a numerology associated with the assisting node.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
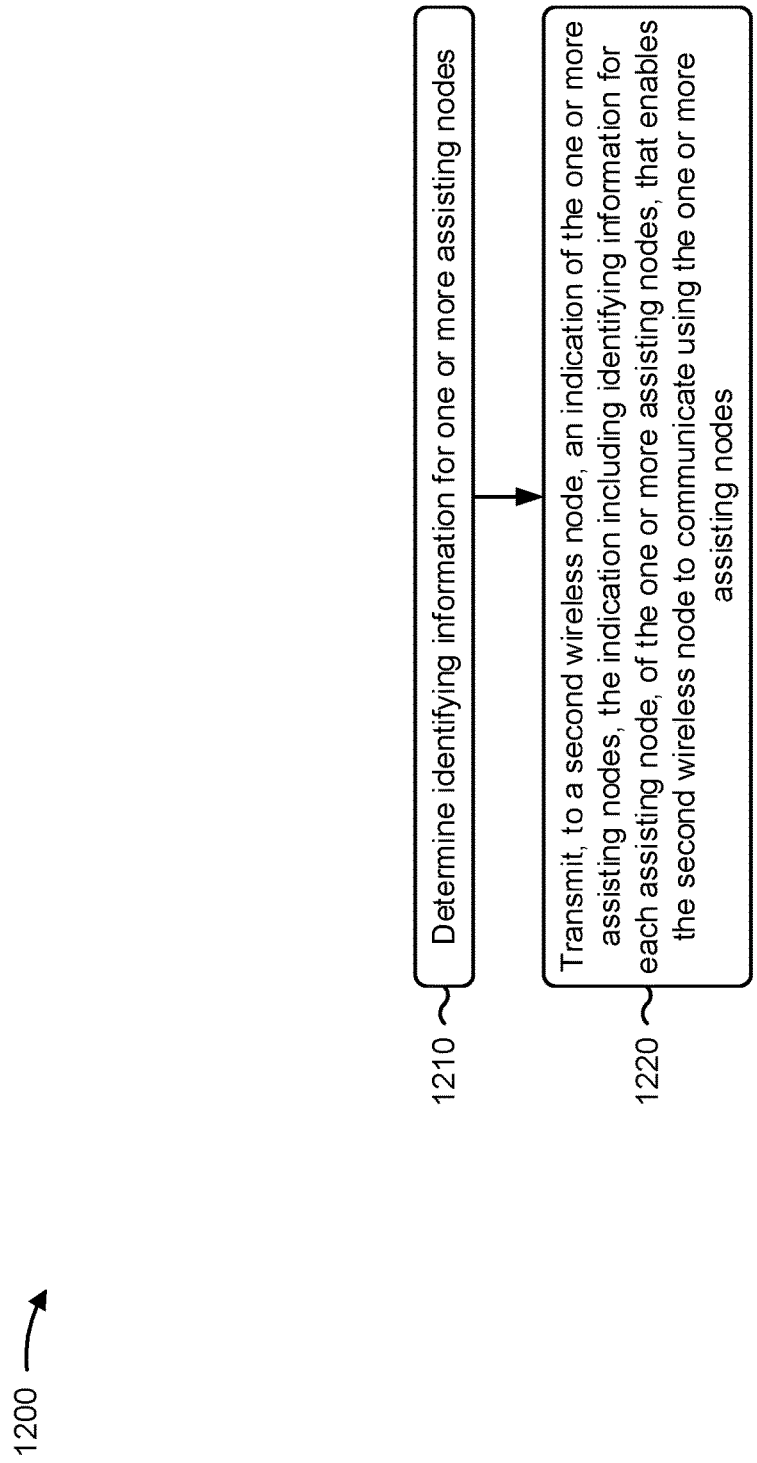

FIG. 12 is a diagram illustrating an example process 1200 performed, for example, by a wireless node, in accordance with the present disclosure. Example process 1200 is an example where the wireless node (e.g., the first wireless node 605, the second wireless node 610, the control node 705, the first wireless node 710, an IAB donor, an IAB node, a UE 120, and/or a base station 110) performs operations associated with identification and utilization of assisting nodes.

As shown in FIG. 12, in some aspects, process 1200 may include determining identifying information for one or more assisting nodes (block 1210). For example, the wireless node (e.g., using assisting node identification component 1808, depicted in FIG. 18) may determine identifying information for one or more assisting nodes, as described above.

As further shown in FIG. 12, in some aspects, process 1200 may include transmitting, to a second wireless node, an indication of the one or more assisting nodes, the indication including identifying information for each assisting node, of the one or more assisting nodes, that enables the second wireless node to communicate using the one or more assisting nodes (block 1220). For example, the wireless node (e.g., using transmission component 1804, depicted in FIG. 18) may transmit, to a second wireless node, an indication of the one or more assisting nodes, the indication including identifying information for each assisting node, of the one or more assisting nodes, that enables the second wireless node to communicate using the one or more assisting nodes, as described above.

Process 1200 may include additional aspects, such as any single aspect or any combination of aspects described below and/or in connection with one or more other processes described elsewhere herein.

In a first aspect, the one or more assisting nodes include at least one of: a repeater node, a reflector node, a configurable assisting node, or a non-configurable assisting node.

In a second aspect, alone or in combination with the first aspect, the identifying information for an assisting node includes an indication of at least one of: an identifier associated with the assisting node, location information associated with the assisting node, information associated with the assisting node, receiving directions associated with the assisting node, or forwarding directions associated with the assisting node.

In a third aspect, alone or in combination with one or more of the first and second aspects, the indication of the identifier associated with the assisting node includes an indication of at least one of: a unique identifier associated with the assisting node, or an index value associated with the assisting node.

In a fourth aspect, alone or in combination with one or more of the first through third aspects, the indication of the location information associated with the assisting node includes an indication of at least one of: location information associated with the assisting node, relative location information associated with the assisting node, spatial direction information associated with the assisting node, a distance between the assisting node and the second wireless node or between the assisting node and a different wireless node, or geographical coordinates associated with the assisting node.

In a fifth aspect, alone or in combination with one or more of the first through fourth aspects, the indication of the capability information associated with the assisting node includes an indication of at least one of: a type associated with the assisting node, whether the assisting node is configurable or non-configurable, or one or more configurations associated with the assisting node.

In a sixth aspect, alone or in combination with one or more of the first through fifth aspects, the second wireless node is at least one of: a CU of an IAB donor, a DU of an IAB node, an MT component of an IAB node, a UE, or a base station.

In a seventh aspect, alone or in combination with one or more of the first through sixth aspects, the wireless node is at least one of: an OAM module, a core network device, a CU of an IAB donor, a parent node associated with the second wireless node, an IAB node, a DU of an IAB node, a base station, a UE, or an RSU.

In an eighth aspect, alone or in combination with one or more of the first through seventh aspects, transmitting the indication of the one or more assisting nodes includes transmitting the indication via at least one of: an OAM interface, an F1 application protocol interface, a Uu interface, or a PC5 interface.

In a ninth aspect, alone or in combination with one or more of the first through eighth aspects, transmitting the indication of the one or more assisting nodes includes transmitting the indication via an RRC message, or a MAC-CE message.

In a tenth aspect, alone or in combination with one or more of the first through ninth aspects, process 1200 includes receiving, from the second wireless node, a request for identifying information associated with assisting nodes.

In an eleventh aspect, alone or in combination with one or more of the first through tenth aspects, transmitting the indication of the one or more assisting nodes includes transmitting, to the second wireless node, the indication of the one or more assisting nodes based at least in part on receiving the request for identifying information associated with assisting nodes.

In a twelfth aspect, alone or in combination with one or more of the first through eleventh aspects, process 1200 includes receiving, from the second wireless node or another wireless node, an indication of identifying information for the one or more assisting nodes or identifying information for one or more other assisting nodes.

In a thirteenth aspect, alone or in combination with one or more of the first through twelfth aspects, receiving, from the second wireless node or the other wireless node, the indication of identifying information for the one or more assisting nodes or identifying information for one or more other assisting nodes includes receiving the indication in a broadcast transmission.

In a fourteenth aspect, alone or in combination with one or more of the first through thirteenth aspects, process 1200 includes transmitting, to the second wireless node or the other wireless node, a request for identifying information associated with assisting nodes.

In a fifteenth aspect, alone or in combination with one or more of the first through fourteenth aspects, process 1200 includes receiving, from the second wireless node, an indication of identifying information for one or more relevant assisting nodes associated with the second wireless node.

In a sixteenth aspect, alone or in combination with one or more of the first through fifteenth aspects, receiving the indication of the identifying information for the one or more relevant assisting nodes includes receiving the indication of the identifying information for the one or more relevant assisting nodes in a broadcast transmission.

In a seventeenth aspect, alone or in combination with one or more of the first through sixteenth aspects, process 1200 includes transmitting, to the second wireless node, a request for identifying information for relevant assisting nodes associated with the second wireless node.

In an eighteenth aspect, alone or in combination with one or more of the first through seventeenth aspects, process 1200 includes receiving, from the second wireless node, an indication of identifying information for one or more assisting nodes that are assigned to the second wireless node.

In a nineteenth aspect, alone or in combination with one or more of the first through eighteenth aspects, process 1200 includes transmitting, to the second wireless node, a request for identifying information for assisting nodes that are assigned to the second wireless node.

In a twentieth aspect, alone or in combination with one or more of the first through nineteenth aspects, process 1200 includes transmitting, to a third wireless node, an indication of the identifying information for the one or more assisting nodes that are assigned to the second wireless node.

In a twenty-first aspect, alone or in combination with one or more of the first through twentieth aspects, process 1200 includes receiving, from the second wireless node, a request for identifying information for assisting nodes that are assigned to the second wireless node.

In a twenty-second aspect, alone or in combination with one or more of the first through twenty-first aspects, process 1200 includes determining one or more assisting nodes that are assigned to the second wireless node.

In a twenty-third aspect, alone or in combination with one or more of the first through twenty-second aspects, process 1200 includes transmitting, to the second wireless node, an indication of one or more assisting nodes that are assigned to the second wireless node based at least in part on receiving the request for identifying information for assisting nodes that are assigned to the second wireless node.

In a twenty-fourth aspect, alone or in combination with one or more of the first through twenty-third aspects, identifying information for an assisting node includes conditional information associated with the assisting node.

In a twenty-fifth aspect, alone or in combination with one or more of the first through twenty-fourth aspects, the conditional information includes at least one of: a time interval associated with communicating using the assisting node, a periodic time interval associated with communicating using the assisting node, a transmit direction of the assisting node, a receive direction of the assisting node, one or more permissible configurations for the assisting node, a frequency band associated with the assisting node, one or more resource blocks associated with the assisting node, a communication direction associated with the assisting node, a reference signal resource allocation associated with the assisting node, a reference signal configuration associated with the assisting node, a transmit timing reference associated with the assisting node, or a numerology associated with the assisting node.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
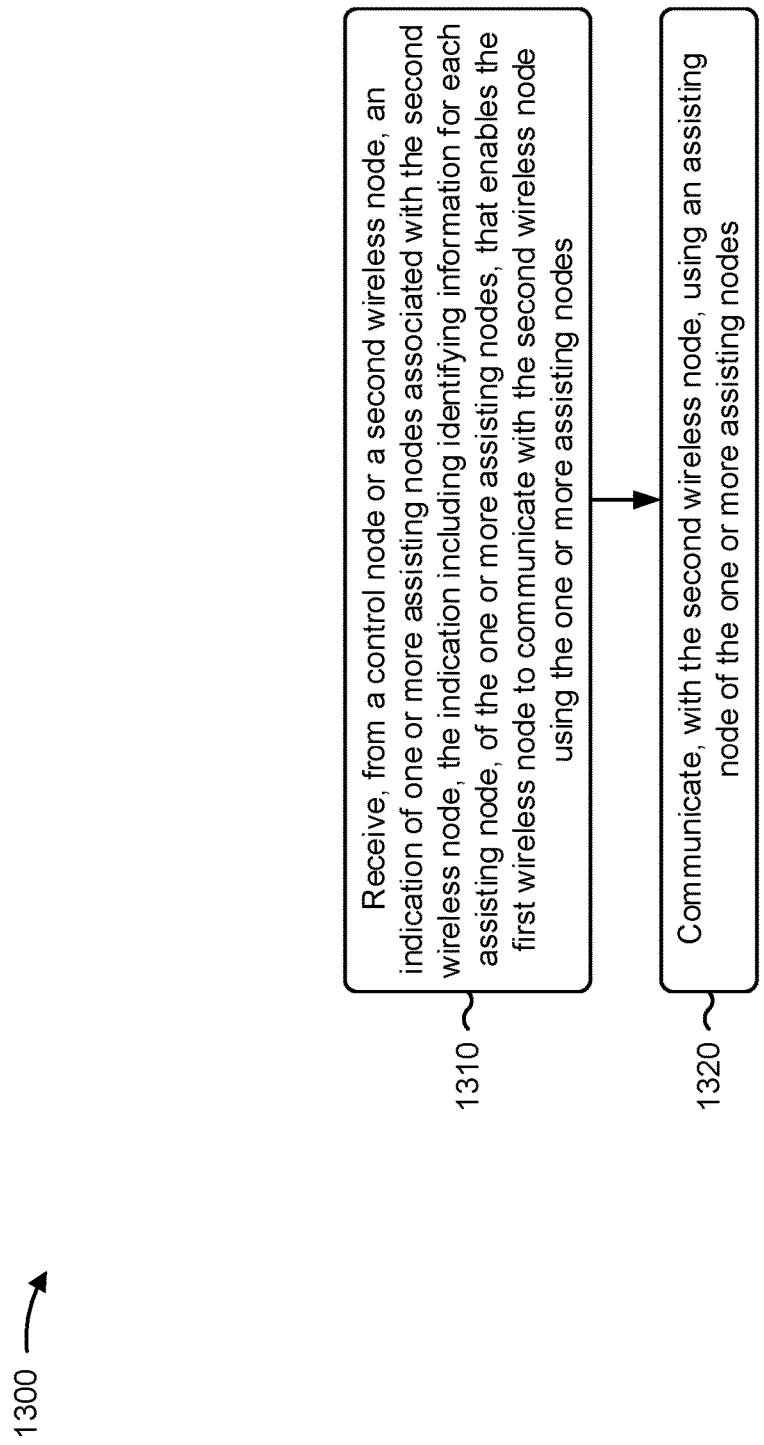

FIG. 13 is a diagram illustrating an example process 1300 performed, for example, by a wireless node, in accordance with the present disclosure. Example process 1300 is an example where the wireless node (e.g., the second wireless node 610, the third wireless node 615, the first wireless node 710, the second wireless node 720, an IAB donor, an IAB node, a UE 120, and/or a base station 110) performs operations associated with identification and utilization of assisting nodes.

As shown in FIG. 13, in some aspects, process 1300 may include receiving, from a control node or a second wireless node, an indication of one or more assisting nodes associated with the second wireless node, the indication including identifying information for each assisting node, of the one or more assisting nodes, that enables the wireless node to communicate with the second wireless node using the one or more assisting nodes (block 1310). For example, the wireless node (e.g., using reception component 1902, depicted in FIG. 19) may receive, from a control node or a second wireless node, an indication of one or more assisting nodes associated with the second wireless node, the indication including identifying information for each assisting node, of the one or more assisting nodes, that enables the wireless node to communicate with the second wireless node using the one or more assisting nodes, as described above.

As further shown in FIG. 13, in some aspects, process 1300 may include communicating, with the second wireless node, using an assisting node of the one or more assisting nodes (block 1320). For example, the wireless node (e.g., using assisting node communication component 1908, reception component 1902, and/or transmission component 1904, depicted in FIG. 19) may communicate, with the second wireless node, using an assisting node of the one or more assisting nodes, as described above.

Process 1300 may include additional aspects, such as any single aspect or any combination of aspects described below and/or in connection with one or more other processes described elsewhere herein.

In a first aspect, the one or more assisting nodes include at least one of: a repeater node, a reflector node, a configurable assisting node, or a non-configurable assisting node.

In a second aspect, alone or in combination with the first aspect, the identifying information for an assisting node includes an indication of at least one of: an identifier associated with the assisting node, location information associated with the assisting node, information associated with the assisting node, receiving directions associated with the assisting node, or forwarding directions associated with the assisting node.

In a third aspect, alone or in combination with one or more of the first and second aspects, the indication of the identifier associated with the assisting node includes an indication of at least one of: a unique identifier associated with the assisting node, or an index value associated with the assisting node.

In a fourth aspect, alone or in combination with one or more of the first through third aspects, the indication of the location information associated with the assisting node includes an indication of at least one of: location information associated with the assisting node, relative location information associated with the assisting node, spatial direction information associated with the assisting node, a distance between the assisting node and the wireless node or between the assisting node and the second wireless node, or geographical coordinates associated with the assisting node.

In a fifth aspect, alone or in combination with one or more of the first through fourth aspects, the indication of the capability information associated with the assisting node includes an indication of at least one of: a type associated with the assisting node, whether the assisting node is configurable or non-configurable, or one or more configurations associated with the assisting node.

In a sixth aspect, alone or in combination with one or more of the first through fifth aspects, the first node is at least one of: a CU of an IAB donor, a DU of an IAB node, an MT component of an IAB node, a UE, or a base station.

In a seventh aspect, alone or in combination with one or more of the first through sixth aspects, the control node is at least one of: an OAM module, a core network device, a CU of an IAB donor, a parent node associated with the wireless node, an IAB node, a DU of an IAB node, a base station, a UE, or an RSU.

In an eighth aspect, alone or in combination with one or more of the first through seventh aspects, receiving the indication of the one or more assisting nodes includes receiving the indication via at least one of: an OAM interface, an F1 application protocol interface, a Uu interface, or a PC5 interface.

In a ninth aspect, alone or in combination with one or more of the first through eighth aspects, process 1300 includes transmitting, to the control node or the second wireless node, a request for identifying information for assisting nodes associated with the second wireless node.

In a tenth aspect, alone or in combination with one or more of the first through ninth aspects, receiving the indication of the one or more assisting nodes associated with the second wireless node includes receiving, from the control node or a third wireless node, an indication of one or more relevant assisting nodes associated with the second wireless node.

In an eleventh aspect, alone or in combination with one or more of the first through tenth aspects, receiving the indication of the one or more assisting nodes associated with the second wireless node includes receiving, from the control node or a third wireless node, an indication of one or more assisting nodes that are assigned to the second wireless node.

In a twelfth aspect, alone or in combination with one or more of the first through eleventh aspects, communicating, with the second wireless node, using an assisting node of the one or more assisting nodes includes communicating, with the second wireless node, using an assisting node of the one or more assisting nodes that are assigned to the second wireless node.

In a thirteenth aspect, alone or in combination with one or more of the first through twelfth aspects, process 1300 includes determining one or more available assisting nodes based at least in part on the indication of the one or more assisting nodes that are assigned to the second wireless node.

In a fourteenth aspect, alone or in combination with one or more of the first through thirteenth aspects, process 1300 includes performing at least one of an interference procedure or a beam management procedure, based at least in part on the indication of the one or more assisting nodes that are assigned to the second wireless node.

In a fifteenth aspect, alone or in combination with one or more of the first through fourteenth aspects, communicating, with the second wireless node, using an assisting node of the one or more assisting nodes includes performing a handover procedure, for handing over one or more child nodes associated with the wireless node to the second wireless node, with the second wireless node using an assisting node of the one or more assisting nodes that are assigned to the second wireless node.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
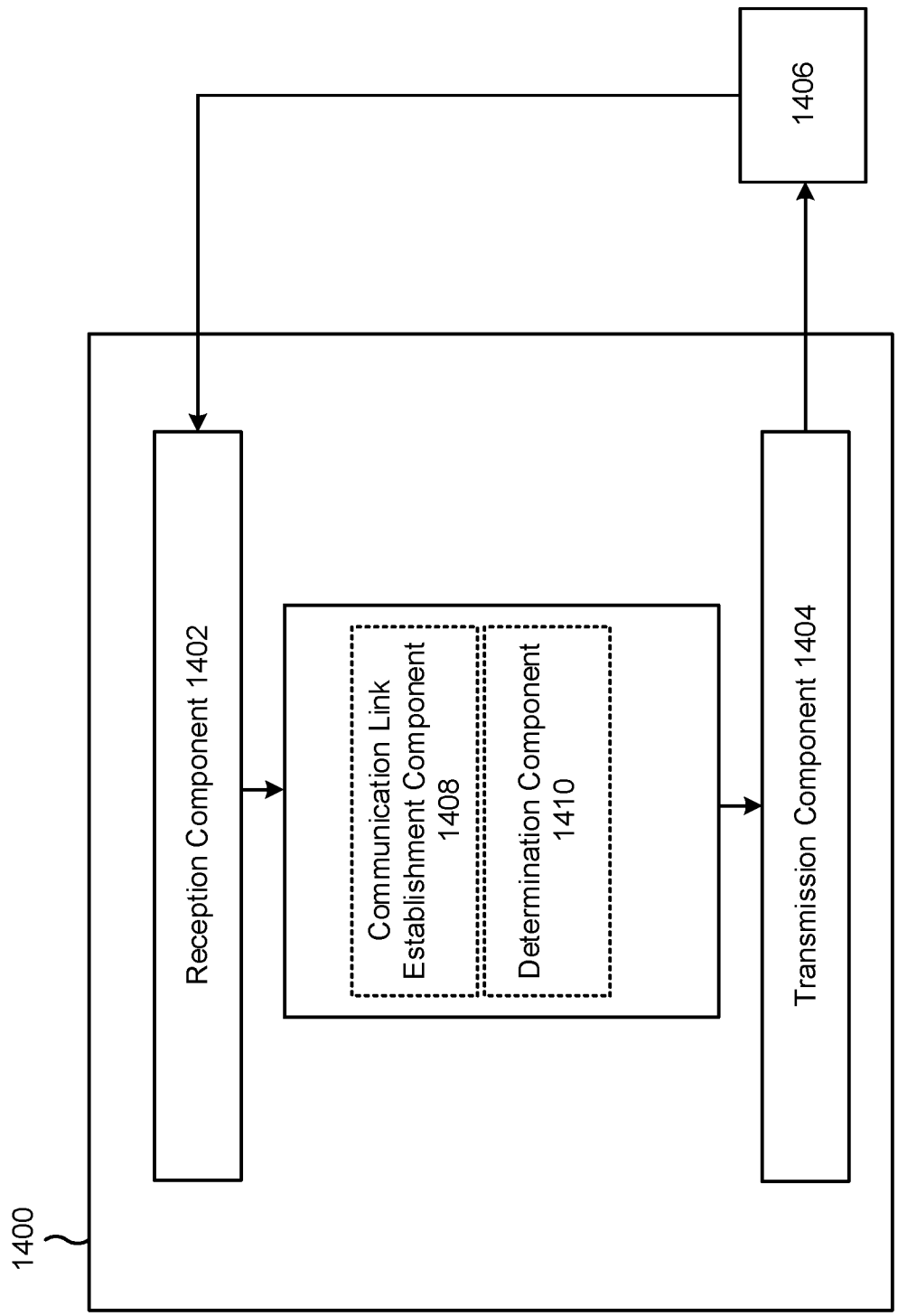
FIGS. 14-19 are block diagrams of example apparatuses for wireless communication, in accordance with the present disclosure.

FIG. 14 is a block diagram of an example apparatus 1400 for wireless communication. The apparatus 1400 may be a first wireless node, or a first wireless node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a communication link establishment component 1408, or a determination component 1410, among other examples.

In some aspects, the apparatus 1400 may be configured to perform one or more operations described herein in connection with FIGS. 6 and/or 7. Additionally or alternatively, the apparatus 1400 may be configured to perform one or more processes described herein, such as process 800 of FIG. 8, or a combination thereof. In some aspects, the apparatus 1400 and/or one or more components shown in FIG. 14 may include one or more components of the first wireless node described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the first wireless node described above in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the first wireless node described above in connection with FIG. 2. In some aspects, the transmission component 1404 may be co-located with the reception component 1402 in a transceiver.

The reception component 1402 may receive, from a control node or a second wireless node, an indication of an assisting node to be used to establish a communication connection between the first wireless node and the second wireless node, the indication including identifying information associated with the assisting node. The communication link establishment component 1408 may establish the communication connection with the second wireless node using the assisting node. In some aspects, the communication link establishment component 1408 may include one or more antennas, a demodulator, a MIMO detector, a receive processor, a modulator, a transmit MIMO processor, a transmit processor, a controller/processor, a memory, or a combination thereof, of the first wireless node described above in connection with FIG. 2.

The reception component 1402 may receive, from the control node, an indication of resources to be used to establish the communication connection between the first wireless node and the second wireless node. The transmission component 1404 may transmit, to the assisting node, a signal using the resources indicated by the control node, wherein the signal is to be forwarded to the second wireless node by the assisting node.

The reception component 1402 may receive, from the assisting node, a signal using the resources indicated by the control node, wherein the signal is associated with a signal that has been transmitted by the second wireless node to the assisting node.

The transmission component 1404 may transmit, to the assisting node, periodic signals to be forwarded by the assisting node. The reception component 1402 may receive, from the assisting node, a signal associated with a link establishment request sent by the second wireless node associated with establishing the communication connection with the second wireless node based at least in part on transmitting the periodic signals.

The reception component 1402 may receive, from the assisting node, one or more periodic signals that are associated with periodic signals that have been transmitted by the second wireless node to the assisting node. The transmission component 1404 may transmit, to the assisting node, a link establishment request associated with establishing the communication connection with the second wireless node based at least in part on transmitting the periodic signals, wherein the link establishment request is to be forwarded to the second wireless node by the assisting node.

The communication link establishment component 1408 may monitor the resources indicated by the control node for a signal from the assisting node. The reception component 1402 may receive, from the assisting node, a link establishment request sent by the second wireless node associated with establishing the communication connection with the second wireless node based at least in part on monitoring the resources indicated by the control node.

The transmission component 1404 may transmit, to the assisting node, a link establishment request associated with establishing the communication connection with the second wireless node using the resources indicated by the control node, wherein the link establishment request is to be forwarded to the second wireless node by the assisting node.

The reception component 1402 may receive, from the control node, an indication of QCL information associated with one or more beams to be used to communicate with the assisting node.

The transmission component 1404 may transmit an indication of one or more assisting nodes, including the assisting node, and one or more resources, including the resources indicated by the control node, to be used for initial access procedures with the first wireless node.

The communication link establishment component 1408 may perform an initial access procedure with the second wireless node using the assisting node based at least in part on transmitting the indication of the one or more assisting nodes and the one or more resources to be used for initial access procedures with the first wireless node.

The transmission component 1404 may transmit, to the assisting node, a first set of SSBs associated with the initial access procedure. The reception component 1402 may receive, from the assisting node, a link establishment request associated with establishing the communication connection with the second wireless node based at least in part on transmitting the first set of SSBs associated with the initial access procedure. The transmission component 1404 may transmit a second set of SSBs associated with an initial access procedure that does not use the assisting node.

The communication link establishment component 1408 may monitor one or more RACH occasions. The reception component 1402 may receive, from the assisting node, a link establishment request associated with establishing the communication connection with the second wireless node based at least in part on monitoring the one or more RACH occasions.

The reception component 1402 may receive, from at least one of the control node or the second wireless node, an indication of one or more assisting nodes, including the assisting node, and one or more resources, including the resources indicated by the control node, to be used for initial access procedures with the second wireless node.

The communication link establishment component 1408 may perform an initial access procedure with the second wireless node using the assisting node based at least in part on receiving the indication of the one or more assisting nodes and the one or more resources to be used for initial access procedures with the second wireless node.

The reception component 1402 may receive, from the assisting node, a set of SSBs associated with the initial access procedure, wherein the set of SSBs are associated with a set of SSBs transmitted by the second wireless node. The transmission component 1404 may transmit, to the assisting node, a link establishment request associated with establishing the communication connection with the second wireless node based at least in part on receiving the set of SSBs associated with the initial access procedure.

The transmission component 1404 may transmit, to the assisting node, a link establishment request associated with establishing the communication connection with the second wireless node during one or more RACH occasions. The transmission component 1404 may transmit to the assisting node, one or more reference signals to be forwarded by the assisting node using one or more forwarding configurations.

The reception component 1402 may receive, from the assisting node, one or more reference signals forwarded using one or more forwarding configurations. The communication link establishment component 1408 may perform one or more end-to-end measurements associated with the reference signals transmitted using the one or more forwarding configurations.

The determination component 1410 may determine a forwarding configuration for the assisting node, from the one or more forwarding configurations, for communications between the first wireless node and the second wireless node using the assisting node based at least in part on the one or more end-to-end measurements. In some aspects, the determination component 1410 may include a receive processor, a transmit MIMO processor, a transmit processor, a controller/processor, a memory, or a combination thereof, of the first wireless node described above in connection with FIG. 2. The transmission component 1404 may transmit, to the assisting node, an indication of the forwarding configuration.

The reception component 1402 may receive, from the control node, an indication of a forwarding configuration for the assisting node, from the one or more forwarding configurations, for communications between the first wireless node and the second wireless node using the assisting node that is based at least in part on the one or more end-to-end measurements.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
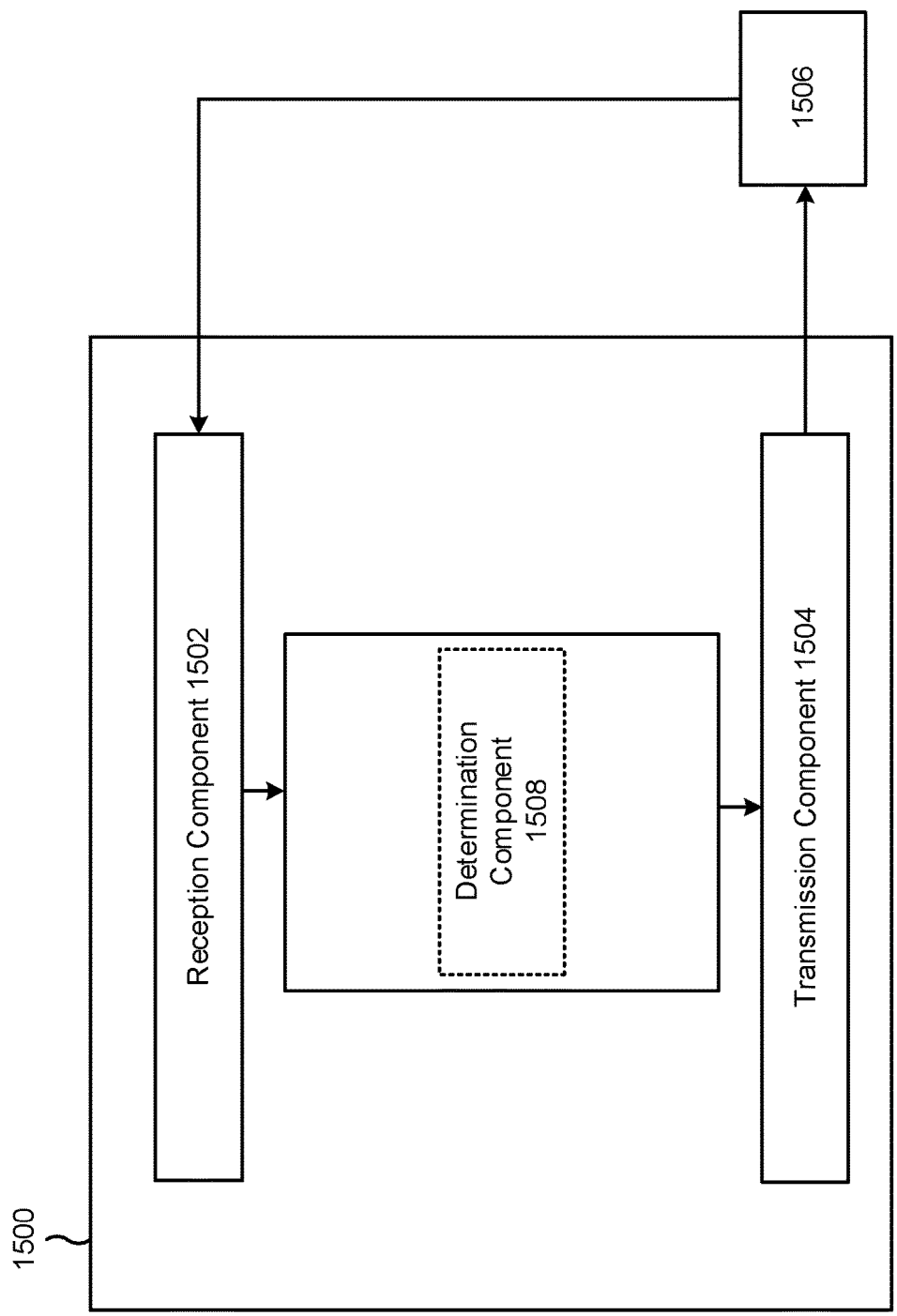

FIG. 15 is a block diagram of an example apparatus 1500 for wireless communication. The apparatus 1500 may be a control node, or a control node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a determination component 1508, among other examples.

In some aspects, the apparatus 1500 may be configured to perform one or more operations described herein in connection with FIGS. 6 and/or 7. Additionally or alternatively, the apparatus 1500 may be configured to perform one or more processes described herein, such as process 900 of FIG. 9, or a combination thereof. In some aspects, the apparatus 1500 and/or one or more components shown in FIG. 15 may include one or more components of the control node described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the control node described above in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the control node described above in connection with FIG. 2. In some aspects, the transmission component 1504 may be co-located with the reception component 1502 in a transceiver.

The transmission component 1504 may transmit, to at least one of a first wireless node or a second wireless node, an indication of an assisting node to be used to establish a communication connection between the first wireless node and the second wireless node, the indication including identifying information associated with the assisting node. The transmission component 1504 may transmit, to at least one of the first wireless node or the second wireless node, an indication of resources to be used to establish the communication connection between the first wireless node and the second wireless node.

The transmission component 1504 may transmit, to the second wireless node, an indication of resources associated with one or more periodic signals to be transmitted by the first wireless node to the assisting node. The transmission component 1504 may transmit, to the second wireless node, an indication of resources or RACH occasions that are to be monitored by the first wireless node. The transmission component 1504 may transmit, to the assisting node, an indication of one or more forwarding configurations to be used by the assisting node when forwarding communications between the first wireless node and the second wireless node.

The reception component 1502 may receive, from the first wireless node or the second wireless node, one or more end-to-end measurements associated with reference signals forwarded by the assisting node using one or more forwarding configurations.

The determination component 1508 may determine a forwarding configuration for the assisting node, from the one or more forwarding configurations, for communications between the first wireless node and the second wireless node using the assisting node based at least in part on the one or more end-to-end measurements. In some aspects, the determination component 1508 may include a receive processor, a transmit MIMO processor, a transmit processor, a controller/processor, a memory, or a combination thereof, of the control node described above in connection with FIG. 2. The transmission component 1504 may transmit, to at least one of the first wireless node, the second wireless node, or the assisting node, an indication of the forwarding configuration for the assisting node.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
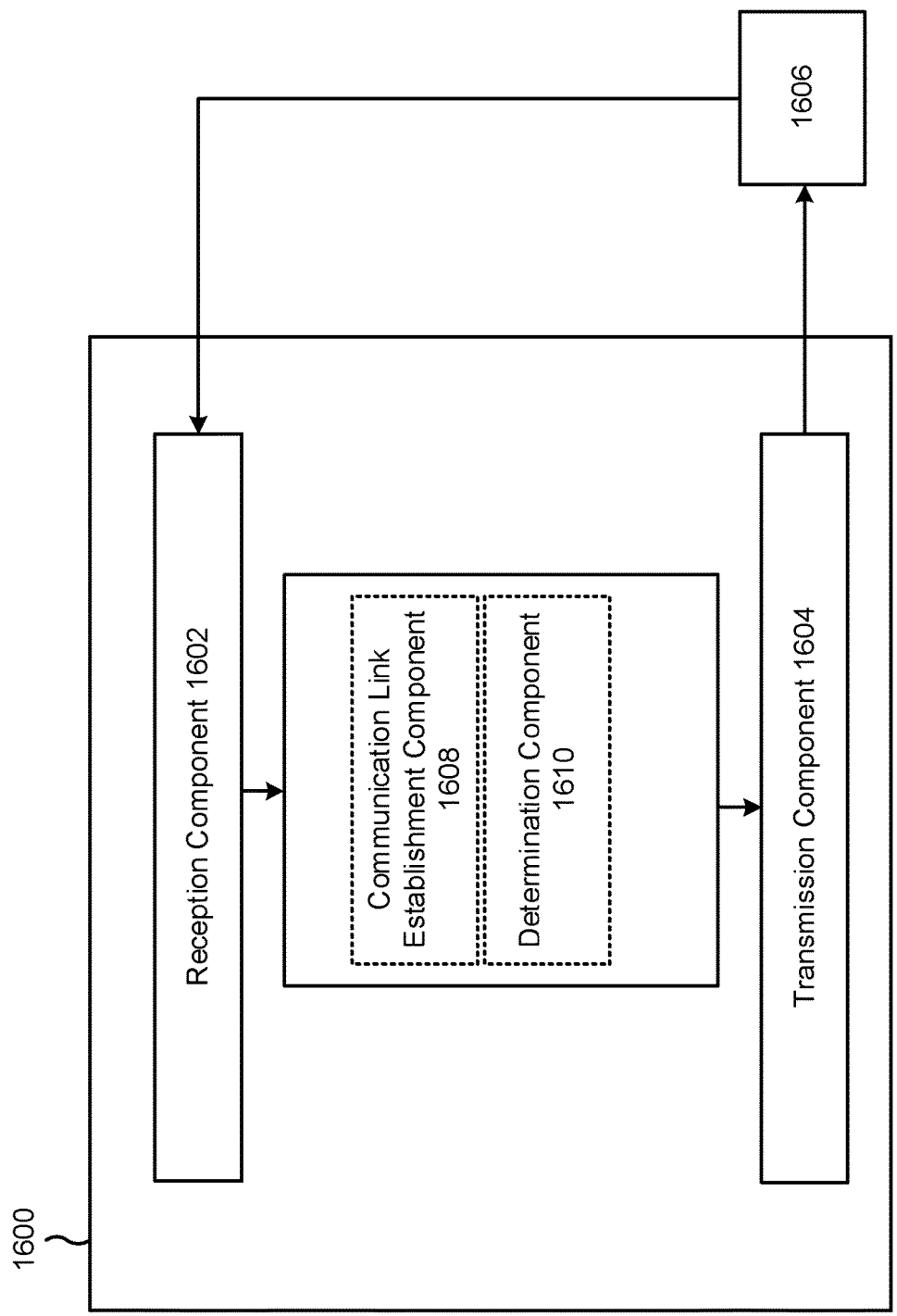

FIG. 16 is a block diagram of an example apparatus 1600 for wireless communication. The apparatus 1600 may be a first wireless node, or a first wireless node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include one or more of a communication link establishment component 1608, or a determination component 1610, among other examples.

In some aspects, the apparatus 1600 may be configured to perform one or more operations described herein in connection with FIGS. 6 and/or 7. Additionally or alternatively, the apparatus 1600 may be configured to perform one or more processes described herein, such as process 1000 of FIG. 10, or a combination thereof. In some aspects, the apparatus 1600 and/or one or more components shown in FIG. 16 may include one or more components of the first wireless node described above in connection with FIG. 2. Additionally, or alternatively, one or more components shown in FIG. 16 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the first wireless node described above in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the first wireless node described above in connection with FIG. 2. In some aspects, the transmission component 1604 may be co-located with the reception component 1602 in a transceiver.

The transmission component 1604 may transmit, to a second wireless node, an indication of an assisting node to be used to establish a communication connection between the first wireless node and the second wireless node, the indication including identifying information associated with the assisting node. The communication link establishment component 1608 may establish the communication connection with the second wireless node using the assisting node. In some aspects, the communication link establishment component 1608 may include one or more antennas, a demodulator, a MIMO detector, a receive processor, a modulator, a transmit MIMO processor, a transmit processor, a controller/processor, a memory, or a combination thereof, of the first wireless node described above in connection with FIG. 2.

The transmission component 1604 may transmit, to the second wireless node, an indication of resources to be used to establish the communication connection between the first wireless node and the second wireless node. The communication link establishment component 1608 may perform an initial access procedure with the second wireless node using the assisting node based at least in part on transmitting the indication of the assisting node to be used to establish the communication connection between the first wireless node and the second wireless node.

The transmission component 1604 may transmit, to the assisting node, a first set of SSBs associated with the initial access procedure. The reception component 1602 may receive, from the assisting node, a link establishment request associated with establishing the communication connection with the second wireless node based at least in part on transmitting the first set of SSBs associated with the initial access procedure. The transmission component 1604 may transmit a second set of SSBs associated with an initial access procedure that does not use the assisting node.

The communication link establishment component 1608 may monitor one or more RACH occasions. The reception component 1602 may receive, from the assisting node, a link establishment request associated with establishing the communication connection with the second wireless node based at least in part on monitoring the one or more RACH occasions.

The transmission component 1604 may transmit, to the assisting node, one or more reference signals to be forwarded by the assisting node using one or more forwarding configurations. The reception component 1602 may receive, from the second wireless node, an indication of one or more end-to-end measurements associated with the one or more reference signals. The determination component 1610 may determine a forwarding configuration for the assisting node, from the one or more forwarding configurations, for communications between the first wireless node and the second wireless node using the assisting node based at least in part on the one or more end-to-end measurements. In some aspects, the determination component 1610 may include a receive processor, a transmit MIMO processor, a transmit processor, a controller/processor, a memory, or a combination thereof, of the first wireless node described above in connection with FIG. 2.

The transmission component 1604 may transmit, to at least one of the assisting node or the second wireless node, an indication of the forwarding configuration. The reception component 1602 may receive, from a control node, an indication of a forwarding configuration for the assisting node, from the one or more forwarding configurations, for communications between the first wireless node and the second wireless node using the assisting node that is based at least in part on one or more end-to-end measurements associated with the one or more reference signals.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

Figure 17:
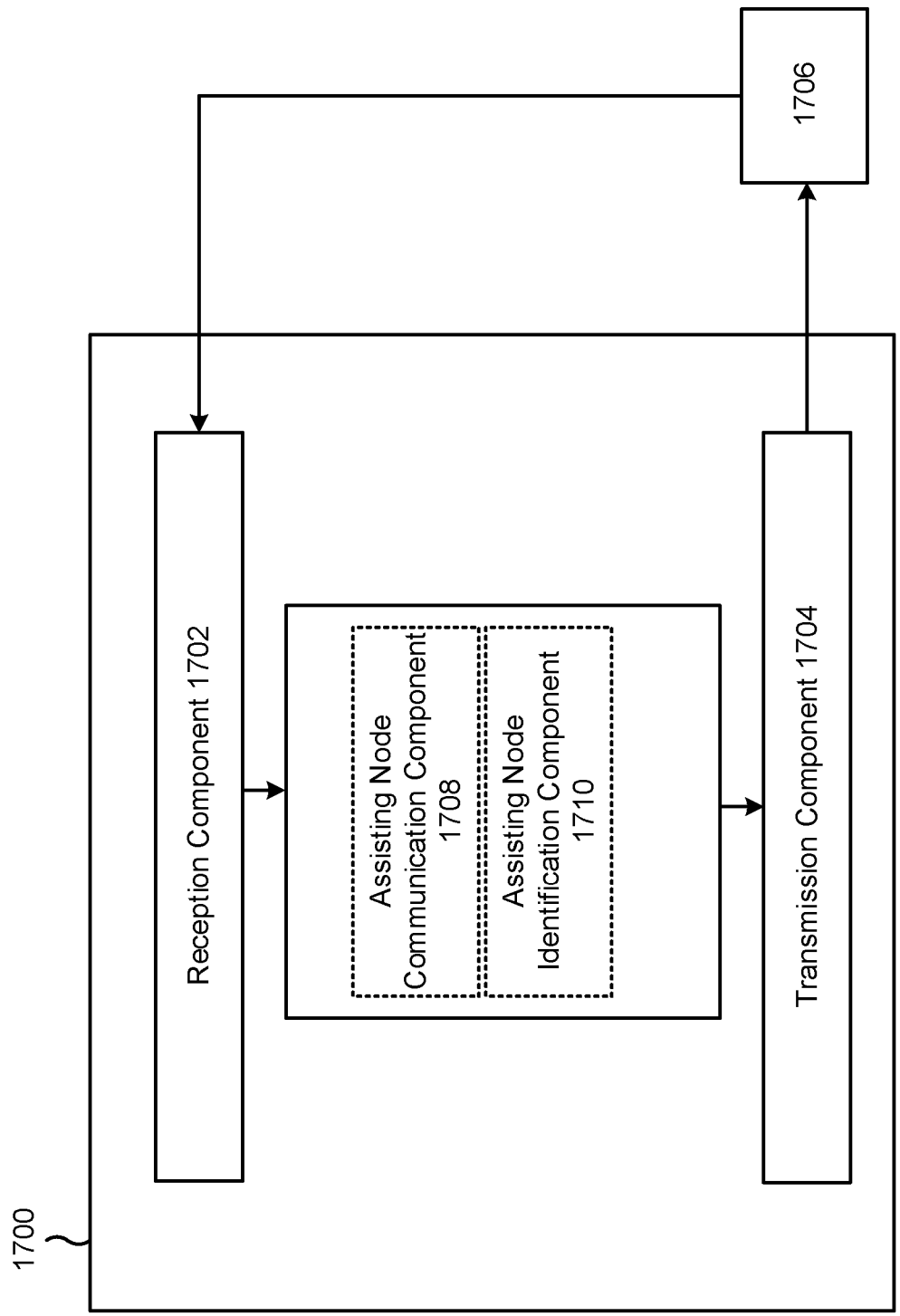

FIG. 17 is a block diagram of an example apparatus 1700 for wireless communication. The apparatus 1700 may be a wireless node, or a wireless node may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include one or more of an assisting node communication component 1708, or an assisting node identification component 1710, among other examples.

In some aspects, the apparatus 1700 may be configured to perform one or more operations described herein in connection with FIGS. 6 and/or 7. Additionally or alternatively, the apparatus 1700 may be configured to perform one or more processes described herein, such as process 1100 of FIG. 11, or a combination thereof. In some aspects, the apparatus 1700 and/or one or more components shown in FIG. 17 may include one or more components of the wireless node described above in connection with FIG. 2. Additionally, or alternatively, one or more components shown in FIG. 17 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the wireless node described above in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the wireless node described above in connection with FIG. 2. In some aspects, the transmission component 1704 may be co-located with the reception component 1702 in a transceiver.

The reception component 1702 may receive, from a second wireless node, an indication of one or more assisting nodes, the indication including identifying information for each assisting node, of the one or more assisting nodes, that enables the first wireless node to communicate using the one or more assisting nodes. The assisting node communication component 1708 may communicate, with the second wireless node or another wireless node, using at least one assisting node of the one or more assisting nodes. In some aspects, the assisting node communication component 1708 may include one or more antennas, a demodulator, a MIMO detector, a receive processor, a modulator, a transmit MIMO detector, a receive processor, a modulator, a transmit MIMO processor, a transmit processor, a controller/processor, a memory, or a combination thereof, of the wireless node described above in connection with FIG. 2. In some aspects, the assisting node communication component 1708 may cause the transmission component 1704 to transmit, to the second wireless node or another wireless node, a communication using at least one assisting node of the one or more assisting nodes. In some aspects, the assisting node communication component 1708 may cause the reception component 1702 to receive, from the second wireless node or another wireless node, a communication using at least one assisting node of the one or more assisting nodes.

The transmission component 1704 may transmit, to the second wireless node, a request for identifying information associated with assisting nodes. The reception component 1702 may receive, from the second wireless node, the indication of the one or more assisting nodes based at least in part on transmitting the request for identifying information associated with assisting nodes.

The transmission component 1704 may transmit an indication of at least one of the identifying information for the one or more assisting nodes or identifying information for one or more other assisting nodes. The transmission component 1704 may broadcast the indication of at least one of the identifying information for the one or more assisting nodes or the identifying information for one or more other assisting nodes. The transmission component 1704 may broadcast the indication in a system information block, or may broadcast the indication using a sidelink channel.

The reception component 1702 may receive, from the second wireless node or a third wireless node, a request for identifying information associated with assisting nodes. The transmission component 1704 may transmit, to the second wireless node or the third wireless node, the indication of at least one of the identifying information for the one or more assisting nodes, or the identifying information for one or more other assisting nodes, based at least in part on receiving the request for identifying information associated with assisting nodes.

The assisting node identification component 1710 may determine one or more relevant assisting nodes that can be used by other wireless nodes to communicate with the wireless node. In some aspects, the assisting node identification component 1710 may include one or more antennas, a demodulator, a MIMO detector, a receive processor, a modulator, a transmit MIMO processor, a transmit processor, a controller/processor, a memory, or a combination thereof, of the wireless node described above in connection with FIG. 2.

The transmission component 1704 may transmit an indication of identifying information for the one or more relevant assisting nodes. The assisting node identification component 1710 may determine one or more assisting nodes that are within a coverage area associated with the wireless node. The transmission component 1704 may broadcast the indication of the identifying information for the one or more relevant assisting nodes.

The reception component 1702 may receive, from the second wireless node or a third wireless node, a request for identifying information for relevant assisting nodes associated with the wireless node. The transmission component 1704 may transmit, to the second wireless node or the third wireless node, the indication of the identifying information for the one or more relevant assisting nodes based at least in part on receiving the request for identifying information for assisting nodes associated with the wireless node.

The transmission component 1704 may transmit an indication of identifying information for one or more assisting nodes that are assigned to the wireless node. The assisting node identification component 1710 may determine the one or more assisting nodes that are assigned to the wireless node. The reception component 1702 may receive an indication of one or more assisting nodes that are assigned to the wireless node.

The reception component 1702 may receive, from the second wireless node or a third wireless node, a request for identifying information for assisting nodes that are assigned to the wireless node. The transmission component 1704 may transmit, to the second wireless node or the third wireless node, the indication of the identifying information for one or more assisting nodes that are assigned to the wireless node based at least in part on receiving the request for identifying information for assisting nodes that are assigned to the wireless node.

The transmission component 1704 may transmit, to the second wireless node or a third wireless node, a request for identifying information for assisting nodes that are assigned to the wireless node. The reception component 1702 may receive, from the second wireless node or the third wireless node, an indication of one or more assisting nodes that are assigned to the wireless node based at least in part on transmitting the request for identifying information for assisting nodes that are assigned to the wireless node.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

Figure 18:
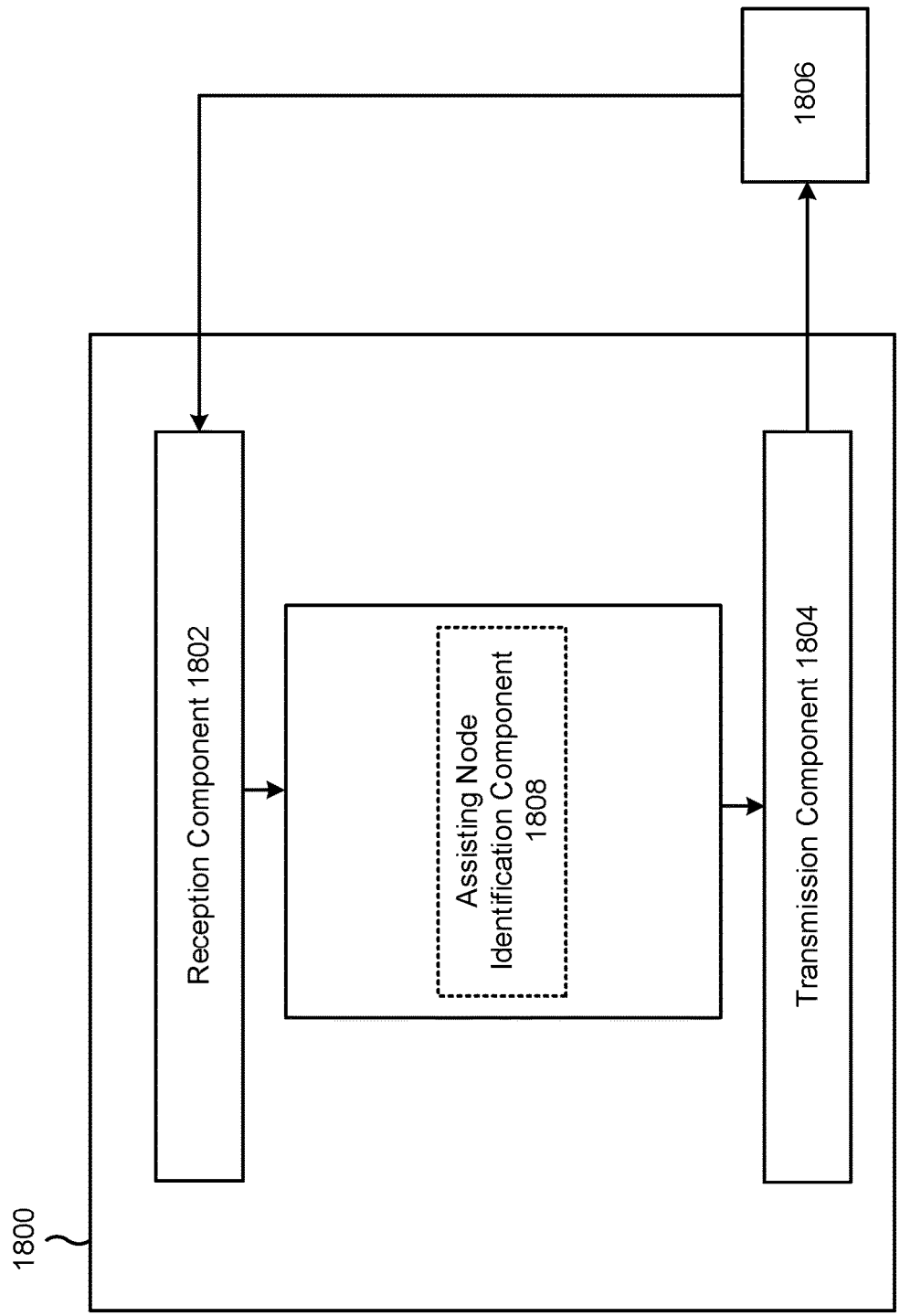

FIG. 18 is a block diagram of an example apparatus 1800 for wireless communication. The apparatus 1800 may be a wireless node, or a wireless node may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include an assisting node identification component 1808, among other examples.

In some aspects, the apparatus 1800 may be configured to perform one or more operations described herein in connection with FIGS. 6 and/or 7. Additionally or alternatively, the apparatus 1800 may be configured to perform one or more processes described herein, such as process 1200 of FIG. 12, or a combination thereof. In some aspects, the apparatus 1800 and/or one or more components shown in FIG. 18 may include one or more components of the wireless node described above in connection with FIG. 2. Additionally, or alternatively, one or more components shown in FIG. 18 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a demodulator, a MIMO detector, a receive processor, a controller/processor, a memory, or a combination thereof, of the wireless node described above in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the wireless node described above in connection with FIG. 2. In some aspects, the transmission component 1804 may be co-located with the reception component 1802 in a transceiver.

The assisting node identification component 1808 may determine identifying information for one or more assisting nodes. In some aspects, the assisting node identification component 1808 may include one or more antennas, a demodulator, a MIMO detector, a receive processor, a modulator, a transmit MIMO processor, a transmit processor, a controller/processor, a memory, or a combination thereof, of the wireless node described above in connection with FIG. 2. The transmission component 1804 may transmit, to a second wireless node, an indication of the one or more assisting nodes, the indication including identifying information for each assisting node, of the one or more assisting nodes, that enables the second wireless node to communicate using the one or more assisting nodes.

The reception component 1802 may receive, from the second wireless node, a request for identifying information associated with assisting nodes. The transmission component 1804 may transmit, to the second wireless node, the indication of the one or more assisting nodes based at least in part on receiving the request for identifying information associated with assisting nodes.

The reception component 1802 may receive, from the second wireless node or another wireless node, an indication of identifying information for the one or more assisting nodes or identifying information for one or more other assisting nodes. The reception component 1802 may receive the indication in a broadcast transmission.

The transmission component 1804 may transmit, to the second wireless node or the other wireless node, a request for identifying information associated with assisting nodes. The reception component 1802 may receive, from the second wireless node, an indication of identifying information for one or more relevant assisting nodes associated with the second wireless node. The reception component 1802 may receive the indication of the identifying information for the one or more relevant assisting nodes in a broadcast transmission.

The transmission component 1804 may transmit, to the second wireless node, a request for identifying information for relevant assisting nodes associated with the second wireless node. The reception component 1802 may receive, from the second wireless node, an indication of identifying information for one or more assisting nodes that are assigned to the second wireless node.

The transmission component 1804 may transmit, to the second wireless node, a request for identifying information for assisting nodes that are assigned to the second wireless node. The transmission component 1804 may transmit, to a third wireless node, an indication of the identifying information for the one or more assisting nodes that are assigned to the second wireless node.

The reception component 1802 may receive, from the second wireless node, a request for identifying information for assisting nodes that are assigned to the second wireless node. The assisting node identification component 1808 may determine one or more assisting nodes that are assigned to the second wireless node. The transmission component 1804 may transmit, to the second wireless node, an indication of one or more assisting nodes that are assigned to the second wireless node based at least in part on receiving the request for identifying information for assisting nodes that are assigned to the second wireless node.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally or alternatively, a set of (one or more) components shown in FIG. 18 may perform one or more functions described as being performed by another set of components shown in FIG. 18.

Figure 19:
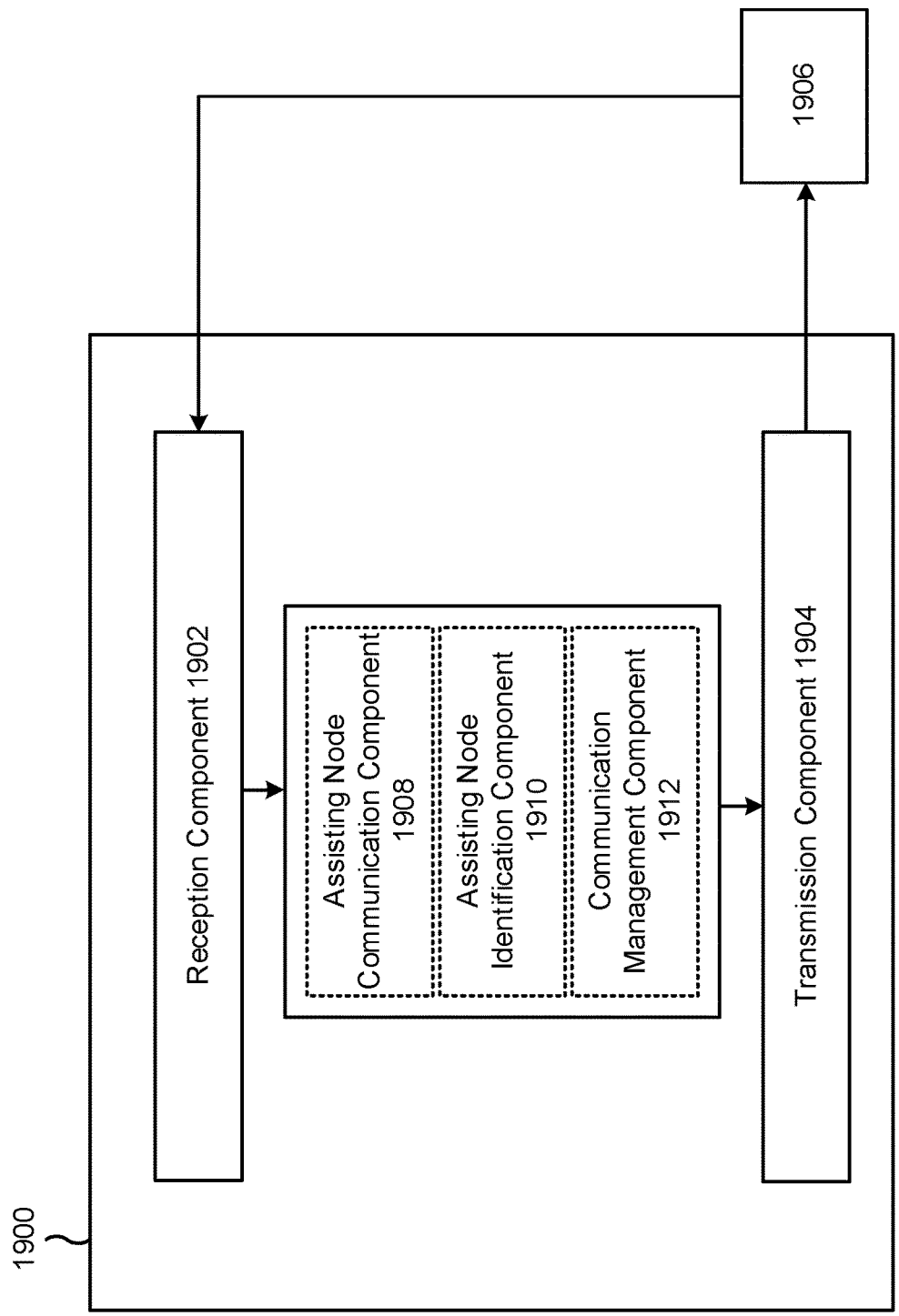

FIG. 19 is a block diagram of an example apparatus 1900 for wireless communication. The apparatus 1900 may be a wireless node, or a wireless node may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include one or more of an assisting node communication component 1908, an assisting node identification component 1910, or a communication management component 1912, among other examples.

In some aspects, the apparatus 1900 may be configured to perform one or more operations described herein in connection with FIGS. 6 and/or 7. Additionally or alternatively, the apparatus 1900 may be configured to perform one or more processes described herein, such as process 1300 of FIG. 13, or a combination thereof. In some aspects, the apparatus 1900 and/or one or more components shown in FIG. 19 may include one or more components of the wireless node described above in connection with FIG. 2. Additionally, or alternatively, one or more components shown in FIG. 19 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1906. In some aspects, the reception component 1902 may include one or more antennas, a demodulator, a MIMO detector, a receive processor, a controller/processor, a memory, or a combination thereof, of the wireless node described above in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the wireless node described above in connection with FIG. 2. In some aspects, the transmission component 1904 may be co-located with the reception component 1902 in a transceiver.

The reception component 1902 may receive, from a control node or a second wireless node, an indication of one or more assisting nodes associated with the second wireless node, the indication including identifying information for each assisting node, of the one or more assisting nodes, that enables the first wireless node to communicate with the second wireless node using the one or more assisting nodes. The assisting node communication component 1908 may communicate, with the second wireless node, using an assisting node of the one or more assisting nodes. In some aspects, the assisting node communication component 1908 may include one or more antennas, a demodulator, a MIMO detector, a receive processor, a modulator, a transmit MIMO processor, a transmit processor, a controller/processor, a memory, or a combination thereof, of the wireless node described above in connection with FIG. 2. In some aspects, the assisting node communication component 1908 may cause the reception component 1902 to receive, from the second wireless node, a communication using an assisting node of the one or more assisting nodes. In some aspects, the assisting node communication component 1908 may cause the transmission component 1904 to transmit, to the second wireless node, a communication using an assisting node of the one or more assisting nodes.

The transmission component 1904 may transmit, to the control node or the second wireless node, a request for identifying information for assisting nodes associated with the second wireless node. In some aspects, the wireless node includes means for receiving, from the control node or a third wireless node, an indication of one or more relevant assisting nodes associated with the second wireless node. The reception component 1902 may receive, from the control node or a third wireless node, an indication of one or more assisting nodes that are assigned to the second wireless node.

The assisting node communication component 1908 may communicate, with the second wireless node, using an assisting node of the one or more assisting nodes that are assigned to the second wireless node. The assisting node identification component 1910 may determine one or more available assisting nodes based at least in part on the indication of the one or more assisting nodes that are assigned to the second wireless node. In some aspects, the assisting node identification component 1910 may include one or more antennas, a demodulator, a MIMO detector, a receive processor, a modulator, a transmit MIMO processor, a transmit processor, a controller/processor, a memory, or a combination thereof, of the wireless node described above in connection with FIG. 2.

The communication management component 1912 may perform at least one of an interference procedure or a beam management procedure based at least in part on the indication of the one or more assisting nodes that are assigned to the second wireless node. The assisting node communication component 1908 may perform a handover procedure, for handing over one or more child nodes associated with the wireless node to the second wireless node, with the second wireless node using an assisting node of the one or more assisting nodes that are assigned to the second wireless node.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally or alternatively, a set of (one or more) components shown in FIG. 19 may perform one or more functions described as being performed by another set of components shown in FIG. 19.

The following provides an overview of some Aspects of the present disclosure:

Aspect 1: A method of wireless communication performed by a first wireless node, comprising: receiving, from a control node or a second wireless node, an indication of an assisting node to be used to establish a communication connection between the first wireless node and the second wireless node, the indication including identifying information associated with the assisting node; and establishing the communication connection with the second wireless node using the assisting node.

Aspect 2: The method of Aspect 1, further comprising: receiving, from the control node, an indication of resources to be used to establish the communication connection between the first wireless node and the second wireless node.

Aspect 3: The method of any of Aspects 1-2, wherein the assisting node is at least one of: a repeater node, a reflector node, a configurable assisting node, or a non-configurable assisting node.

Aspect 4: The method of any of Aspects 1-3, wherein establishing the communication connection with the second wireless node using the assisting node comprises: transmitting, to the assisting node, a first signal using resources indicated by the control node, wherein the first signal is to be forwarded to the second wireless node by the assisting node.

Aspect 5: The method of any of Aspects 1-4, wherein establishing the communication connection with the second wireless node using the assisting node comprises: receiving, from the assisting node, a second signal using resources indicated by the control node, wherein the second signal is associated with a third signal that has been transmitted by the second wireless node to the assisting node.

Aspect 6: The method of any of Aspects 1-5, wherein establishing the communication connection with the second wireless node using the assisting node comprises: transmitting, to the assisting node, periodic signals to be forwarded by the assisting node; and receiving, from the assisting node, a signal associated with a link establishment request sent by the second wireless node associated with establishing the communication connection with the second wireless node based at least in part on transmitting the periodic signals.

Aspect 7: The method of Aspect 6, wherein the periodic signals include at least one of: one or more synchronization signal blocks (SSBs), one or more channel state information reference signals (CSI-RSs), or one or more discovery signals.

Aspect 8: The method of any of Aspects 1-7, wherein establishing the communication connection with the second wireless node using the assisting node comprises: receiving, from the assisting node, one or more periodic signals that are associated with periodic signals that have been transmitted by the second wireless node to the assisting node; and transmitting, to the assisting node, a link establishment request associated with establishing the communication connection with the second wireless node based at least in part on transmitting the periodic signals, wherein the link establishment request is to be forwarded to the second wireless node by the assisting node.

Aspect 9: The method of any of Aspects 1-8, wherein establishing the communication connection with the second wireless node using the assisting node comprises: monitoring the resources indicated by the control node for a signal from the assisting node; and receiving, from the assisting node, a link establishment request sent by the second wireless node associated with establishing the communication connection with the second wireless node based at least in part on monitoring the resources indicated by the control node.

Aspect 10: The method of any of Aspects 1-9, wherein establishing the communication connection with the second wireless node using the assisting node comprises: transmitting, to the assisting node, a link establishment request associated with establishing the communication connection with the second wireless node using resources indicated by the control node, wherein the link establishment request is to be forwarded to the second wireless node by the assisting node.

Aspect 11: The method of Aspect 10, wherein the link establishment request is a random access message associated with a random access channel (RACH) procedure.

Aspect 12: The method of any of Aspects 1-11, further comprising: receiving, from the control node, an indication of quasi co-location (QCL) information associated with one or more beams to be used to communicate with the assisting node.

Aspect 13: The method of any of Aspects 1-12, further comprising: transmitting an indication of one or more assisting nodes, including the assisting node, and one or more resources, including the resources indicated by the control node, to be used for initial access procedures with the first wireless node.

Aspect 14: The method of Aspect 13, wherein establishing the communication connection with the second wireless node using the assisting node comprises: performing an initial access procedure with the second wireless node using the assisting node based at least in part on transmitting the indication of the one or more assisting nodes and the one or more resources to be used for initial access procedures with the first wireless node.

Aspect 15: The method of Aspect 14, wherein performing the initial access procedure with the second wireless node using the assisting node comprises: transmitting, to the assisting node, a first set of synchronization signal blocks (SSBs) associated with the initial access procedure; and receiving, from the assisting node, a link establishment request associated with establishing the communication connection with the second wireless node based at least in part on transmitting the first set of SSBs associated with the initial access procedure.

Aspect 16: The method of Aspect 15, further comprising: transmitting a second set of SSBs associated with an initial access procedure that does not use the assisting node, wherein the first set of SSBs is associated with at least one of: a different periodicity than the second set of SSBs, or a different frequency than the second set of SSBs. wherein the first set of SSBs is associated with at least one of: a different periodicity than the second set of SSBs, or a different frequency than the second set of SSBs.

Aspect 17: The method of any of Aspects 14-16, wherein performing the initial access procedure with the second wireless node using the assisting node comprises: monitoring one or more random access channel (RACH) occasions; and receiving, from the assisting node, a link establishment request associated with establishing the communication connection with the second wireless node based at least in part on monitoring the one or more RACH occasions.

Aspect 18: The method of any of Aspects 1-17, further comprising: receiving, from at least one of the control node or the second wireless node, an indication of one or more assisting nodes, including the assisting node, and one or more resources, including the resources indicated by the control node, to be used for initial access procedures with the second wireless node.

Aspect 19: The method of Aspect 18, wherein establishing the communication connection with the second wireless node using the assisting node comprises: performing an initial access procedure with the second wireless node using the assisting node based at least in part on receiving the indication of the one or more assisting nodes and the one or more resources to be used for initial access procedures with the second wireless node.

Aspect 20: The method of Aspect 19, wherein performing the initial access procedure with the second wireless node using the assisting node comprises: receiving, from the assisting node, a set of synchronization signal blocks (SSBs) associated with the initial access procedure, wherein the set of SSBs are associated with a set of SSBs transmitted by the second wireless node; and transmitting, to the assisting node, a link establishment request associated with establishing the communication connection with the second wireless node based at least in part on receiving the set of SSBs associated with the initial access procedure.

Aspect 21: The method of any of Aspects 19-20, wherein performing the initial access procedure with the second wireless node using the assisting node comprises: transmitting, to the assisting node, a link establishment request associated with establishing the communication connection with the second wireless node during one or more random access channel (RACH) occasions.

Aspect 22: The method of any of Aspects 1-21, wherein establishing the communication connection with the second wireless node using the assisting node comprises: transmitting, to the assisting node, one or more reference signals to be forwarded by the assisting node using one or more forwarding configurations.

Aspect 23: The method of any of Aspects 1-22, wherein establishing the communication connection with the second wireless node using the assisting node comprises: receiving, from the assisting node, one or more reference signals forwarded using one or more forwarding configurations; and performing one or more end-to-end measurements associated with the one or more reference signals forwarded using the one or more forwarding configurations.

Aspect 24: The method of any of Aspects 1-23, further comprising: determining a forwarding configuration for the assisting node, from one or more forwarding configurations, for communications between the first wireless node and the second wireless node using the assisting node based at least in part on one or more end-to-end measurements associated with one or more reference signals forwarded by the assisting node using the one or more forwarding configurations.

Aspect 25: The method of Aspect 24, further comprising: transmitting, to at least one of the assisting node or the control node, an indication of the forwarding configuration.

Aspect 26: The method of any of Aspects 22-25, further comprising: receiving, from the control node, an indication of a forwarding configuration for the assisting node, from the one or more forwarding configurations, for communications between the first wireless node and the second wireless node using the assisting node that is based at least in part on one or more end-to-end measurements associated with one or more reference signals forwarded by the assisting node using the one or more forwarding configurations.

Aspect 27: The method of any of Aspects 22-26, wherein the one or more forwarding configurations includes at least one of: a receive beam direction, a transmit beam direction, a transmit power configuration, a reflecting direction, or a reflecting configuration.

Aspect 28: The method of any of Aspects 1-27, further comprising: communicating, with the second wireless node or another wireless node, using the assisting node.

Aspect 29: The method of any of Aspects 1-28, further comprising: transmitting, to the second wireless node, a request for identifying information associated with the assisting node.

Aspect 30: The method of any of Aspects 1-29, further comprising: transmitting an indication of identifying information for one or more relevant assisting nodes that can be used by other wireless nodes to communicate with the first wireless node.

Aspect 31: The method of any of Aspects 1-30, further comprising: transmitting an indication of identifying information for one or more assisting nodes that are assigned to the first wireless node.

Aspect 32: A method of wireless communication performed by a control node, comprising: transmitting, to at least one of a first wireless node or a second wireless node, an indication of an assisting node to be used to establish a communication connection between the first wireless node and the second wireless node, the indication including identifying information associated with the assisting node; and transmitting, to at least one of the first wireless node or the second wireless node, an indication of resources to be used to establish the communication connection between the first wireless node and the second wireless node.

Aspect 33: The method of Aspect 32, wherein the assisting node is at least one of: a repeater node, a reflector node, a configurable assisting node, or a non-configurable assisting node.

Aspect 34: The method of any of Aspects 32-33, wherein transmitting the indication of the assisting node and transmitting the indication of the resources to be used to establish the communication connection between the first wireless node and the second wireless node enables the first wireless node and the second wireless node to establish the communication connection using the assisting node.

Aspect 35: The method of any of Aspects 32-34, wherein transmitting the indication of resources to be used to establish the communication connection between the first wireless node and the second wireless node comprises: transmitting, to the second wireless node, an indication of resources associated with one or more periodic signals to be transmitted by the first wireless node to the assisting node.

Aspect 36: The method of any of Aspects 32-35, wherein transmitting the indication of resources to be used to establish the communication connection between the first wireless node and the second wireless node comprises: transmitting, to the second wireless node, an indication of resources or random access channel (RACH) occasions that are to be monitored by the first wireless node.

Aspect 37: The method of any of Aspects 32-36, further comprising: transmitting, to the assisting node, an indication of one or more forwarding configurations to be used by the assisting node when forwarding communications between the first wireless node and the second wireless node.

Aspect 38: The method of any of Aspects 32-37, further comprising: receiving, from the first wireless node or the second wireless node, one or more end-to-end measurements associated with reference signals forwarded by the assisting node using one or more forwarding configurations.

Aspect 39: The method of Aspect 38, further comprising: determining a forwarding configuration for the assisting node, from the one or more forwarding configurations, for communications between the first wireless node and the second wireless node using the assisting node based at least in part on the one or more end-to-end measurements.

Aspect 40: The method of Aspect 39, further comprising: transmitting, to at least one of the first wireless node, the second wireless node, or the assisting node, an indication of the forwarding configuration for the assisting node.

Aspect 41: A method of wireless communication performed by a first wireless node, comprising: transmitting, to a second wireless node, an indication of an assisting node to be used to establish a communication connection between the first wireless node and the second wireless node, the indication including identifying information associated with the assisting node; and establishing the communication connection with the second wireless node using the assisting node.

Aspect 42: The method of Aspect 41, further comprising: transmitting, to the second wireless node, an indication of resources to be used to establish the communication connection between the first wireless node and the second wireless node.

Aspect 43: The method of any of Aspects 41-42, wherein establishing the communication connection with the second wireless node using the assisting node comprises: performing an initial access procedure with the second wireless node using the assisting node based at least in part on transmitting the indication of the assisting node to be used to establish the communication connection between the first wireless node and the second wireless node.

Aspect 44: The method of Aspect 43, wherein performing the initial access procedure with the second wireless node using the assisting node comprises: transmitting, to the assisting node, a first set of synchronization signal blocks (SSBs) associated with the initial access procedure; and receiving, from the assisting node, a link establishment request associated with establishing the communication connection with the second wireless node based at least in part on transmitting the first set of SSBs associated with the initial access procedure.

Aspect 45: The method of any of Aspects 43-44, further comprising: transmitting a second set of SSBs associated with an initial access procedure that does not use the assisting node, wherein the first set of SSBs is associated with at least one of: a different periodicity than the second set of SSBs, or a different frequency than the second set of SSBs.

Aspect 46: The method of any of Aspects 43-45, wherein performing the initial access procedure with the second wireless node using the assisting node comprises: monitoring one or more random access channel (RACH) occasions; and receiving, from the assisting node, a link establishment request associated with establishing the communication connection with the second wireless node based at least in part on monitoring the one or more RACH occasions.

Aspect 47: The method of any of Aspects 41-46, wherein establishing the communication connection with the second wireless node using the assisting node comprises: transmitting, to the assisting node, one or more reference signals to be forwarded by the assisting node using one or more forwarding configurations.

Aspect 48: The method of Aspect 47, further comprising: receiving, from the second wireless node, an indication of one or more end-to-end measurements associated with the one or more reference signals; and determining a forwarding configuration for the assisting node, from the one or more forwarding configurations, for communications between the first wireless node and the second wireless node using the assisting node based at least in part on the one or more end-to-end measurements.

Aspect 49: The method of Aspect 48, further comprising: transmitting, to at least one of the assisting node or the second wireless node, an indication of the forwarding configuration.

Aspect 50: The method of any of Aspects 47-49, further comprising: receiving, from a control node, an indication of a forwarding configuration for the assisting node, from the one or more forwarding configurations, for communications between the first wireless node and the second wireless node using the assisting node that is based at least in part on one or more end-to-end measurements associated with the one or more reference signals.

Aspect 51: A method of wireless communication performed by a first wireless node, comprising: receiving, from a second wireless node, an indication of one or more assisting nodes, the indication including identifying information for each assisting node, of the one or more assisting nodes, that enables the first wireless node to communicate using the one or more assisting nodes; and communicating, with the second wireless node or another wireless node, using at least one assisting node of the one or more assisting nodes.

Aspect 52: The method of Aspect 51, wherein the one or more assisting nodes include at least one of: a repeater node, a reflector node, a configurable assisting node, or a non-configurable assisting node.

Aspect 53: The method of any of Aspects 51-52, wherein the identifying information for an assisting node includes an indication of at least one of: an identifier associated with the assisting node, location information associated with the assisting node, capability information associated with the assisting node, receiving directions associated with the assisting node, or forwarding directions associated with the assisting node.

Aspect 54: The method of Aspect 53, wherein the indication of the identifier associated with the assisting node includes an indication of at least one of: a unique identifier associated with the assisting node, or an index value associated with the assisting node.

Aspect 55: The method of any of Aspects 53-54, wherein the indication of the location information associated with the assisting node includes an indication of at least one of: absolute location information associated with the assisting node, relative location information associated with the assisting node, spatial direction information associated with the assisting node, a distance between the assisting node and the first wireless node or between the assisting node and a different wireless node, or geographical coordinates associated with the assisting node.

Aspect 56: The method of any of Aspects 53-55, wherein the indication of the capability information associated with the assisting node includes an indication of at least one of: a type associated with the assisting node, whether the assisting node is configurable or non-configurable, or one or more configurations associated with the assisting node.

Aspect 57: The method of any of Aspects 51-56, wherein the first wireless node is at least one of: a central unit of an integrated access and backhaul (TAB) donor, a distributed unit of an IAB node, a mobile termination component of an IAB node, a user equipment (UE), or a base station.

Aspect 58: The method of any of Aspects 51-57, wherein the second wireless node is at least one of: an operations, administration, and maintenance (OAM) module, a core network device, a central unit of an integrated access and backhaul (TAB) donor, a parent node associated with the first wireless node, an IAB node, a distributed unit of an IAB node, a base station, a user equipment, or a roadside unit.

Aspect 59: The method of any of Aspects 51-58, wherein receiving the indication of the one or more assisting nodes comprises receiving the indication via at least one of: an operations, administration, and maintenance (OAM) interface, an F1 application protocol interface, a Uu interface, or a PC5 interface.

Aspect 60: The method of any of Aspects 51-59, wherein receiving the indication of the one or more assisting nodes comprises receiving the indication via: a radio resource control message, or a medium access control (MAC) control element (MAC-CE) message.

Aspect 61: The method of any of Aspects 51-60, further comprising: transmitting, to the second wireless node, a request for identifying information associated with assisting nodes.

Aspect 62: The method of Aspect 61, wherein receiving the indication of the one or more assisting nodes comprises: receiving, from the second wireless node, the indication of the one or more assisting nodes based at least in part on transmitting the request for identifying information associated with assisting nodes.

Aspect 63: The method of any of Aspects 51-62, further comprising: transmitting an indication of at least one of the identifying information for the one or more assisting nodes or identifying information for one or more other assisting nodes.

Aspect 64: The method of Aspect 63, wherein transmitting the indication of at least one of the identifying information for the one or more assisting nodes or the identifying information for one or more other assisting nodes comprises transmitting the indication to at least one of: an operations, administration, and maintenance (OAM) module, a core network device, a central unit of an integrated access and backhaul (IAB) donor, a parent node associated with the first wireless node, an TAB node, a distributed unit of an TAB node, a base station, a user equipment, or a roadside unit.

Aspect 65: The method of any of Aspects 63-64, wherein transmitting the indication of at least one of the identifying information for the one or more assisting nodes or the identifying information for one or more other assisting nodes comprises: broadcasting the indication of at least one of the identifying information for the one or more assisting nodes or the identifying information for one or more other assisting nodes.

Aspect 66: The method of Aspect 65, wherein broadcasting the indication comprises at least one of: broadcasting the indication in a system information block, or broadcasting the indication using a sidelink channel.

Aspect 67: The method of any of Aspects 63-66, further comprising: receiving, from the second wireless node or a third wireless node, a request for identifying information associated with assisting nodes.

Aspect 68: The method of Aspect 67, wherein transmitting the indication of at least one of the identifying information for the one or more assisting nodes or the identifying information for one or more other assisting nodes comprises: transmitting, to the second wireless node or the third wireless node, the indication of at least one of the identifying information for the one or more assisting nodes or the identifying information for one or more other assisting nodes based at least in part on receiving the request for identifying information associated with assisting nodes.

Aspect 69: The method of any of Aspects 51-68, further comprising: determining one or more relevant assisting nodes that can be used by other wireless nodes to communicate with the first wireless node; and transmitting an indication of identifying information for the one or more relevant assisting nodes.

Aspect 70: The method of Aspect 69, wherein determining the one or more relevant assisting nodes that can be used by other wireless nodes to communicate with the first wireless node comprises: determining one or more assisting nodes that are within a coverage area associated with the first wireless node.

Aspect 71: The method of any of Aspects 69-70, wherein transmitting the indication of the identifying information for the one or more relevant assisting nodes comprises: broadcasting the indication of the identifying information for the one or more relevant assisting nodes.

Aspect 72: The method of any of Aspects 69-71, further comprising: receiving, from the second wireless node or a third wireless node, a request for identifying information for relevant assisting nodes associated with the first wireless node.

Aspect 73: The method of Aspect 72, wherein transmitting the indication of the identifying information for the one or more relevant assisting nodes comprises: transmitting, to the second wireless node or the third wireless node, the indication of the identifying information for the one or more relevant assisting nodes based at least in part on receiving the request for identifying information for assisting nodes associated with the first wireless node.

Aspect 74: The method of any of Aspects 51-73, further comprising: transmitting an indication of identifying information for one or more assisting nodes that are assigned to the first wireless node.

Aspect 75: The method of Aspect 74, further comprising at least one of: determining the one or more assisting nodes that are assigned to the first wireless node; or receiving an indication of one or more assisting nodes that are assigned to the first wireless node.

Aspect 76: The method of any of Aspects 74-75, further comprising: receiving, from the second wireless node or a third wireless node, a request for identifying information for assisting nodes that are assigned to the first wireless node.

Aspect 77: The method of Aspect 76, wherein transmitting the indication of the identifying information for one or more assisting nodes that are assigned to the first wireless node comprises: transmitting, to the second wireless node or the third wireless node, the indication of the identifying information for one or more assisting nodes that are assigned to the first wireless node based at least in part on receiving the request for identifying information for assisting nodes that are assigned to the first wireless node.

Aspect 78: The method of any of Aspects 74-77, further comprising: transmitting, to the second wireless node or a third wireless node, a request for identifying information for assisting nodes that are assigned to the first wireless node.

Aspect 79: The method of Aspect 78, further comprising: receiving, from the second wireless node or the third wireless node, an indication of one or more assisting nodes that are assigned to the first wireless node based at least in part on transmitting the request for identifying information for assisting nodes that are assigned to the first wireless node.

Aspect 80: The method of any of Aspects 51-79, wherein identifying information for an assisting node includes conditional information associated with the assisting node.

Aspect 81: The method of Aspect 80, wherein the conditional information includes at least one of: a time interval associated with communicating using the assisting node, a periodic time interval associated with communicating using the assisting node, a transmit direction of the assisting node, a receive direction of the assisting node, one or more permissible configurations for the assisting node, a frequency band associated with the assisting node, one or more resource blocks associated with the assisting node, a communication direction associated with the assisting node, a reference signal resource allocation associated with the assisting node, a reference signal configuration associated with the assisting node, a transmit timing reference associated with the assisting node, or a numerology associated with the assisting node.

Aspect 82: A method of wireless communication performed by a first wireless node, comprising: determining identifying information for one or more assisting nodes; and transmitting, to a second wireless node, an indication of the one or more assisting nodes, the indication including identifying information for each assisting node, of the one or more assisting nodes, that enables the second wireless node to communicate using the one or more assisting nodes.

Aspect 83: The method of Aspect 82, wherein the one or more assisting nodes include at least one of: a repeater node, a reflector node, a configurable assisting node, or a non-configurable assisting node.

Aspect 84: The method of any of Aspects 82-83, wherein the identifying information for an assisting node includes an indication of at least one of: an identifier associated with the assisting node, location information associated with the assisting node, capability information associated with the assisting node, receiving directions associated with the assisting node, or forwarding directions associated with the assisting node.

Aspect 85: The method of Aspect 84, wherein the indication of the identifier associated with the assisting node includes an indication of at least one of: a unique identifier associated with the assisting node, or an index value associated with the assisting node.

Aspect 86: The method of any of Aspects 84-85, wherein the indication of the location information associated with the assisting node includes an indication of at least one of: absolute location information associated with the assisting node, relative location information associated with the assisting node, spatial direction information associated with the assisting node, a distance between the assisting node and the second wireless node or between the assisting node and a different wireless node, or geographical coordinates associated with the assisting node.

Aspect 87: The method of any of Aspects 84-86, wherein the indication of the capability information associated with the assisting node includes an indication of at least one of: a type associated with the assisting node, whether the assisting node is configurable or non-configurable, or one or more configurations associated with the assisting node.

Aspect 88: The method of any of Aspects 82-87, wherein the second wireless node is at least one of: a central unit of an integrated access and backhaul (IAB) donor, a distributed unit of an IAB node, a mobile termination component of an IAB node, a user equipment (UE), or a base station.

Aspect 89: The method of any of Aspects 82-88, wherein the first wireless node is at least one of: an operations, administration, and maintenance (OAM) module, a core network device, a central unit of an integrated access and backhaul (IAB) donor, a parent node associated with the second wireless node, an IAB node, a distributed unit of an IAB node, a base station, a user equipment, or a roadside unit.

Aspect 90: The method of any of Aspects 82-89, wherein transmitting the indication of the one or more assisting nodes comprises transmitting the indication via at least one of: an operations, administration, and maintenance (OAM) interface, an F1 application protocol interface, a Uu interface, or a PC5 interface.

Aspect 91: The method of any of Aspects 82-90, wherein transmitting the indication of the one or more assisting nodes comprises transmitting the indication via: a radio resource control message, or a medium access control (MAC) control element (MAC-CE) message.

Aspect 92: The method of any of Aspects 82-91, further comprising: receiving, from the second wireless node, a request for identifying information associated with assisting nodes.

Aspect 93: The method of Aspect 92, wherein transmitting the indication of the one or more assisting nodes comprises: transmitting, to the second wireless node, the indication of the one or more assisting nodes based at least in part on receiving the request for identifying information associated with assisting nodes.

Aspect 94: The method of any of Aspects 82-93, further comprising: receiving, from the second wireless node or another wireless node, an indication of identifying information for the one or more assisting nodes or identifying information for one or more other assisting nodes.

Aspect 95: The method of Aspect 94, wherein receiving, from the second wireless node or the other wireless node, the indication of identifying information for the one or more assisting nodes or identifying information for one or more other assisting nodes comprises: receiving the indication in a broadcast transmission.

Aspect 96: The method of any of Aspects 94-95, further comprising: transmitting, to the second wireless node or the other wireless node, a request for identifying information associated with assisting nodes.

Aspect 97: The method of any of Aspects 82-96, further comprising: receiving, from the second wireless node, an indication of identifying information for one or more relevant assisting nodes associated with the second wireless node.

Aspect 98: The method of Aspect 97, wherein receiving the indication of the identifying information for the one or more relevant assisting nodes comprises: receiving the indication of the identifying information for the one or more relevant assisting nodes in a broadcast transmission.

Aspect 99: The method of any of Aspects 97-98, further comprising: transmitting, to the second wireless node, a request for identifying information for relevant assisting nodes associated with the second wireless node.

Aspect 100: The method of any of Aspects 82-99, further comprising: receiving, from the second wireless node, an indication of identifying information for one or more assisting nodes that are assigned to the second wireless node.

Aspect 101: The method of Aspect 100, further comprising: transmitting, to the second wireless node, a request for identifying information for assisting nodes that are assigned to the second wireless node.

Aspect 102: The method of any of Aspects 100-101, further comprising: transmitting, to a third wireless node, an indication of the identifying information for the one or more assisting nodes that are assigned to the second wireless node.

Aspect 103: The method of any of Aspects 82-102, further comprising: receiving, from the second wireless node, a request for identifying information for assisting nodes that are assigned to the second wireless node.

Aspect 104: The method of Aspect 103, further comprising: determining one or more assisting nodes that are assigned to the second wireless node.

Aspect 105: The method of any of Aspects 103-104, further comprising: transmitting, to the second wireless node, an indication of one or more assisting nodes that are assigned to the second wireless node based at least in part on receiving the request for identifying information for assisting nodes that are assigned to the second wireless node.

Aspect 106: The method of any of Aspects 82-105, wherein identifying information for an assisting node includes conditional information associated with the assisting node.

Aspect 107: The method of Aspect 106, wherein the conditional information includes at least one of: a time interval associated with communicating using the assisting node, a periodic time interval associated with communicating using the assisting node, a transmit direction of the assisting node, a receive direction of the assisting node, one or more permissible configurations for the assisting node, a frequency band associated with the assisting node, one or more resource blocks associated with the assisting node, a communication direction associated with the assisting node, a reference signal resource allocation associated with the assisting node, a reference signal configuration associated with the assisting node, a transmit timing reference associated with the assisting node, or a numerology associated with the assisting node.

Aspect 108: A method of wireless communication performed by a first wireless node, comprising: receiving, from a control node or a second wireless node, an indication of one or more assisting nodes associated with the second wireless node, the indication including identifying information for each assisting node, of the one or more assisting nodes, that enables the first wireless node to communicate with the second wireless node using the one or more assisting nodes; and communicating, with the second wireless node, using an assisting node of the one or more assisting nodes.

Aspect 109: The method of Aspect 108, wherein the one or more assisting nodes include at least one of: a repeater node, a reflector node, a configurable assisting node, or a non-configurable assisting node.

Aspect 110: The method of any of Aspects 108-109, wherein the identifying information for an assisting node includes an indication of at least one of: an identifier associated with the assisting node, location information associated with the assisting node, capability information associated with the assisting node, receiving directions associated with the assisting node, or forwarding directions associated with the assisting node.

Aspect 111: The method of Aspect 110, wherein the indication of the identifier associated with the assisting node includes an indication of at least one of: a unique identifier associated with the assisting node, or an index value associated with the assisting node.

Aspect 112: The method of any of Aspects 110-111, wherein the indication of the location information associated with the assisting node includes an indication of at least one of: absolute location information associated with the assisting node, relative location information associated with the assisting node, spatial direction information associated with the assisting node, a distance between the assisting node and the first wireless node or between the assisting node and the second wireless node, or geographical coordinates associated with the assisting node.

Aspect 113: The method of any of Aspects 110-112, wherein the indication of the capability information associated with the assisting node includes an indication of at least one of: a type associated with the assisting node, whether the assisting node is configurable or non-configurable, or one or more configurations associated with the assisting node.

Aspect 114: The method of any of Aspects 108-113, wherein the first node is at least one of: a central unit of an integrated access and backhaul (IAB) donor, a distributed unit of an TAB node, a mobile termination component of an TAB node, a user equipment (UE), or a base station.

Aspect 115: The method of any of Aspects 108-114, wherein the control node is at least one of: an operations, administration, and maintenance (OAM) module, a core network device, a central unit of an integrated access and backhaul (TAB) donor, a parent node associated with the first wireless node, an TAB node, a distributed unit of an TAB node, a base station, a user equipment, or a roadside unit.

Aspect 116: The method of any of Aspects 108-115, wherein receiving the indication of the one or more assisting nodes comprises receiving the indication via at least one of: an operations, administration, and maintenance (OAM) interface, an F1 application protocol interface, a Uu interface, or a PC5 interface.

Aspect 117: The method of any of Aspects 108-116, further comprising: transmitting, to the control node or the second wireless node, a request for identifying information for assisting nodes associated with the second wireless node.

Aspect 118: The method of any of Aspects 108-117, wherein receiving the indication of the one or more assisting nodes associated with the second wireless node comprises: receiving, from the control node or a third wireless node, an indication of one or more relevant assisting nodes associated with the second wireless node.

Aspect 119: The method of any of Aspects 108-118, wherein receiving the indication of the one or more assisting nodes associated with the second wireless node comprises: receiving, from the control node or a third wireless node, an indication of one or more assisting nodes that are assigned to the second wireless node.

Aspect 120: The method of Aspect 119, wherein communicating, with the second wireless node, using an assisting node of the one or more assisting nodes comprises: communicating, with the second wireless node, using an assisting node of the one or more assisting nodes that are assigned to the second wireless node.

Aspect 121: The method of any of Aspects 119-120, further comprising: determining one or more available assisting nodes based at least in part on the indication of the one or more assisting nodes that are assigned to the second wireless node.

Aspect 122: The method of any of Aspects 119-121, further comprising: performing at least one of an interference procedure or a beam management procedure based at least in part on the indication of the one or more assisting nodes that are assigned to the second wireless node.

Aspect 123: The method of any of Aspects 119-122, wherein communicating, with the second wireless node, using an assisting node of the one or more assisting nodes comprises: performing a handover procedure, for handing over one or more child nodes associated with the first wireless node to the second wireless node, with the second wireless node using an assisting node of the one or more assisting nodes that are assigned to the second wireless node.

Aspect 124: An apparatus for wireless communication at a device, comprising a processor; memory coupled with the processor; and instructions stored in the memory and executable by the processor to cause the apparatus to perform the method of one or more of Aspects 1-31 and 51-81.

Aspect 125: A device for wireless communication, comprising a memory and one or more processors coupled to the memory, the one or more processors configured to perform the method of one or more of Aspects 1-31 and 51-81.

Aspect 126: An apparatus for wireless communication, comprising at least one means for performing the method of one or more of Aspects 1-31 and 51-81.

Aspect 127: A non-transitory computer-readable medium storing code for wireless communication, the code comprising instructions executable by a processor to perform the method of one or more of Aspects 1-31 and 51-81.

Aspect 128: A non-transitory computer-readable medium storing a set of instructions for wireless communication, the set of instructions comprising one or more instructions that, when executed by one or more processors of a device, cause the device to perform the method of one or more of Aspects 1-31 and 51-81.

Aspect 129: An apparatus for wireless communication at a device, comprising a processor; memory coupled with the processor; and instructions stored in the memory and executable by the processor to cause the apparatus to perform the method of one or more of Aspects 31-40 and 83-107.

Aspect 130: A device for wireless communication, comprising a memory and one or more processors coupled to the memory, the one or more processors configured to perform the method of one or more of Aspects 31-40 and 83-107.

Aspect 131: An apparatus for wireless communication, comprising at least one means for performing the method of one or more of Aspects 31-40 and 83-107.

Aspect 132: A non-transitory computer-readable medium storing code for wireless communication, the code comprising instructions executable by a processor to perform the method of one or more of Aspects 31-40 and 83-107.

Aspect 133: A non-transitory computer-readable medium storing a set of instructions for wireless communication, the set of instructions comprising one or more instructions that, when executed by one or more processors of a device, cause the device to perform the method of one or more of Aspects 31-40 and 83-107.

Aspect 134: An apparatus for wireless communication at a device, comprising a processor; memory coupled with the processor; and instructions stored in the memory and executable by the processor to cause the apparatus to perform the method of one or more of Aspects 41-50 and 108-123.

Aspect 135: A device for wireless communication, comprising a memory and one or more processors coupled to the memory, the one or more processors configured to perform the method of one or more of Aspects 41-50 and 108-123.

Aspect 136: An apparatus for wireless communication, comprising at least one means for performing the method of one or more of Aspects 41-50 and 108-123.

Aspect 137: A non-transitory computer-readable medium storing code for wireless communication, the code comprising instructions executable by a processor to perform the method of one or more of Aspects 41-50 and 108-123.

Aspect 138: A non-transitory computer-readable medium storing a set of instructions for wireless communication, the set of instructions comprising one or more instructions that, when executed by one or more processors of a device, cause the device to perform the method of one or more of Aspects 41-50 and 108-123.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless node for wireless communication, comprising:
   a memory; and
   one or more processors, coupled to the memory, configured to:
   receive, from a control node or a second wireless node, an indication of an assisting node to be used to establish a communication connection between the first wireless node and the second wireless node, the indication including identifying information associated with the assisting node; and
   establish the communication connection with the second wireless node using the assisting node.

2. The first wireless node of claim 1, wherein the one or more processors are further configured to:
   receive, from the control node, an indication of resources to be used to establish the communication connection between the first wireless node and the second wireless node.

3. The first wireless node of claim 1, wherein the one or more processors, to establish the communication connection with the second wireless node using the assisting node, are configured to:
   receive, from the assisting node, one or more periodic signals that are associated with periodic signals that have been transmitted by the second wireless node to the assisting node; and
   transmit, to the assisting node, a link establishment request associated with establishing the communication connection with the second wireless node responsive to the periodic signals being transmitted, the link establishment request is to be forwarded to the second wireless node by the assisting node.

4. The first wireless node of claim 1, wherein the one or more processors, to establish the communication connection with the second wireless node using the assisting node, are configured to:
   monitor resources indicated by the control node for a signal from the assisting node; and
   receive, from the assisting node, a link establishment request sent by the second wireless node associated with establishing the communication connection with the second wireless node in accordance with a monitoring of the resources indicated by the control node.

5. The first wireless node of claim 1, wherein the one or more processors, to establish the communication connection with the second wireless node using the assisting node, are configured to:
   transmit, to the assisting node, a link establishment request associated with establishing the communication connection with the second wireless node using resources indicated by the control node, the link establishment request is to be forwarded to the second wireless node by the assisting node.

6. The first wireless node of claim 1, wherein the one or more processors are further configured to:
   receive, from the control node, an indication of quasi co-location (QCL) information associated with one or more beams to be used to communicate with the assisting node.

7. The first wireless node of claim 1, wherein the one or more processors are further configured to:
   transmit an indication of one or more assisting nodes, including the assisting node, and one or more resources, including resources indicated by the control node, to be used for initial access procedures with the first wireless node.

8. The first wireless node of claim 1, wherein the one or more processors are further configured to:
   receive, from at least one of the control node or the second wireless node, an indication of one or more assisting nodes, including the assisting node, and one or more resources, including resources indicated by the control node, to be used for initial access procedures with the second wireless node.

9. The first wireless node of claim 1, wherein the one or more processors, to establish the communication connection with the second wireless node using the assisting node, are configured to:
transmit, to the assisting node, one or more reference signals to be forwarded by the assisting node using one or more forwarding configurations.

10. The first wireless node of claim 1, wherein the one or more processors, to establish the communication connection with the second wireless node using the assisting node, are configured to:
receive, from the assisting node, one or more reference signals forwarded using one or more forwarding configurations; and
perform one or more end-to-end measurements associated with the one or more reference signals forwarded using the one or more forwarding configurations.

11. The first wireless node of claim 1, wherein the one or more processors are further configured to:
communicate, with the second wireless node or another wireless node, using the assisting node.

12. The first wireless node of claim 1, wherein the one or more processors are further configured to:
transmit, to the second wireless node, a request for identifying information associated with the assisting node.

13. The first wireless node of claim 1, wherein the one or more processors are further configured to:
transmit an indication of identifying information for one or more relevant assisting nodes that can be used by other wireless nodes to communicate with the first wireless node.

14. The first wireless node of claim 1, wherein the one or more processors are further configured to:
transmit an indication of identifying information for one or more assisting nodes that are assigned to the first wireless node.

15. A method of wireless communication performed by a first wireless node, comprising:
receiving, from a control node or a second wireless node, an indication of an assisting node to be used to establish a communication connection between the first wireless node and the second wireless node, the indication including identifying information associated with the assisting node; and
establishing the communication connection with the second wireless node using the assisting node.

16. The method of claim 15, further comprising:
receiving, from the control node, an indication of resources to be used to establish the communication connection between the first wireless node and the second wireless node.

17. The method of claim 15, wherein establishing the communication connection with the second wireless node using the assisting node comprises:
receiving, from the assisting node, one or more periodic signals that are associated with periodic signals that have been transmitted by the second wireless node to the assisting node; and
transmitting, to the assisting node, a link establishment request associated with establishing the communication connection with the second wireless node responsive to the periodic signals being transmitted, the link establishment request is to be forwarded to the second wireless node by the assisting node.

18. The method of claim 15, wherein establishing the communication connection with the second wireless node using the assisting node comprises:
monitoring resources indicated by the control node for a signal from the assisting node; and
receiving, from the assisting node, a link establishment request sent by the second wireless node associated with establishing the communication connection with the second wireless node in accordance with a monitoring of the resources indicated by the control node.

19. The method of claim 15, wherein establishing the communication connection with the second wireless node using the assisting node comprises:
transmitting, to the assisting node, a link establishment request associated with establishing the communication connection with the second wireless node using resources indicated by the control node, the link establishment request is to be forwarded to the second wireless node by the assisting node.

20. The method of claim 15, further comprising:
receiving, from the control node, an indication of quasi co-location (QCL) information associated with one or more beams to be used to communicate with the assisting node.

21. The method of claim 15, further comprising:
transmitting an indication of one or more assisting nodes, including the assisting node, and one or more resources, including resources indicated by the control node, to be used for initial access procedures with the first wireless node.

22. The method of claim 15, further comprising:
receiving, from at least one of the control node or the second wireless node, an indication of one or more assisting nodes, including the assisting node, and one or more resources, including resources indicated by the control node, to be used for initial access procedures with the second wireless node.

23. The method of claim 15, wherein establishing the communication connection with the second wireless node using the assisting node comprises:
transmitting, to the assisting node, one or more reference signals to be forwarded by the assisting node using one or more forwarding configurations.

24. The method of claim 15, wherein establishing the communication connection with the second wireless node using the assisting node comprises:
receiving, from the assisting node, one or more reference signals forwarded using one or more forwarding configurations; and
performing one or more end-to-end measurements associated with the one or more reference signals forwarded using the one or more forwarding configurations.

25. The method of claim 15, further comprising:
communicating, with the second wireless node or another wireless node, using the assisting node.

26. The method of claim 15, further comprising:
transmitting, to the second wireless node, a request for identifying information associated with the assisting node.

27. The method of claim 15, further comprising:
transmitting an indication of identifying information for one or more relevant assisting nodes that can be used by other wireless nodes to communicate with the first wireless node.

28. The method of claim 15, further comprising:
transmitting an indication of identifying information for one or more assisting nodes that are assigned to the first wireless node.

29. A non-transitory computer-readable medium storing a set of instructions for wireless communication, the set of instructions comprising:
one or more instructions that, when executed by one or more processors of a first wireless node, cause the first wireless node to:
receive, from a control node or a second wireless node, an indication of an assisting node to be used to establish a communication connection between the first wireless node and the second wireless node, the indication including identifying information associated with the assisting node; and
establish the communication connection with the second wireless node using the assisting node.

30. An apparatus for wireless communication, comprising:
means for receiving, from a control node or a wireless node, an indication of an assisting node to be used to establish a communication connection between the apparatus and the wireless node, the indication including identifying information associated with the assisting node; and
means for establishing the communication connection with the wireless node using the assisting node.

\* \* \* \* \*